(12) United States Patent
Cirik et al.

(10) Patent No.: US 12,382,461 B2
(45) Date of Patent: *Aug. 5, 2025

(54) TRANSMISSION AND RECEPTION POINT CONFIGURATION FOR BEAM FAILURE RECOVERY

(71) Applicant: Ofinno, LLC, Reston, VA (US)

(72) Inventors: Ali Cagatay Cirik, Chantilly, VA (US); Esmael Hejazi Dinan, McLean, VA (US); Yunjung Yi, Vienna, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,674

(22) Filed: Jan. 23, 2024

(65) Prior Publication Data

US 2024/0163878 A1 May 16, 2024

Related U.S. Application Data

(63) Continuation of application No. 18/306,083, filed on Apr. 24, 2023, now Pat. No. 11,917,630, which is a continuation of application No. 17/062,014, filed on Oct. 2, 2020, now Pat. No. 11,653,354.

(60) Provisional application No. 62/909,643, filed on Oct. 2, 2019.

(51) Int. Cl.
*H04W 72/21* (2023.01)
*H04B 7/06* (2006.01)
*H04W 52/14* (2009.01)
*H04W 76/18* (2018.01)

(52) U.S. Cl.
CPC .......... *H04W 72/21* (2023.01); *H04B 7/0639* (2013.01); *H04B 7/0695* (2013.01); *H04W 52/146* (2013.01); *H04W 76/18* (2018.02)

(58) Field of Classification Search
CPC ... H04W 72/21; H04W 52/146; H04W 76/18; H04B 7/0639; H04B 7/0695; H04B 7/088
See application file for complete search history.

(56) References Cited

U.S. PATENT DOCUMENTS

| 11,050,478 | B2 | 6/2021 | Guo et al. |
| 12,185,404 | B2 | 12/2024 | Tsai et al. |
| 2014/0177601 | A1 | 6/2014 | Nishio et al. |
| 2019/0044792 | A1 | 2/2019 | Kwon et al. |
| 2019/0190582 | A1 | 6/2019 | Guo et al. |
| 2019/0268893 | A1 | 8/2019 | Tsai et al. |
| 2019/0289588 | A1 | 9/2019 | Akkarakaran et al. |

(Continued)

FOREIGN PATENT DOCUMENTS

WO 2019/032882 A1 2/2019

OTHER PUBLICATIONS

Vivo: "Further Discussion on Multi-TRP 1-15 Transmission", 3GPP Draft; RI-1905817 Further Discussion on Multi TRP Transmissto, 3rd Generation Partnership Project (3GPP) Xi 'an, China; Apr. 15, 2019.

(Continued)

*Primary Examiner* — Habte Mered
(74) *Attorney, Agent, or Firm* — Jacob L. Mangan; Kavon Nasabzadeh; Brett K. Gardner

(57) ABSTRACT

Wireless communications may comprise communications between a base station and a wireless device. A wireless device may perform beam failure recovery (BFR). Based on an indication of completion of the BFR, the wireless device may determine resources for transmission of uplink signals.

30 Claims, 28 Drawing Sheets

(56) References Cited

U.S. PATENT DOCUMENTS

| | | |
|---|---|---|
| 2019/0003198 A1 | 10/2019 | Nagaraja et al. |
| 2019/0003795 A1 | 12/2019 | Cheng |
| 2020/0053613 A1 | 2/2020 | Cirik et al. |
| 2020/0267048 A1 | 8/2020 | Yu et al. |
| 2020/0350972 A1 | 11/2020 | Yi et al. |
| 2020/0351066 A1 | 11/2020 | Cirik et al. |
| 2021/0051650 A1 | 2/2021 | Yi et al. |
| 2021/0058805 A1 | 2/2021 | Ji et al. |
| 2021/0058998 A1 | 2/2021 | Yuan et al. |
| 2021/0135713 A1 | 5/2021 | Kang et al. |
| 2021/0159967 A1 | 5/2021 | Cirik et al. |
| 2021/0160126 A1 | 5/2021 | Cirik et al. |
| 2021/0336680 A1 | 10/2021 | Park et al. |

OTHER PUBLICATIONS

Feb. 4, 2021—Extended European Search Report—EP20199846.5.
R1-200nnnn 3GPP TSG RAN WG1 Meeting #102-e, e-Meeting, Aug. 17-28, 2020, Source: Moderator (CATT), Title: Summary on beam management for simultaneous multi-TRP transmission with multiple Rx panels.
3GPP TS 38.213 V15.6.0 (Jun. 2019), Technical Specification, 3rd Generation Partnership Project; Technical Specification Group Radio Access Network; NR; Physical layer procedures for control (Release 15).
3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.300 V15.6.0 (Jun. 2019) 3rd Generation Partnership Project; Technical Specification Group Radio Access Netwrok; NR; NR and NG-RAN Overall Description; Stage 2 (Release 15).
3GPP TS 38.321 V15.6.0 (Jun. 2019) 3rd Generation Partnership Project; Technical Specification Group Radio Access Network; NR; Medium Access Control (MAC) protocol specation (Relesae 15).
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
R1-190xxxx 3GPP TSG RAN WG1 Meeting #98bis, Chongqing, China Oct. 14-18, 2019, Source: MCC Support, Title: Draft Report of 3GPP TSG RAN WG1 #98 v0.2.0 (Prague, Czech Rep, Aug. 26-30, 2019).
R1-18xxxxx 3GPP TSG-RAN WG1 Meeting #95, Spokane, WA, USA, Nov. 12-16, 2018, Source: Nokia, Nokia Shanghai Bell, Title: Selection of RS to be include in set fo q0.
R1-1808196 3GPP TSG RAN WG1 Meeting #94, Gothenburg, Sweden, Aug. 20-24, 2018, Source: ZTE, Title: Maintenance for beam management.
R1-1808264 3GPP TSG RAN WG1 Meeting #94, Gothenburg, Sweden, Aug. 20-24, 2018, Source: MediaTek Inc., Title: Remaining Issues for Beam Management and Beam Failure Recovery.
R1-1810214 3GPP TSG-RAN WG1 Meeting #94bis, Chengdu, PR China, Oct. 8-12, 2018, Source: ZTE, Title: Maintenance for beam management.
R1-1810366 3GPP TSG-RAN WG1 Meeting #94bis, Chengdu, PR China, Oct. 8-12, 2018, Source: vivo, Title: Maintenance for beam management.
R1-1810427 3GPP TSG-RAN WG1 Meeting #94bis, Chengdu, PR China, Oct. 8-12, 2018, Source: MediaTek Inc., Title: Maintenance for beam management.
R1-1810480 3GPP TSG-RAN WG1 Meeting #94bis, Chengdu, PR China, Oct. 8-12, 2018, Source: Fujitsu, Title: Remaining PUCCH spatial filtering issues on beam failure recovery.
R1-1810518 3GPP TSG-RAN WG1 Meeting #94bis, Chengdu, PR China, Oct. 8-12, 2018, Source: CATT, Title: Remaining issues on beam management.
R1-1810751 3GPP TSG-RAN WG1 Meeting #94bis, Chengdu, PR China, Oct. 8-12, 2018, Source: Intel Corporation, Title: Remaining issues on beam management.
R1-1810839 3GPP TSG-RAN WG1 Meeting #94bis, Chengdu, PR China, Oct. 8-12, 2018, Source: Samsung, Title: Remaining issues on beam management.
R1-1811352 3GPP TSG-RAN WG1 Meeting #94bis, Chengdu, PR China, Oct. 8-12, 2018, Source: NTT Docomo, Title: Remaining issues on beam management.
R1-1811633 3GPP TSG-RAN WG1 Meeting #94bis, Chengdu, PR China, Oct. 8-12, 2018, Source: Qualcomm Incorporated, Title: Beam management for NR.
R1-1812266 3GPP TSG RAN WG1 Meeting #95, Spokane, USA, Nov. 12-16, 2018, Source: ZTE, Title: Discussion on draft CRs on beam management.
R1-1812285 3GPP TSG RAN WG1 Meeting #95, Spokane, USA, Nov. 12-16, 2018, Source: vivo, Title: Draft CR on beam management.
R1-1812443 3GPP TSG RAN WG1 Meeting #95, Spokane, USA, Nov. 12-16, 2018, Source: Fujitsu, Title: Discussion on PUCCH spatial filtering on beam failure recovery.
R1-1812957 3GPP TSG RAN WG1 Meeting #95, Spokane, USA, Nov. 12-16, 2018, Source: Samsung, Title: Remaining issues on beam management.
R1-1813299 3GPP TSG RAN WG1 Meeting #95, Spokane, USA, Nov. 12-16, 2018, Source: NTT Docomo, Title: Remaining issues on beam management.
R1-1813396 3GPP TSG RAN WG1 Meeting #95, Spokane, USA, Nov. 12-16, 2018, Source: Qualcomm Incorporated, Title: Beam management for NR.
R1-1813486 3GPP TSG RAN WG1 Meeting #95, Spokane, USA, Nov. 12-16, 2018, Source: Nokia, Nokia Shanghai Bell, Title: Maintenance for Beam Management.
R1-1900450 3GPP TSG RAN WG1 Ad-Hoc Meeting 1901, Taipei, Taiwan, Jan. 21-25, 2019, Source: AT&T, Title: Enhancements on Multi-Beam Operation for NR.
R1-1901077 3GPP TSG RAN WG1 Ad-Hoc Meeting 1901, Taipei, Taiwan, Jan. 21-25, 2019, Source: Samsung, Title: Enhancements on multi-beam operations.
R1-1901154 3GPP TSG RAN WG1 Ad-Hoc Meeting 1901, Taipei, Taiwan, Jan. 21-25, 2019, Source: ASUS TeK, Title: Enhancements on multi-beam operation.
R1-1901164 3GPP TSG RAN WG1 Ad-Hoc Meeting 1901, Taipei, Taiwan, Jan. 21-25, 2019, Source: Ericsson, Title: Enhancements to multi-beam operation.
R1-1908066 3GPP TSG RAN WG1 Meeting #98, Prague, Czech Republic, Aug. 26-30, 2019, Source: Huawei, HiSilicon, Title: Enhancements on Multi-TRP/panel transmission.
R1-1908067 3GPP TSG RAN WG1 Meeting #98, Prague, Czech Republic, Aug. 26-30, 2019, Source: Huawei, HiSilicon, Title: Enhancements on multi-beam operation.
R1-1908166 3GPP TSG RAN WG1 Meeting #98, Prague, Czech Republic, Aug. 26-30, 2019, Source: vivo, Title: Remaining issues on multi-TRP/Panel transmission.
R1-1908167 3GPP TSG RAN WG1 Meeting #98, Prague, Czech Republic, Aug. 26-30, 2019, Source: vivo, Title: Enhancements on Multi-TRP and Multi-panel Transmission.
R1-1908191 3GPP TSG RAN WG1 Meeting #98, Prague, Czech Republic, Aug. 26-30, 2019, Source: ZTE, Title: Enhancements on Multi-TRP and Multi-panel Transmission.
R1-1908192 3GPP TSG RAN WG1 Meeting #98, Prague, Czech Republic, Aug. 26-30, 2019, Source: ZTE, Title: Enhancements on multi-beam operation.
R1-1908232 3GPP TSG RAN WG1 Meeting #98, Prague, Czech Republic, Aug. 26-30, 2019, Source: InterDigital Inc., Title: On the Performance of Multi-TRP/Panel Transmission.
R1-1908233 3GPP TSG RAN WG1 Meeting #98, Prague, Czech Republic, Aug. 26-30, 2019, Source: InterDigital Inc., Title: Views on Panel Activation and Deactivation.
R1-1908323 3GPP TSG RAN WG1 Meeting #98, Prague, Czech Republic, Aug. 26-30, 2019, Source: Fujitsu, Title: Enhancements on multi-TRP transmission.

(56) References Cited

OTHER PUBLICATIONS

R1-1908324 3GPP TSG RAN WG1 Meeting #98, Prague, Czech Republic, Aug. 26-30, 2019, Source: Fujitsu, Title: Enhancements on Multi-beam Operation.
R1-1908351 3GPP TSG RAN WG1 Meeting #98, Prague, Czech Republic, Aug. 26-30, 2019, Source: OPPO, Title: Enhancements on multi-TRP and multi-panel transmission.
R1-1908352 3GPP TSG RAN WG1 Meeting #98, Prague, Czech Republic, Aug. 26-30, 2019, Source: OPPO, Title: Discussion on Multi-beam Operation Enhancements.
R1-1908379 3GPP TSG RAN WG1 Meeting #98, Prague, Czech Republic, Aug. 26-30, 2019, Source: MediaTek Inc., Title: Enhancements on multi-TRP/panel transmission.
R1-1908380 3GPP TSG RAN WG1 Meeting #98, Prague, Czech Republic, Aug. 26-30, 2019, Source: MediaTek Inc., Title: Enhancements on multi-beam operations.
R1-1908427 3GPP TSG RAN WG1 Meeting #98, Prague, Czech Republic, Aug. 26-30, 2019, Title: Discussion of Beam Failure Recovery for SCell.
R1-1908501 3GPP TSG RAN WG1 Meeting #98, Prague, Czech Republic, Aug. 26-30, 2019, Source: Samsung, Title: Enhancements on Multi-TRP/Panel Transmission.
R1-1908502 3GPP TSG RAN WG1 Meeting #98, Prague, Czech Republic, Aug. 26-30, 2019, Source: Samsung, Title: Enhancements on multi-beam operations.
R1-1908602 3GPP TSG RAN WG1 Meeting #98, Prague, Czech Republic, Aug. 26-30, 2019, Source: CATT, Title: Considerations on multi-TRP/panel transmission.
R1-1908603 3GPP TSG RAN WG1 Meeting #98, Prague, Czech Republic, Aug. 26-30, 2019, Source: CATT, Title: Considerations on multi-beam enhancements.
R1-1908653 3GPP TSG RAN WG1 Meeting #98, Prague, Czech Republic, Aug. 26-30, 2019, Source: Intel Corporation, Title: On multi-TRP/multi-panel transmission.
R1-1908654 3GPP TSG RAN WG1 Meeting #98, Prague, Czech Republic, Aug. 26-30, 2019, Source: Intel Corporation, Title: Discussion on multi-beam enhancements.
R1-1908699 3GPP TSG RAN WG1 Meeting #98, Prague, Czech Republic, Aug. 26-30, 2019, Source: LG Electronics, Title: Enhancements on multi-TRP/panel transmission.
R1-1908700 3GPP TSG RAN WG1 Meeting #98, Prague, Czech Republic, Aug. 26-30, 2019, Source: LG Electronics, Title: Discussion on multi-beam based operations and enhancements.
R1-1908720 3GPP TSG RAN WG1 Meeting #98, Prague, Czech Republic, Aug. 26-30, 2019, Source: Lenovo, Motorola Mobility, Title: Discussion of multi-TRP/panel transmission.
R1-1908721 3GPP TSG RAN WG1 Meeting #97, Reno, USA, May 13-17, 2019, Source: Lenovo, Motorola Mobility, Title: Discussion of multi-TRP/panel transmission.
R1-1908783 3GPP TSG RAN WG1 Meeting #98, Prague, Czech Republic, Aug. 26-30, 2019, Source: Sony, Title: Considerations on Multi-TRP/Panel Transmission.
R1-1908784 3GPP TSG RAN WG1 Meeting #98, Prague, Czech Republic, Aug. 26-30, 2019, Source: Sony, Title: Enhancements on multi-beam operation.
R1-1908856 3GPP TSG RAN WG1 Meeting #98, Prague, Czech Republic, Aug. 26-30, 2019, Source: NEC, Title: Discussion on multi-TRP operation.
R1-1908857 3GPP TSG RAN WG1 Meeting #98, Prague, Czech Republic, Aug. 26-30, 2019, Source: NEC, Title: Discussion on multi-beam operation.
R1-1908869 3GPP TSG RAN WG1 Meeting #98, Prague, Czech Republic, Aug. 26-30, 2019, Source: NEC, Title: Discussion on multi-TRP/panel transmission.
R1-1908870 3GPP TSG RAN WG1 Meeting #98, Prague, Czech Republic, Aug. 26-30, 2019, Source: CMCC, Title: Enhancements on multi-beam operation.
R1-1908885 3GPP TSG RAN WG1 Meeting #98, Prague, Czech Republic, Aug. 26-30, 2019, Source: China Telecom, Title: Discussion on Multi-TRP/Panel Transmission enhancements.
R1-1908886 3GPP TSG RAN WG1 Meeting #98, Prague, Czech Republic, Aug. 26-30, 2019, Source: China Telecom, Title: Enhancements on multi-beam operation.
R1-1908928 3GPP TSG RAN WG1 Meeting #98, Prague, Czech Republic, Aug. 26-30, 2019, Source: Asia Pacific Telecom, Title: Discussion on Multi-beam Operations.
R1-1908972 3GPP TSG RAN WG1 Meeting #98, Prague, Czech Republic, Aug. 26-30, 2019, Source: Panasonic, Title: On multi-TRP enhancements for NR MIMO in Rel. 16.
R1-1908973 3GPP TSG RAN WG1 Meeting #98, Prague, Czech Republic, Aug. 26-30, 2019, Source: Fraunhofer IIS, Fraunhofer HHI, Title: Enhancements on UE multi-beam operation.
R1-1908975 3GPP TSG RAN WG1 Meeting #98, Prague, Czech Republic, Aug. 26-30, 2019, Source: Panasonic, Title: On enhancements for multi-beam operations for NR MIMO in Rel. 16.
R1-1908990 3GPP TSG RAN WG1 Meeting #98, Prague, Czech Republic, Aug. 26-30, 2019, Source: Ericsson, Title: On multi-TRP and multi-panel.
R1-1909047 3GPP TSG RAN WG1 Meeting #98, Prague, Czech Republic, Aug. 26-30, 2019, Source: Apple Inc., Title: Remaining Issues on Multi-TRP Enhancement.
R1-1909048 3GPP TSG RAN WG1 Meeting #98, Prague, Czech Republic, Aug. 26-30, 2019, Source: Apple Inc., Title: Remaining Issues on Multi-beam operation.
R1-1909075 3GPP TSG RAN WG1 Meeting #98, Prague, Czech Republic, Aug. 26-30, 2019, Source: AT&T, Title: Enhancements on Multi TRP Transmission.
R1-1909105 3GPP TSG RAN WG1 Meeting #98, Prague, Czech Republic, Aug. 26-30, 2019, Source: Sharp, Title: Discussion on multi-TRP/panel techniques for URLLC.
R1-1909120 3GPP TSG RAN WG1 Meeting #98, Prague, Czech Republic, Aug. 26-30, 2019, Source: Xiaomi, Title: Enhancements on Multi-TRP/Panel Transmission.
R1-1909126 3GPP TSG RAN WG1 Meeting #98, Prague, Czech Republic, Aug. 26-30, 2019, Source: Xiaomi, Title: Enhancements on beam management.
R1-1909164 3GPP TSG RAN WG1 Meeting #98, Prague, Czech Republic, Aug. 26-30, 2019, Source: ITRI, Title: Discussion on multi-TRP/panel transmission.
R1-1909201 3GPP TSG RAN WG1 Meeting #98, Prague, Czech Republic, Aug. 26-30, 2019, Source: NTT Docomo, Inc, Title: Enhancements on multi-TRP/panel transmission.
R1-1909202 3GPP TSG RAN WG1 Meeting #98, Prague, Czech Republic, Aug. 26-30, 2019, Source: NTT Docomo, Inc, Title: Discussion on multi-beam enhancement.
R1-1909209 3GPP TSG RAN WG1 Meeting #98, Prague, Czech Republic, Aug. 26-30, 2019, Source: Nokia, Nokia Shanghai Bell, Title: Enhancements on Multi-TRP/Panel Transmission.
R1-1909210 3GPP TSG RAN WG1 Meeting #98, Prague, Czech Republic, Aug. 26-30, 2019, Source: Nokia, Nokia Shanghai Bell, Title: Enhancements on Multi-beam Operation.
R1-1909225 3GPP TSG RAN WG1 Meeting #98, Prague, Czech Republic, Aug. 26-30, 2019, Source: Ericsson, Title: Enhancements to multibeam operation.
R1-1909272 3GPP TSG RAN WG1 Meeting #98, Prague, Czech Republic, Aug. 26-30, 2019, Source: Qualcomm Incorporated, Title: Multi-TRP Enhancements.
R1-1909273 3GPP TSG RAN WG1 Meeting #98, Prague, Czech Republic, Aug. 26-30, 2019, Source: Qualcomm Incorporated, Title: Enhancements on Multi-beam Operation.
R1-1909380 3GPP TSG RAN WG1 Meeting #98, Prague, Czech Republic, Aug. 26-30, 2019, Source: KDDI, Title: Enhancements on Multi-TRP/panel transmission.
R1-1909382 3GPP TSG RAN WG1 Meeting #98, Prague, Czech Republic, Aug. 26-30, 2019, Source: KDDI, Title: Enhancements on multi-beam operation.
R1-1909383 3GPP TSG RAN WG1 Meeting #98, Prague, Czech Republic, Aug. 26-30, 2019, Source: ASUSTeK, Title: Enhancements on multiple TRP or panel transmission.
R1-1909465 3GPP TSG RAN WG1 Meeting #98, Prague, Czech Republic, Aug. 26-30, 2019, Source: Ericsson, Title: On multi-TRP and multi-panel.

(56) References Cited

OTHER PUBLICATIONS

R1-1909481 3GPP TSG RAN WG1 Meeting #98, Prague, Czech Republic, Aug. 26-30, 2019, Source: Apple Inc., Title: Feature lead summary on previous agreements and open issues on L1-SINR and SCell BFR.
R1-1909482 3GPP TSG RAN WG1 Meeting #98, Prague, Czech Republic, Aug. 26-30, 2019, Source: Apple Inc., Title: Feature lead summary on L1-SINR and SCell BFR.
R1-1909486 3GPP TSG RAN WG1 Meeting #98, Prague, Czech Republic, Aug. 26-30, 2019, Source: LG Electronics, Title: Feature lead summary of Enhancements on Multi-beam Operations.
R1-1909602 3GPP TSG RAN WG1 Meeting #98, Prague, Czech Republic, Aug. 26-30, 2019, Source: Huawei, HiSilicon, Title: Summary of Enhancements on Multi-TRP/Panel Transmission.
R1-1909604 3GPP TSG RAN WG1 Meeting #98, Prague, Czech Republic, Aug. 26-30, 2019, Source: Huawei, HiSilicon, Title: Proposals for Online Discussion over Multi-TRP/Panel Transmission.
R1-1909605 3GPP TSG RAN WG1 Meeting #98, Prague, Czech Republic, Aug. 26-30, 2019, Source: Huawei, HiSilicon, Title: Proposals for Online Discussion over Multi-TRP/Panel Transmission on Tuesday.
R1-1909687 3GPP TSG RAN WG1 Meeting #98, Prague, Czech Republic, Aug. 26-30, 2019, Source: LG Electronics, Title: Feature lead summary of Enhancements on Multi-beam Operations.
R1-1909695 3GPP TSG RAN WG1 Meeting #98, Prague, Czech Republic, Aug. 26-30, 2019, Source: LG Electronics, Title: Feature lead summary of Enhancements on Multi-beam Operations.
R1-1909721 3GPP TSG RAN WG1 Meeting #98, Prague, Czech Republic, Aug. 26-30, 2019, Source: Huawei, HiSilicon, Title: Proposals for Offline Discussion over Multi-TRP/Panel Transmission on Wednesday.
R1-1909743 3GPP TSG RAN WG1 Meeting #98, Prague, Czech Republic, Aug. 26-30, 2019, Source: Apple Inc., Title: Feature lead summary #2 on L1-SINR and SCell BFR.
R1-1909779 3GPP TSG RAN WG1 Meeting #98, Prague, Czech Republic, Aug. 26-30, 2019, Source: LG Electronics, Title: Feature lead summary#4 of Enhancements on Multi-beam Operations.
R1-1909786 3GPP TSG RAN WG1 Meeting #98, Prague, Czech Republic, Aug. 26-30, 2019, Source: Huawei, HiSilicon, Title: Proposals for Offline Discussion over Multi-TRP/Panel Transmission on Thursday.
R1-1909829 3GPP TSG RAN WG1 Meeting #98, Prague, Czech Republic, Aug. 26-30, 2019, Source: Apple, [TSG RAN WG1], Title: [draft] Reply LS on MAC CE design for SCell BFR.
R1-1909833 3GPP TSG RAN WG1 Meeting #98, Prague, Czech Republic, Aug. 26-30, 2019, Source: Apple, TSG RAN WG1, Title: Reply LS on MAC CE design for SCell BFR.
R1-1909603 3GPP TSG RAN WG1 Meeting #98, Prague, Czech Republic, Aug. 26-30, 2019, Source: Huawei, HiSilicon, Title: Summary of Remaining Issues and Agreements for Enhancements on Multi-TRP/panel transmission.
R1-1909076 3GPP TSG RAN WG1 Meeting #98, Prague, Czech Republic, Aug. 26-30, 2019, Source: AT&T, Title: Enhancements on Multi Beam Operation.
R1-1908959 3GPP TSG RAN WG1 Meeting #98, Prague, Czech Republic, Aug. 26-30, 2019, Source: Spreadtrum Communications, Title: Discussion on multi-beam operation.
R1-1908958 3GPP TSG RAN WG1 Meeting #98, Prague, Czech Republic, Aug. 26-30, 2019, Source: Spreadtrum Communications, Title: Discussion on Multi-TRP transmission.
Dec. 14, 2022—EP Office Action—EP App No. 20199846.5.

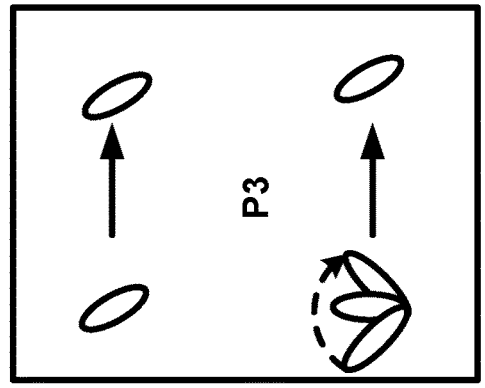 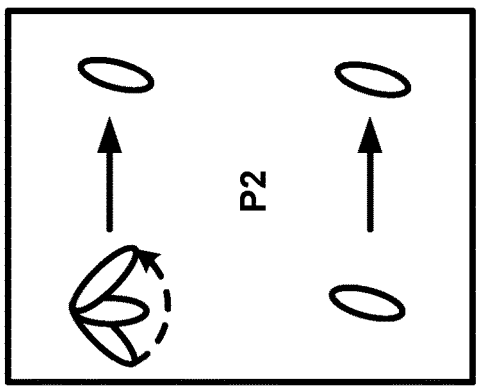 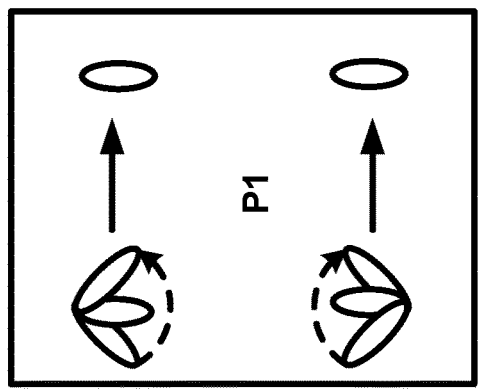 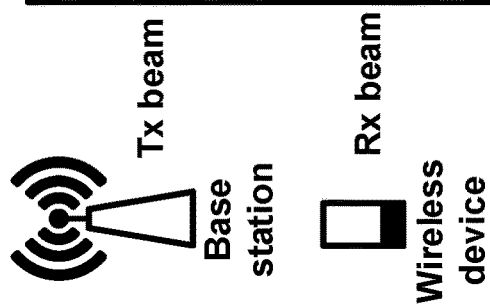
FIG. 12A
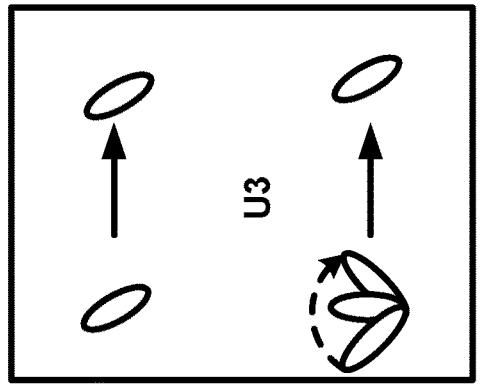 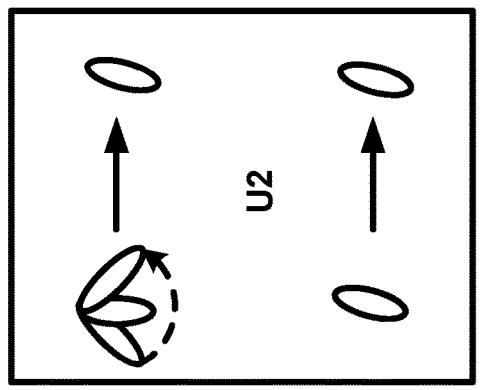 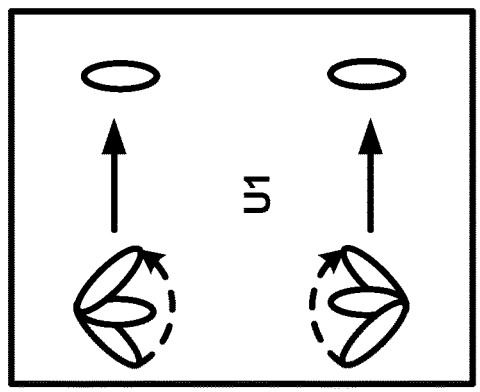 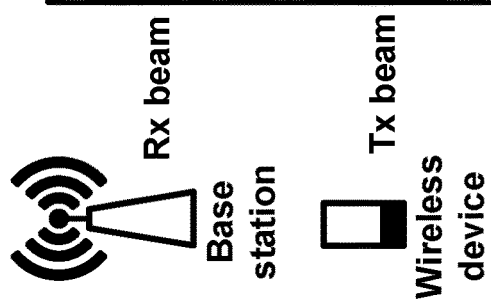
FIG. 12B

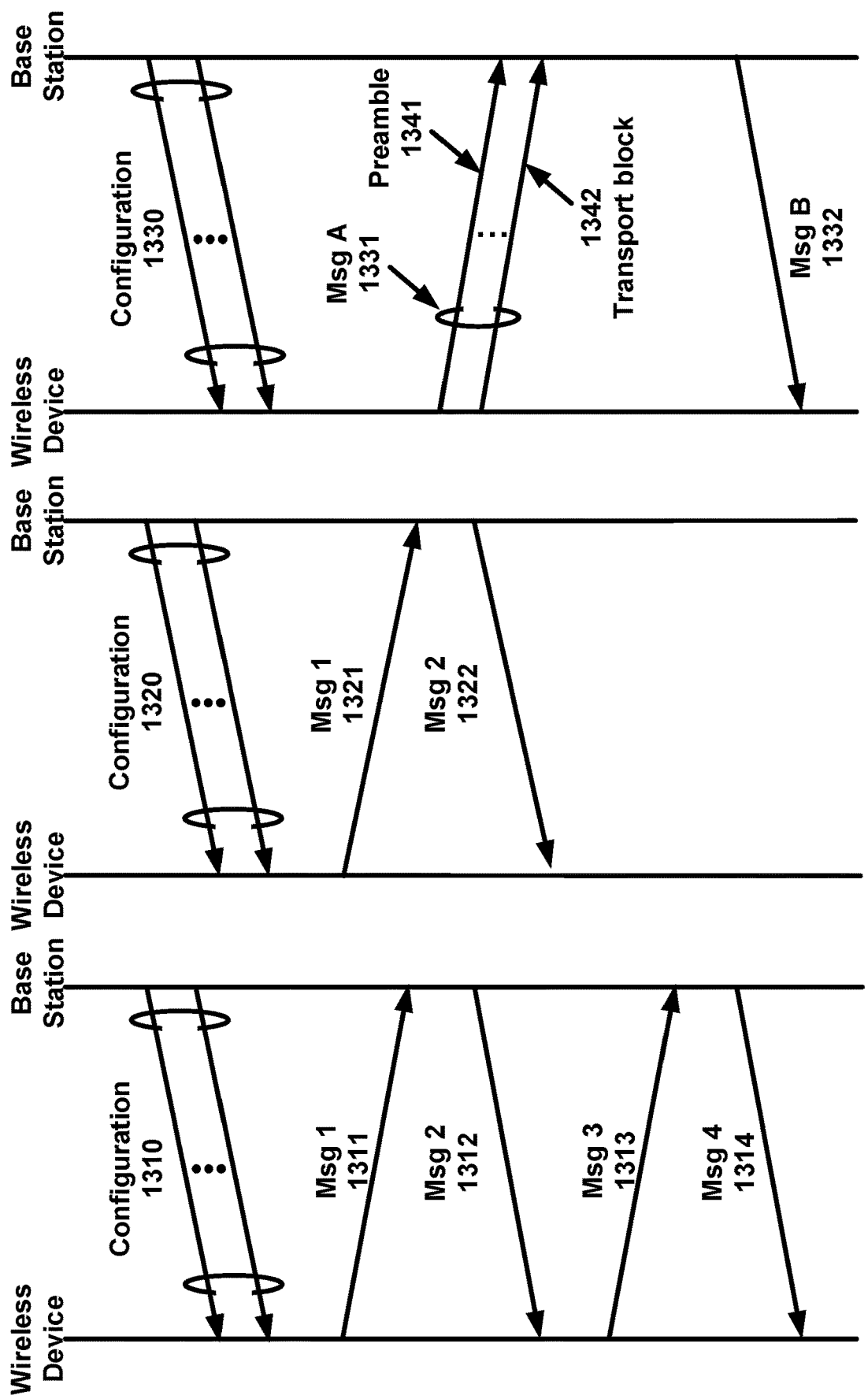

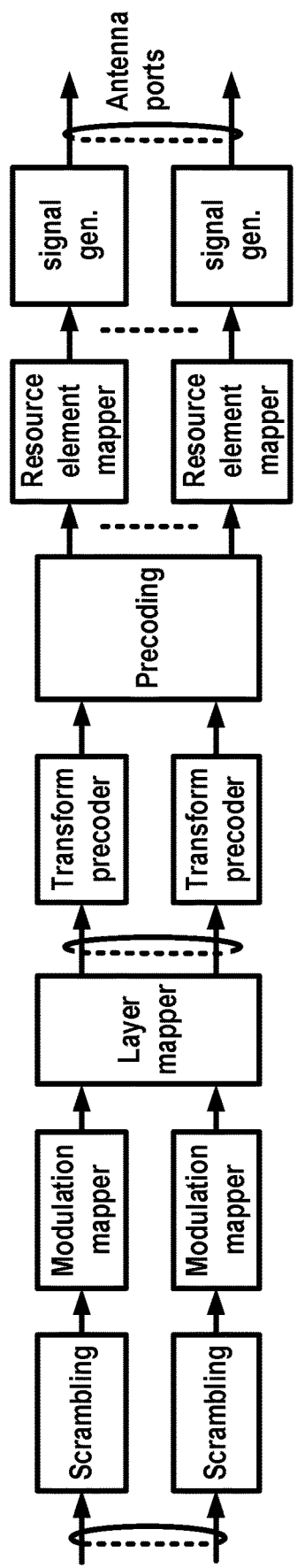
FIG. 16A
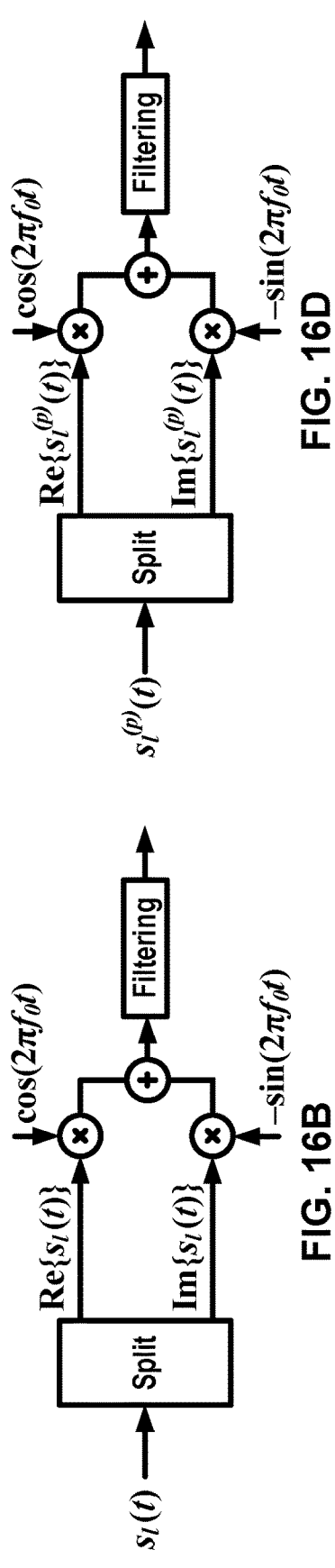
FIG. 16B
FIG. 16D
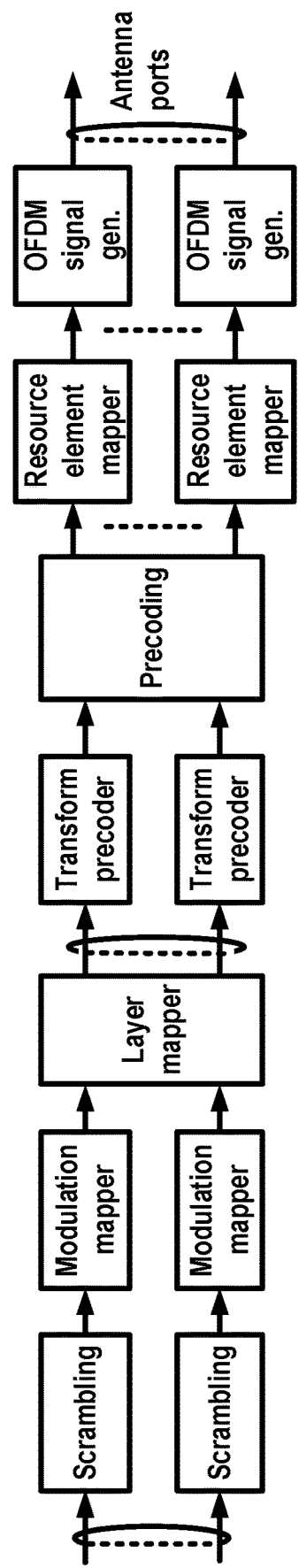
FIG. 16C

TRANSMISSION AND RECEPTION POINT CONFIGURATION FOR BEAM FAILURE RECOVERY

CROSS-REFERENCE TO RELATED APPLICATIONS

This application is a continuation of and claims priority to U.S. patent application Ser. No. 18/306,083, filed Apr. 24, 2023, which is a continuation of U.S. patent application Ser. No. 17/062,014, filed Oct. 2, 2020 (now U.S. Pat. No. 11,653,354), which claims the benefit of U.S. Provisional Application No. 62/909,643, filed on Oct. 2, 2019, each of which is hereby incorporated by reference in its entirety.

BACKGROUND

A base station and a wireless device communicate via uplink and/or downlink communication. A base station and a wireless device communicate based on configuration parameters.

SUMMARY

The following summary presents a simplified summary of certain features. The summary is not an extensive overview and is not intended to identify key or critical elements.

Wireless communications may comprise communications between a base station and a wireless device. A wireless device may use one or more beams to communicate with the base station. The wireless device may have a capability to send uplink signal(s) to a plurality of devices and/or locations (e.g., a plurality of transmission and reception points (TRPs) of the base station, antennas and/or antenna panels, access points, etc.). Beam failure recovery (BFR) may be performed if a beam failure occurs for a first device/location (e.g., first TRP). After the BFR has completed, a wireless device may determine, based on one or more candidate beams, a transmission power and/or a new beam for the device/location (e.g., first TRP). The transmission power and/or the new beam for the first device/location (e.g., first TRP) may not be efficient to use for a second device/location (e.g., second TRP) (e.g., if locations of the first TRP and the second TRP are different). Instead, after a beam failure on a first device/location, the wireless device may continue to use an activated beam for the second device/location (e.g., to determine a transmission power for uplink signals to the second device/location), which may provide increased efficiencies for communications between the wireless device and the base station.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 12A shows examples of downlink beam management procedures.
FIG. 12B shows examples of uplink beam management procedures.
FIG. 13A shows an example four-step random access procedure.
FIG. 13B shows an example two-step random access procedure.
FIG. 13C shows an example two-step random access procedure.
FIG. 16A, FIG. 16B, FIG. 16C, and FIG. 16D show examples of uplink and downlink signal transmission.

DETAILED DESCRIPTION

Figure 1A:
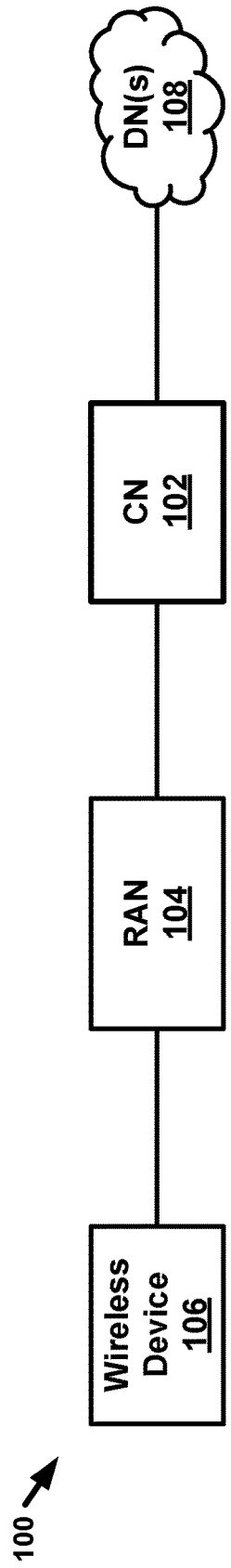
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to sidelink communications between two wireless devices.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
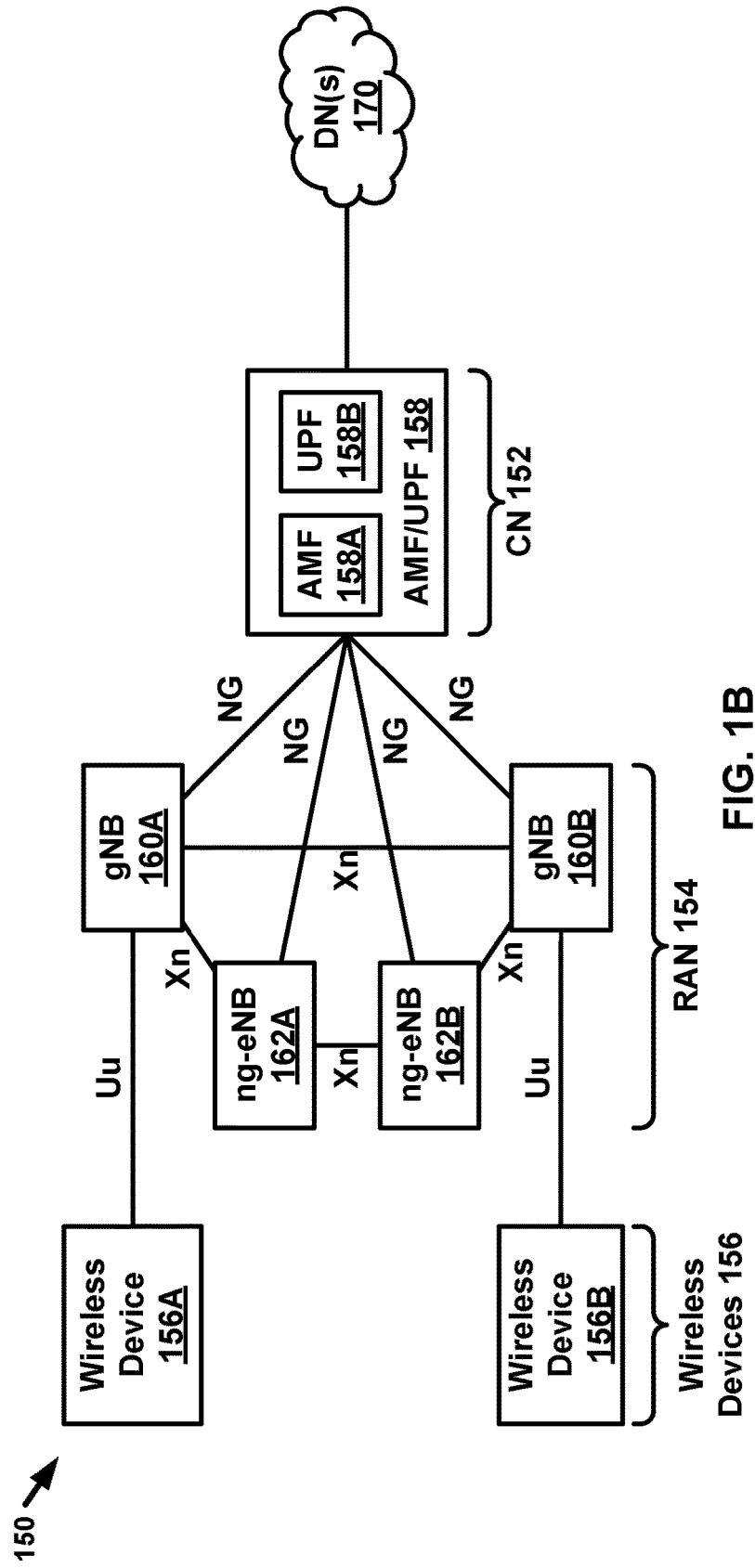

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
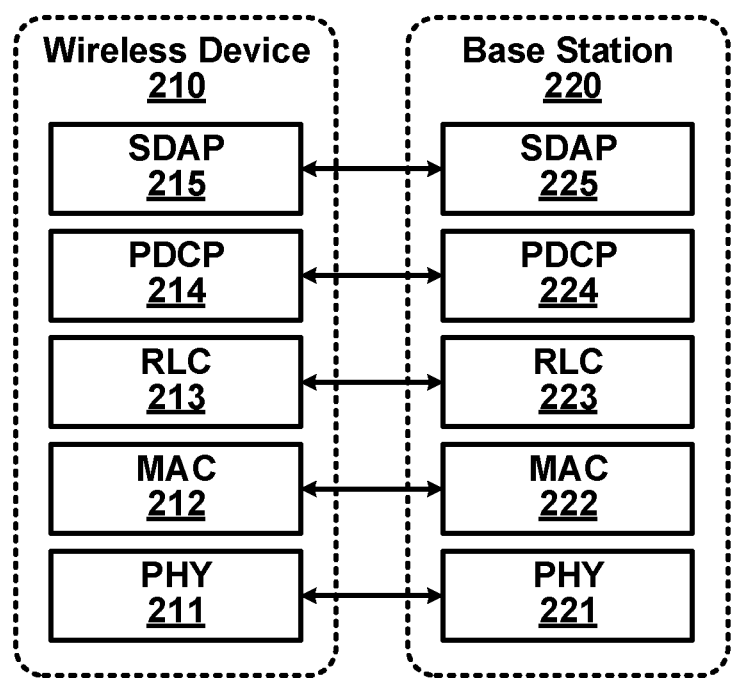
FIG. 2A shows an example user plane.
Figure 2B:
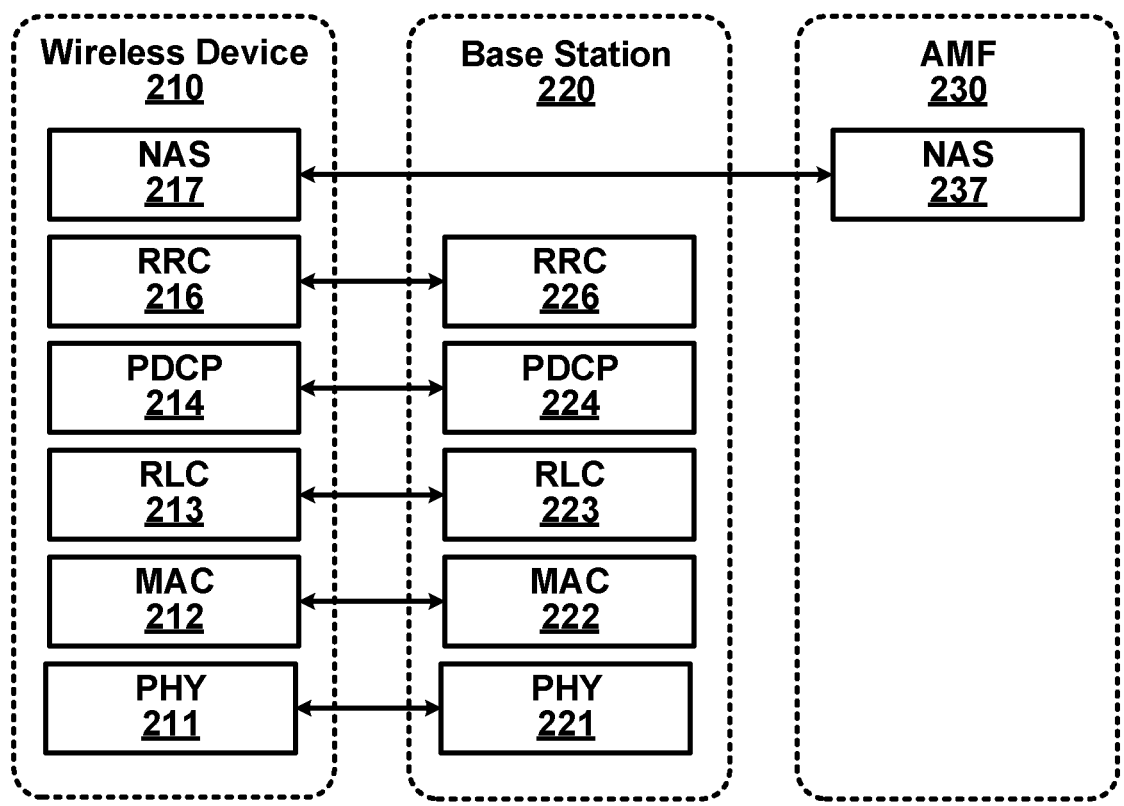
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
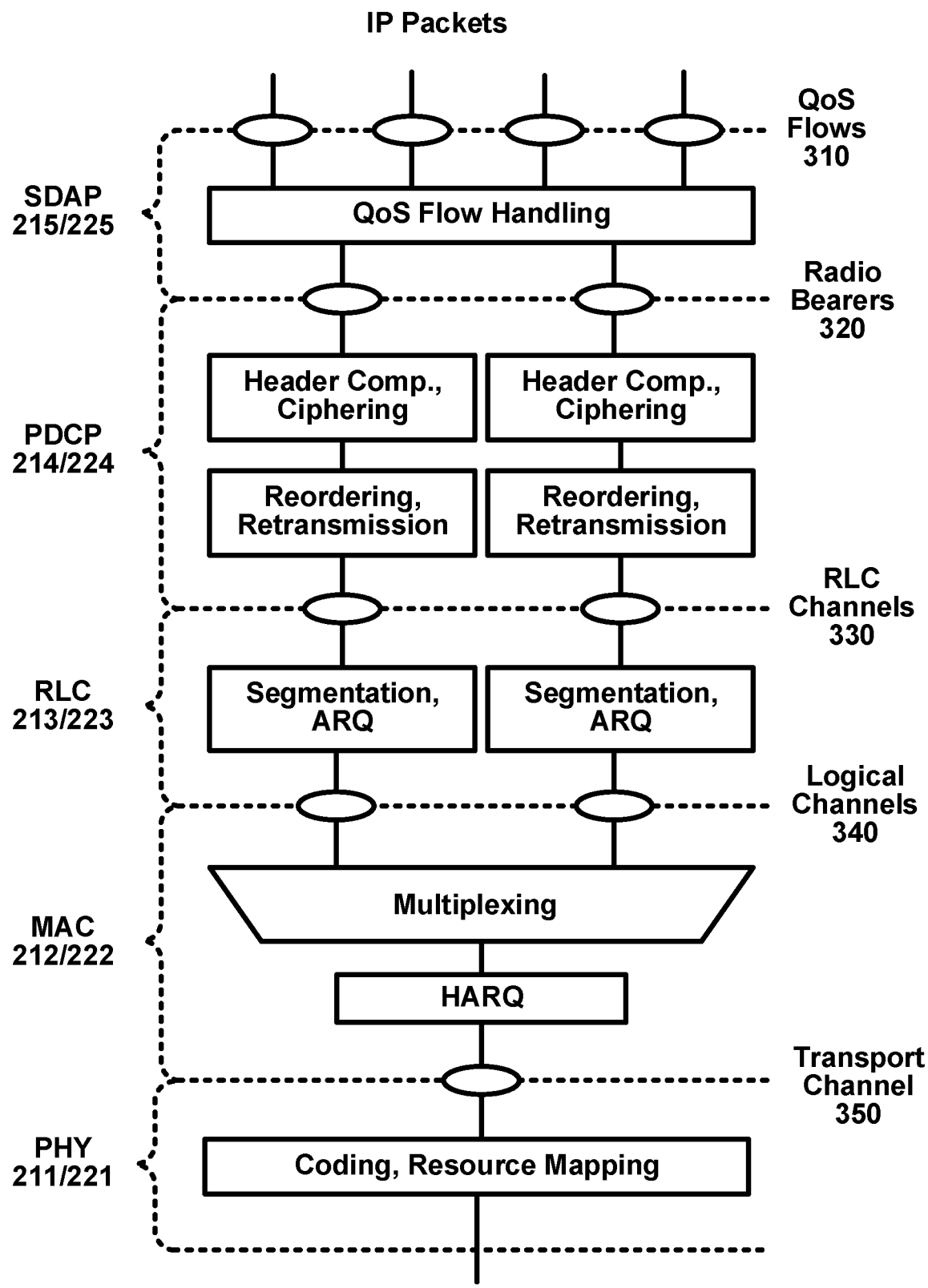
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be sent/transmitted over the air interface, ciphering/deciphering to prevent unauthorized decoding of data sent/transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
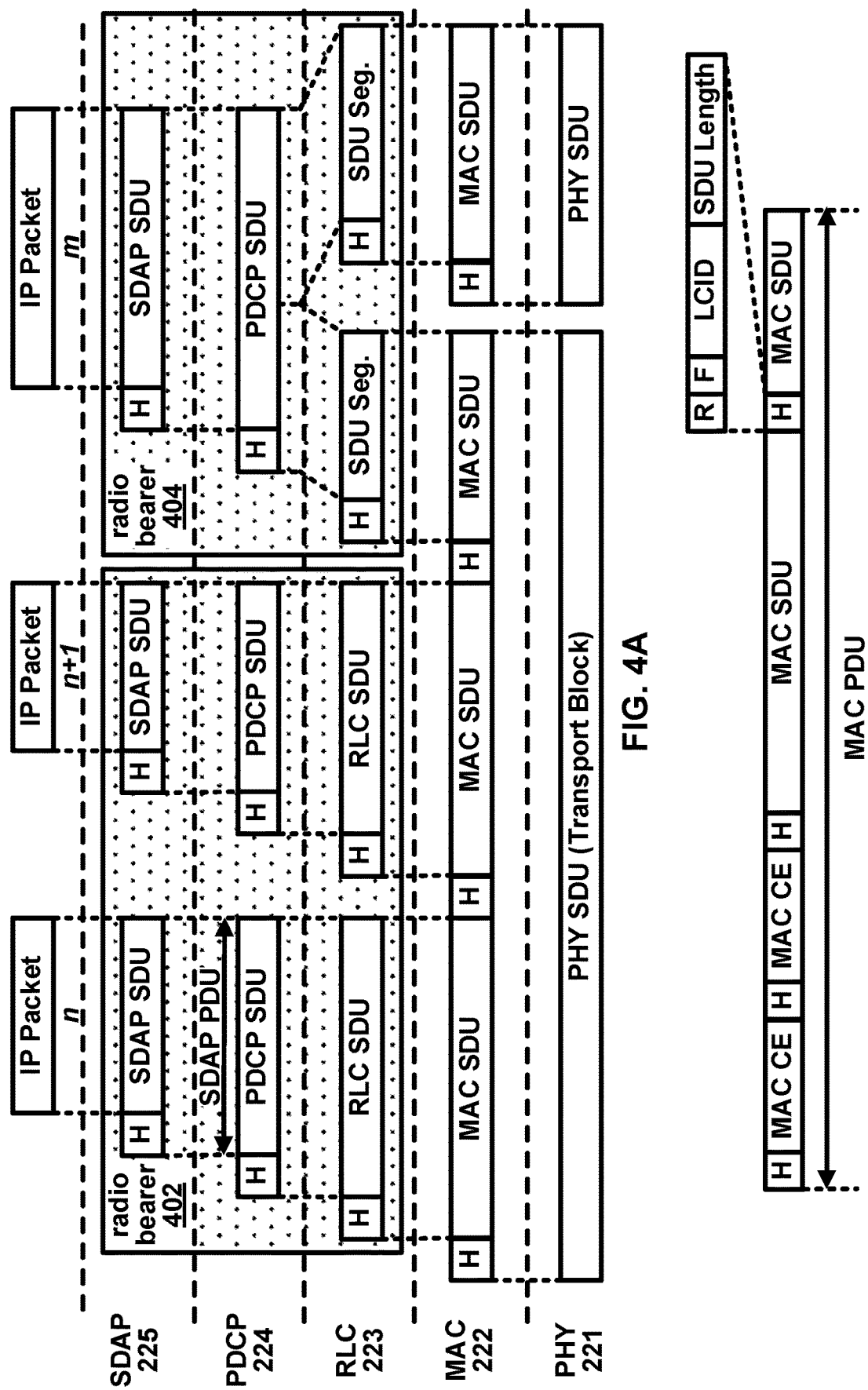
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
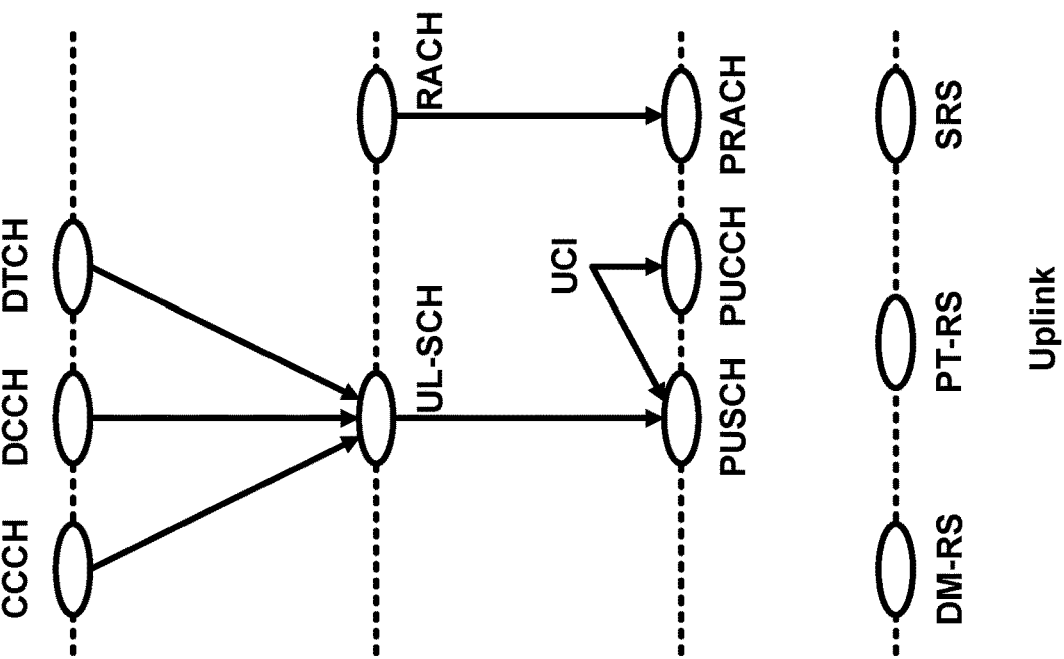
FIG. 5B shows an example mapping for uplink channels.
Figure 5A:
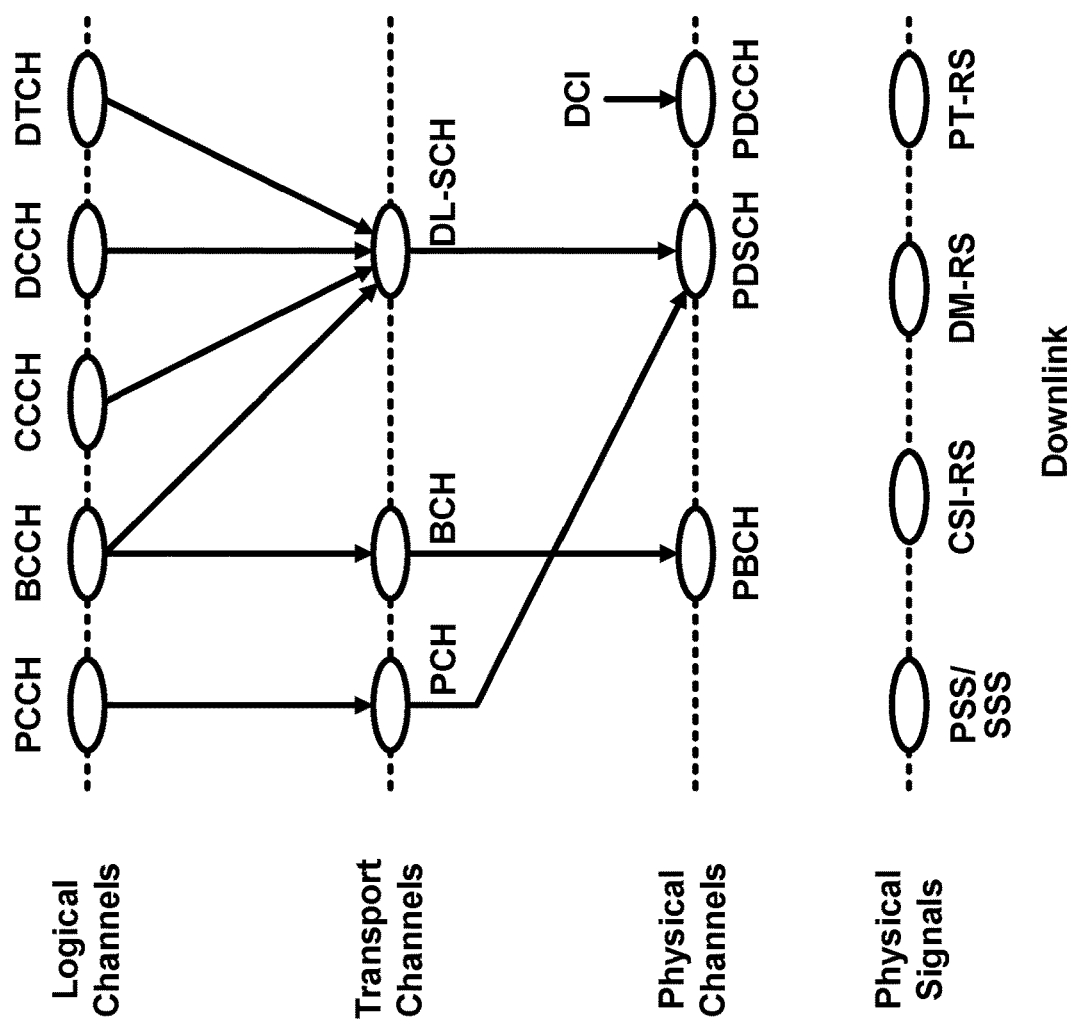
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
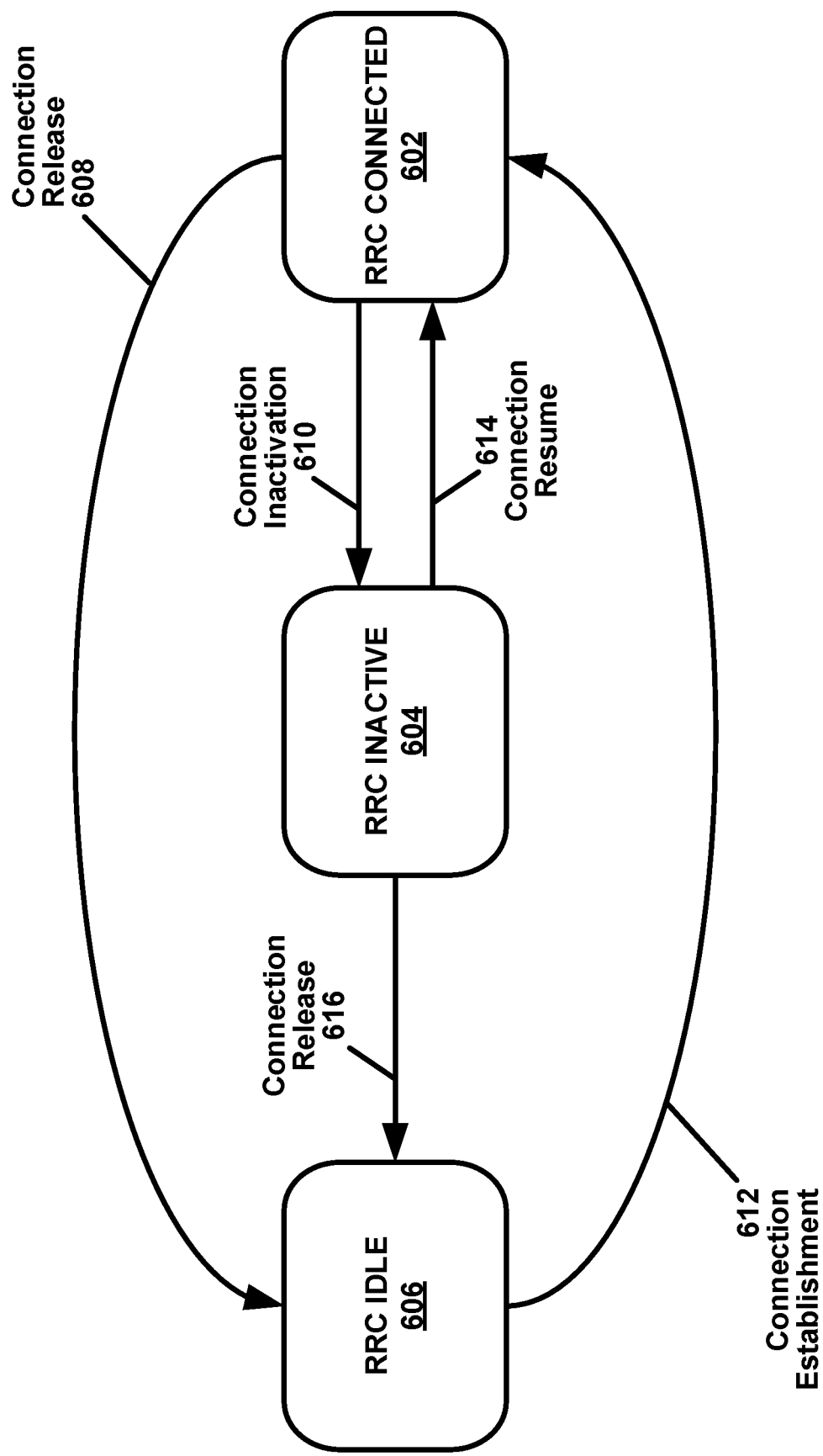
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g., instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
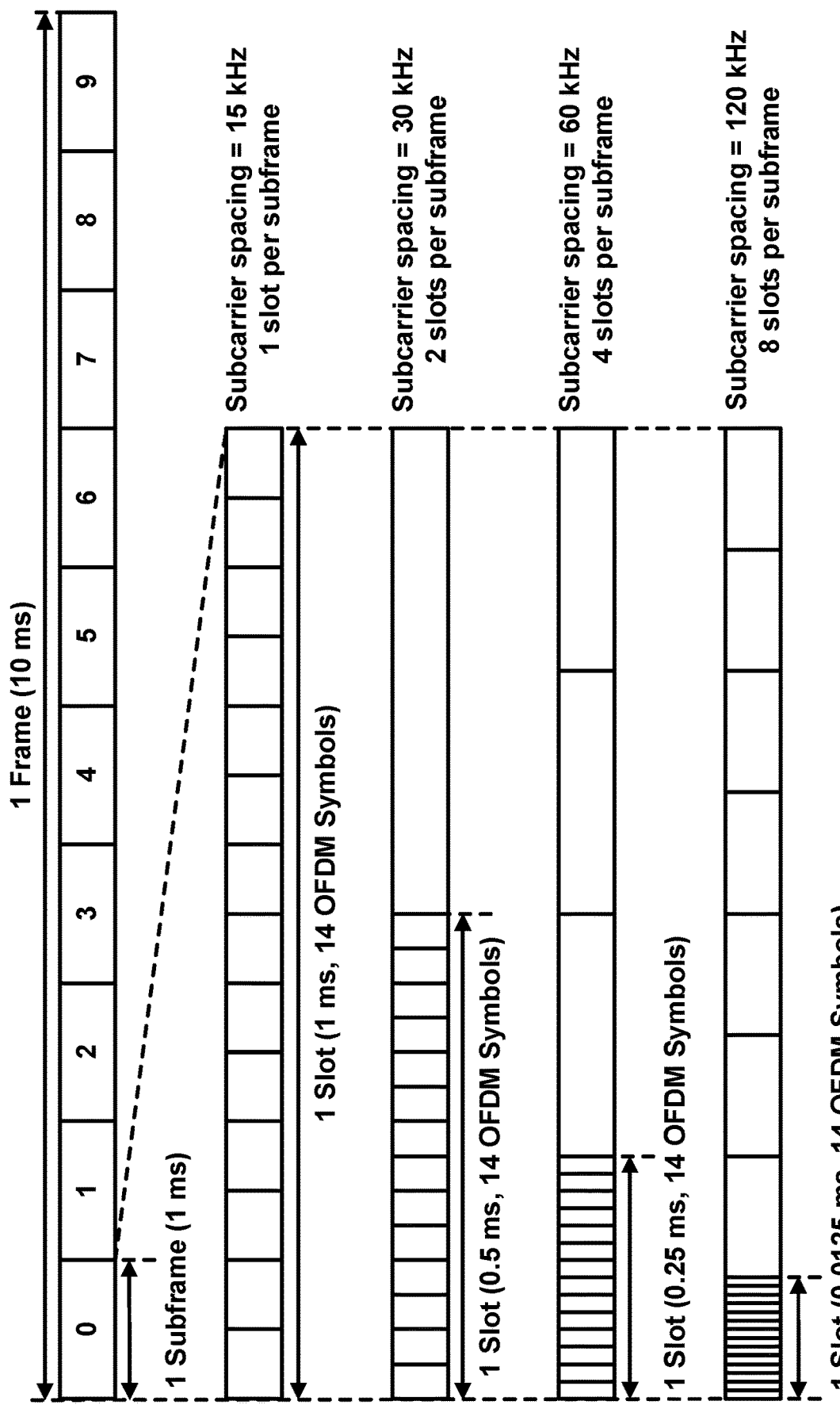
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
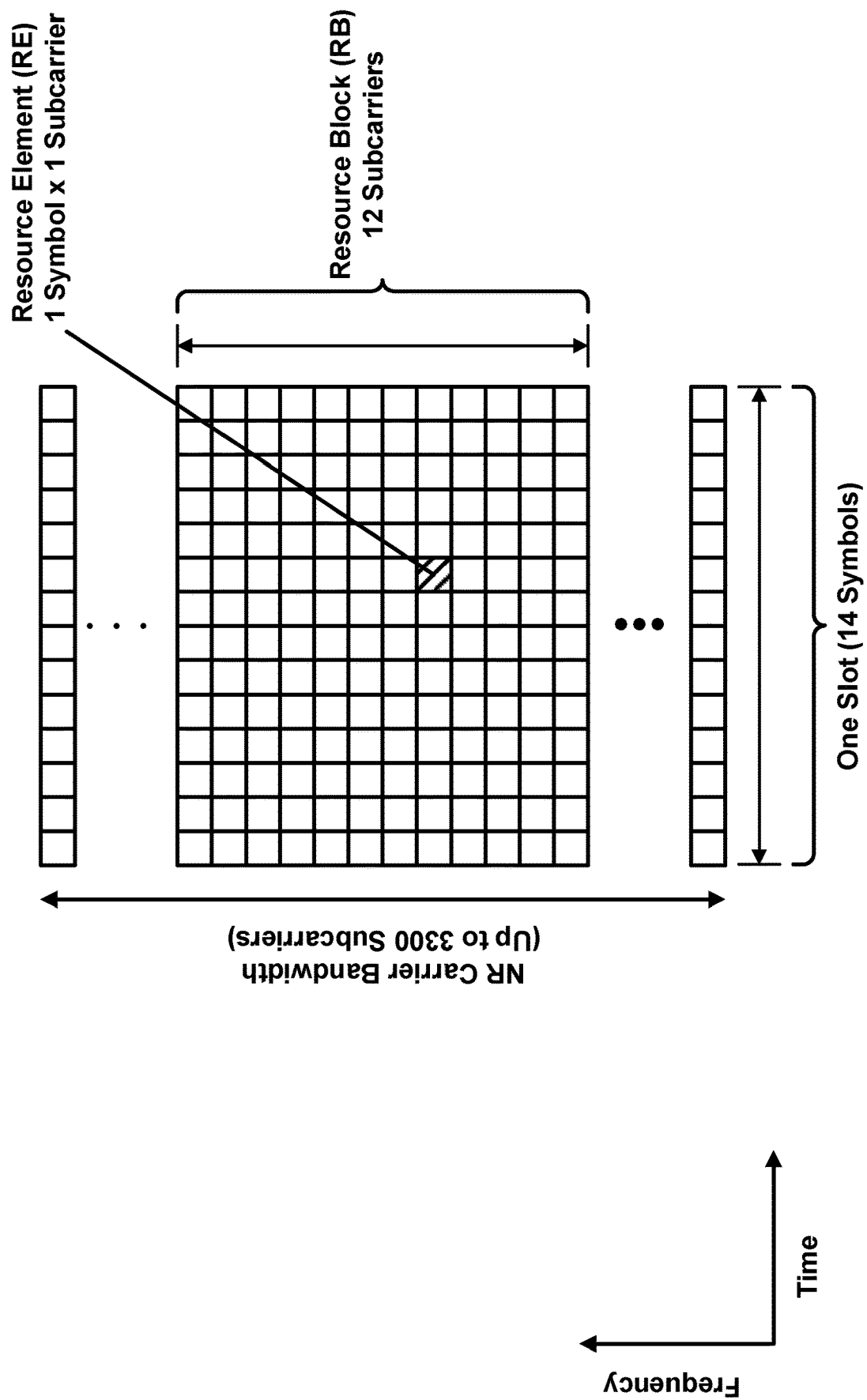
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
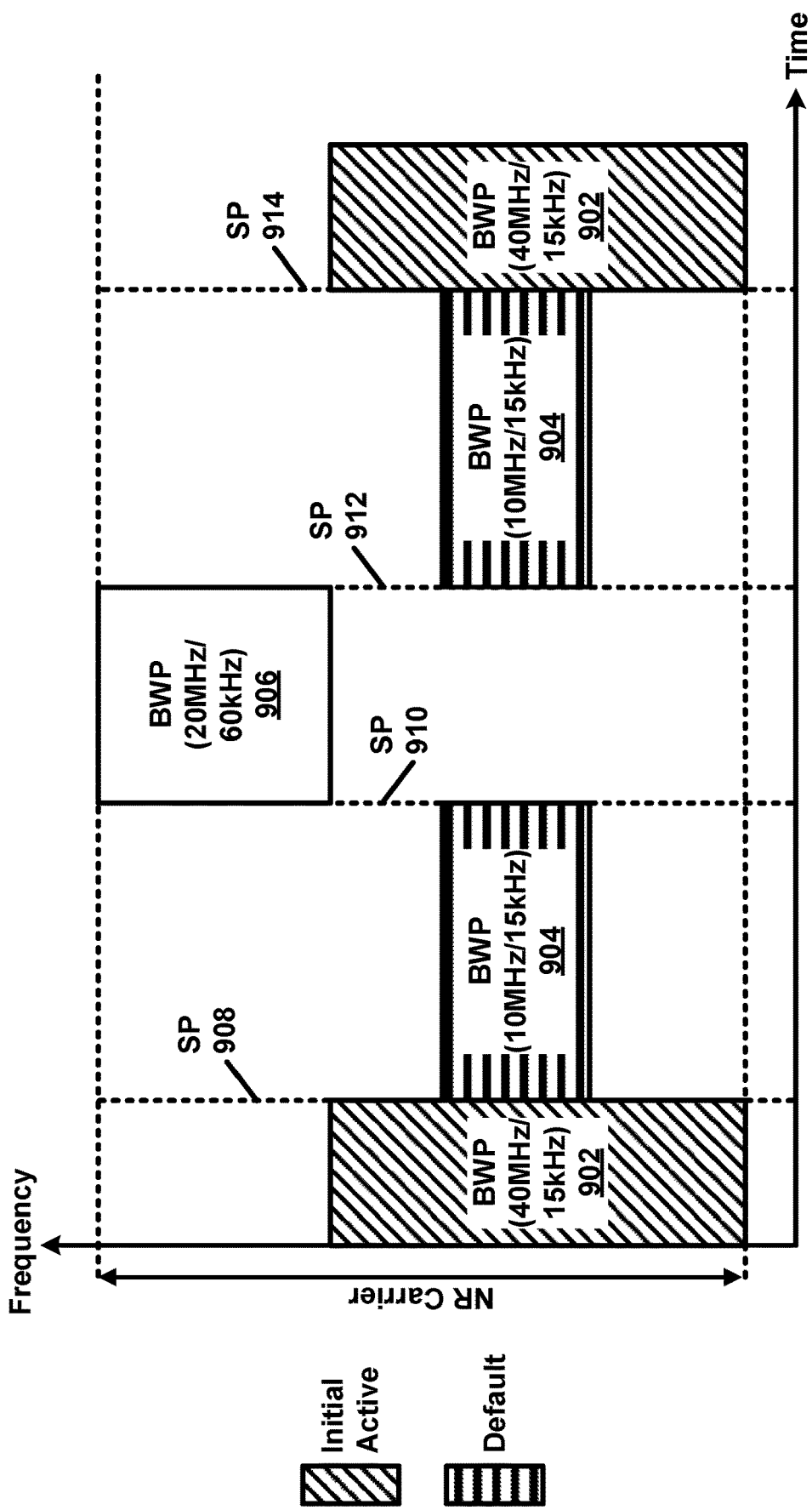
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
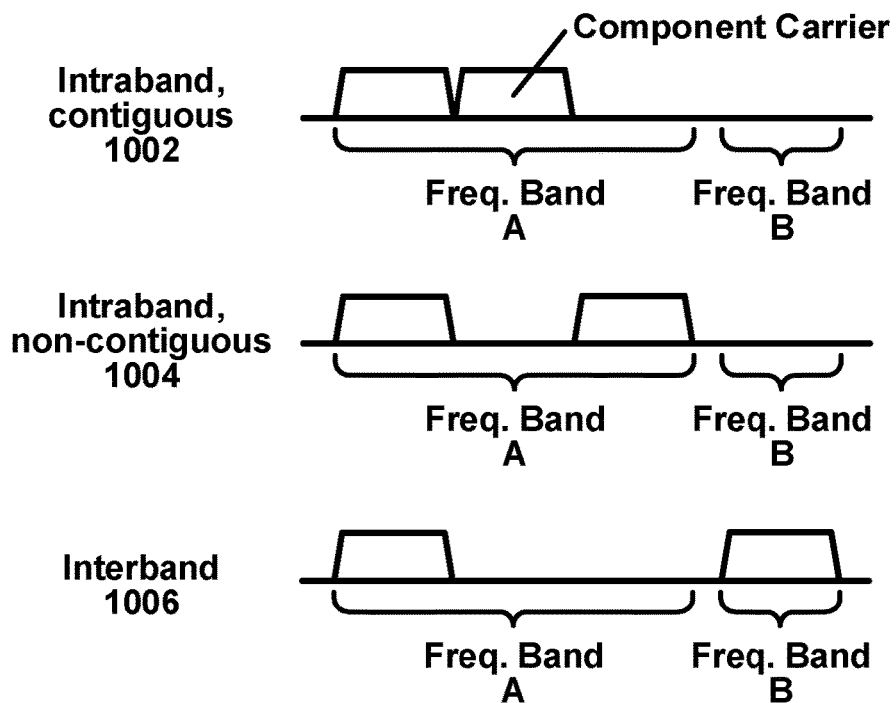
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
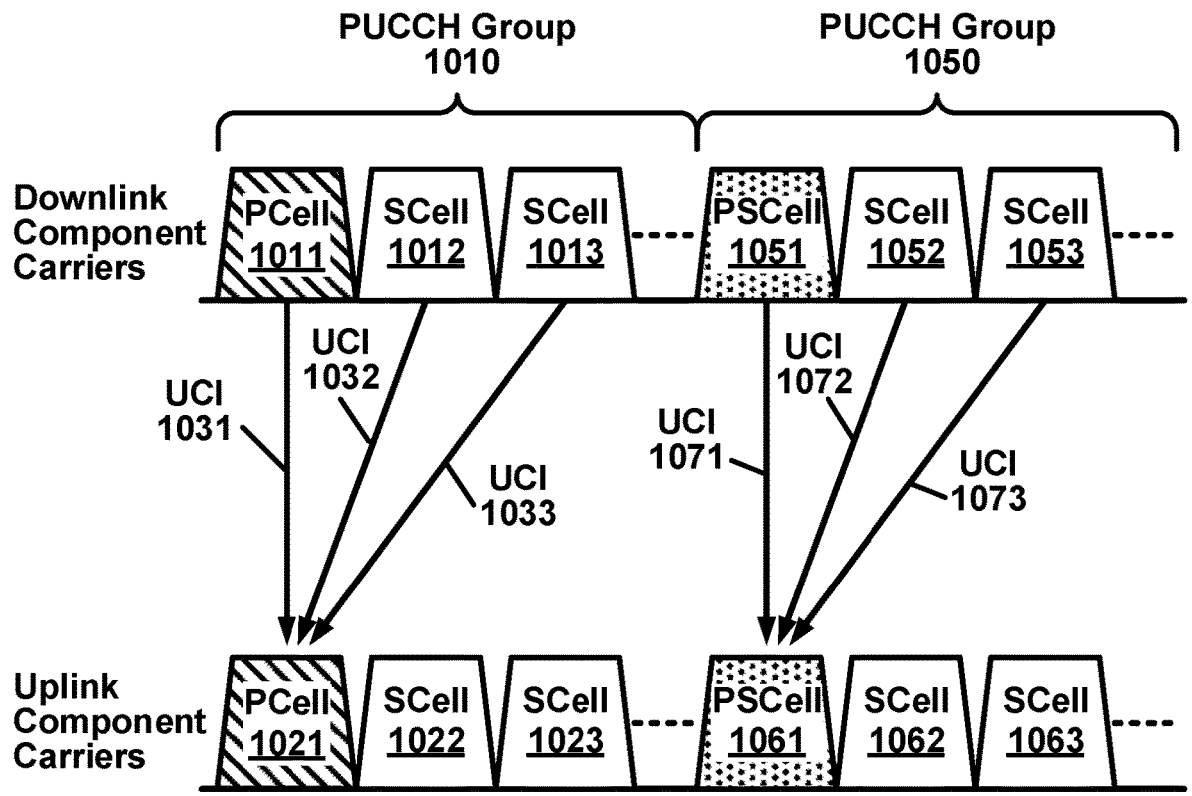
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
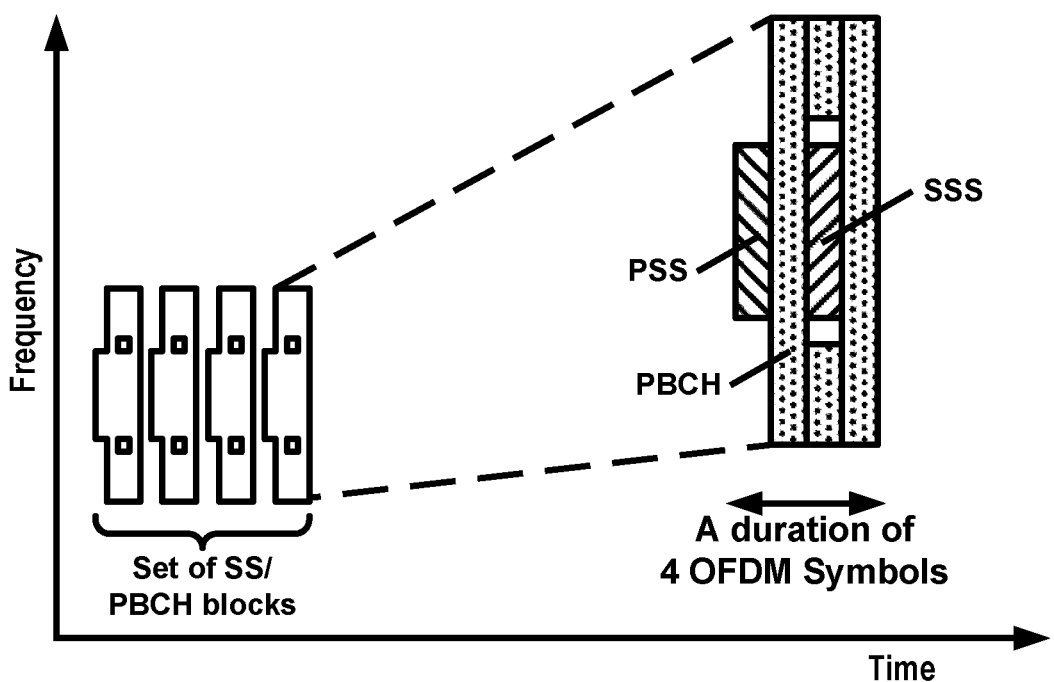
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g., a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
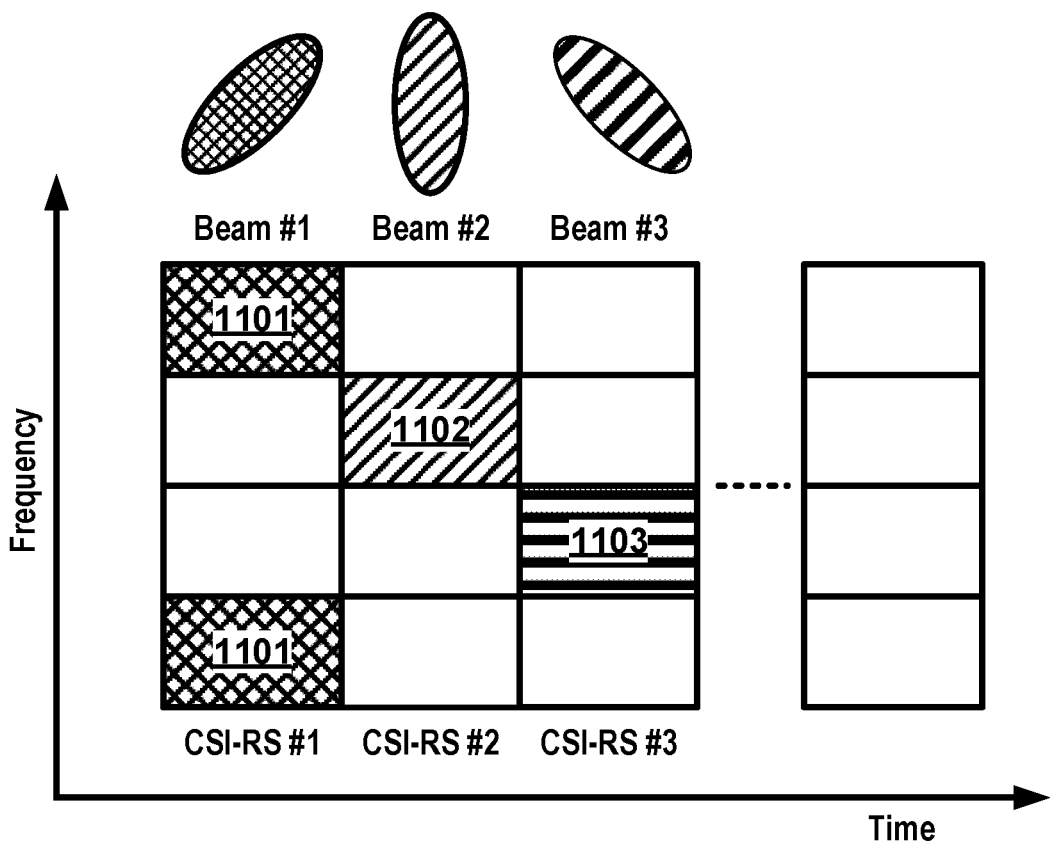
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to send/transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCJ states to the wireless device (e.g., via RRC signaling, a MAC CE, and/or DCI). The wireless device may receive a downlink transmission with an Rx beam determined based on the one or more TCJ states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

RA-RNTI=1+$s\_id$+14×$t\_id$+14×80×$f\_id$+14×80×8×$u\_carrier\_id$ where $s\_id$ may be an index of a first OFDM symbol of the PRACH occasion (e.g., 0≤$s\_id$<14), $t\_id$ may be an index of a first slot of the PRACH occasion in a system frame (e.g., 0≤$t\_id$<80), $f\_id$ may be an index of the PRACH occasion in the frequency domain (e.g., 0≤$f\_id$<8), and $ul\_carrier\_id$ may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1

1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC- PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
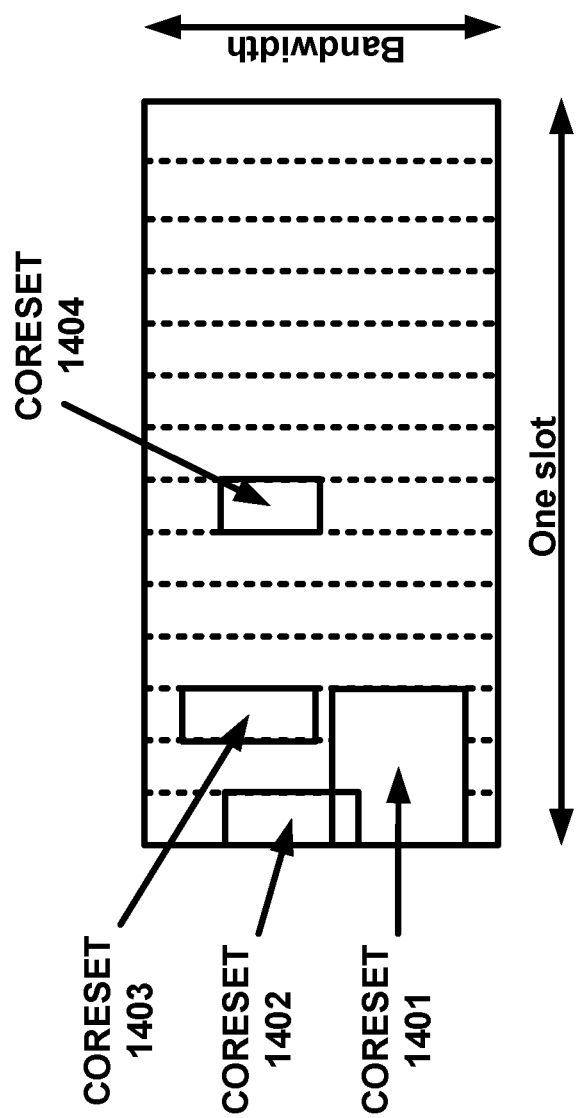
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
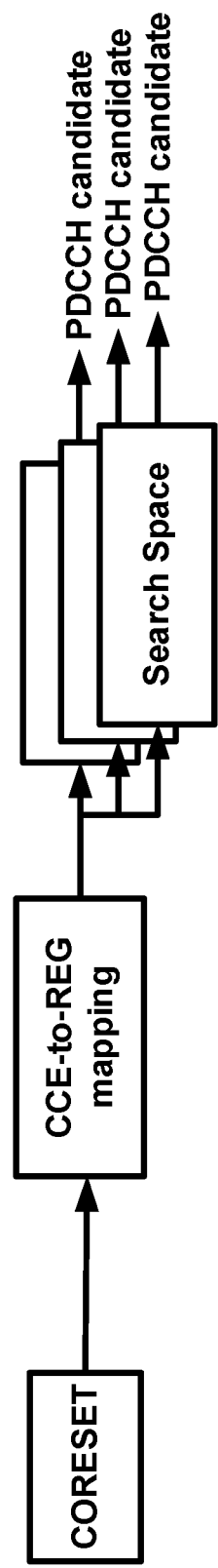
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/ via four or more symbols and the number of HARQ-ACK/ SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
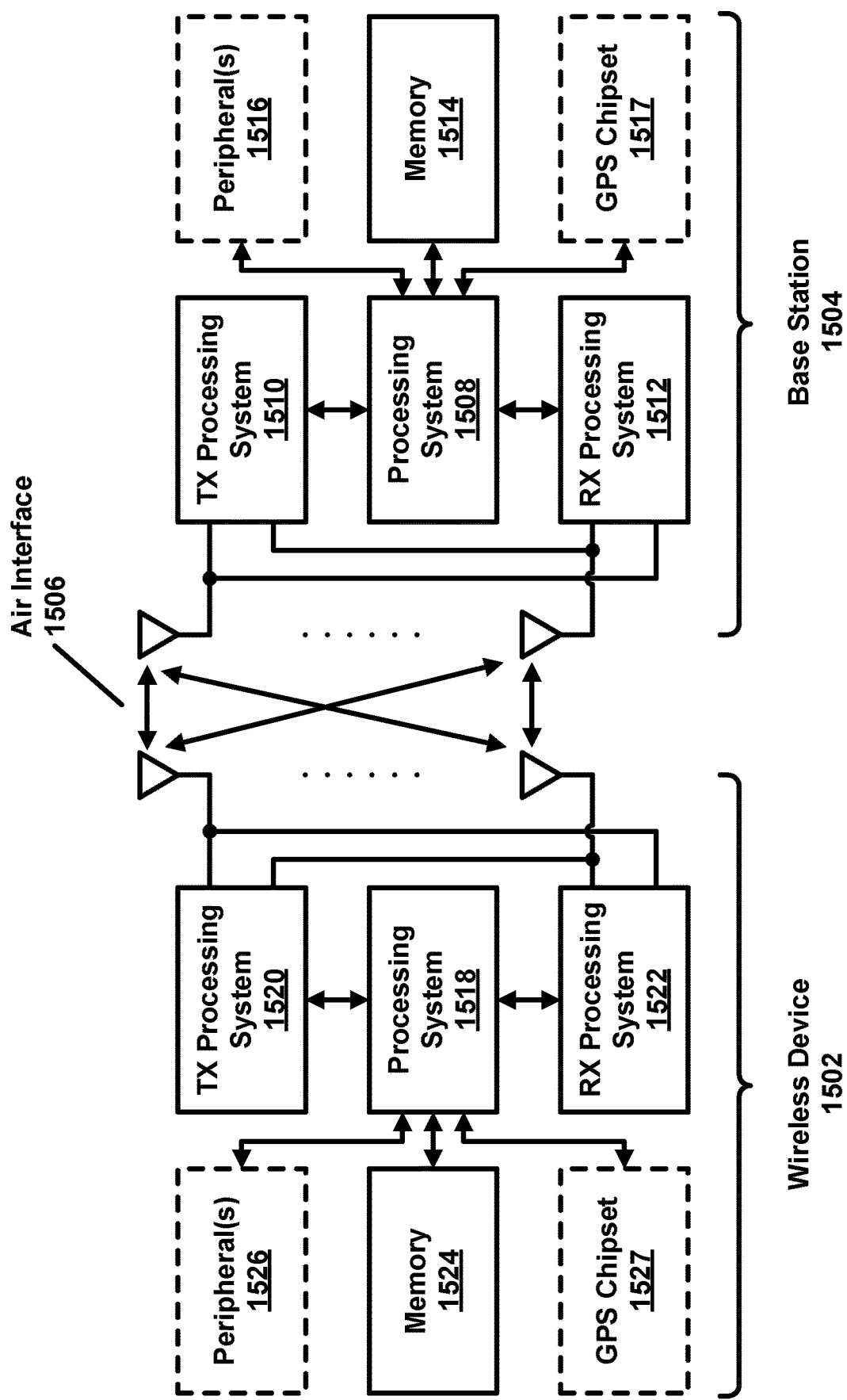
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
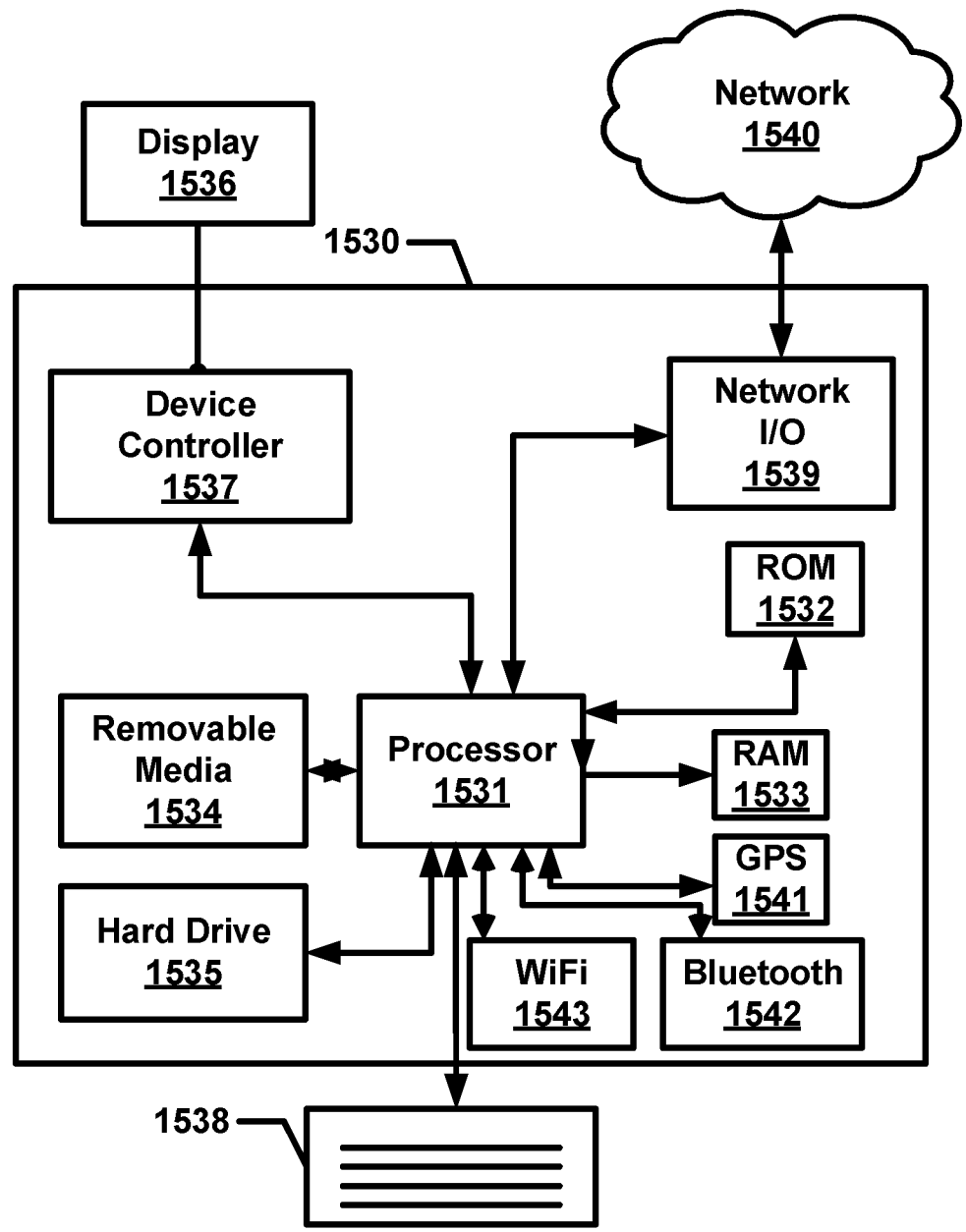
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g., RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g., as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may configure a wireless device with one or more first RSs (e.g., SS/PBCH block, CSI-RS, etc.). A base station may configure a wireless device with one or more first RSs (e.g., SS/PBCH block, CSI-RS, etc.), for example, for beam failure detection. The wireless device may declare/detect a beam failure. The wireless device may declare/detect a beam failure, for example, based on the one or more first RSs. The wireless device may declare/detect a beam failure. The wireless device may declare/detect a beam failure, for example, if a number of beam failure instance (BFI) indications from a physical layer of the wireless device to a higher layer (e.g., MAC layer) of the wireless device reaches a configured threshold (e.g., beamFailureInstanceMaxCount). The wireless device may declare/detect a beam failure, for example, based on (e.g., before) an expiry of a configured timer (e.g., beamFailureDetectionTimer).

An SSB (e.g., cell-defining SSB) may be associated with an initial downlink BWP of a cell. The wireless device may detect a beam failure. The wireless device may detect a beam failure, for example, based on the SSB. The wireless device may detect a beam failure, for example, if the SSB is (e.g., based on and/or in response to the SSB being) associated with the initial downlink BWP. The base station may configure the SSB, for detecting the beam failure, for the initial downlink BWP. A downlink BWP of the cell may comprise the SSB. The base station may configure the SSB, for detecting the beam failure, for the downlink BWP, for example, based on the downlink BWP comprising the SSB. The one or more first RSs may comprise the SSB.

A downlink BWP of the cell may not comprise the SSB. The wireless device may detect a beam failure for the downlink BWP. The wireless device may detect a beam failure for the downlink BWP, for example, based on the downlink BWP not comprising the SSB. The wireless device may detect a beam failure for the downlink BWP, for example, based on one or more CSI-RSs. The one or more first RSs may comprise the one or more CSI-RSs.

A wireless device may trigger a BFR. A wireless device may trigger a BFR, for example, by initiating a random access procedure on a primary cell. A wireless device may trigger a BFR, for example, based on detecting a beam failure. A wireless device may select/determine a suitable/candidate beam for a BFR. A wireless device may select/determine a suitable/candidate beam for a BFR, for example, based on detecting a beam failure. The wireless device may determine that the BFR is complete. The wireless device may determine that the BFR is complete, for example, based on completion of the random access procedure.

A base station may configure a medium-access control (MAC) entity of a wireless device. A base station may configure a medium-access control (MAC) entity of a wireless device, for example, with a BFR procedure by an RRC. The wireless device may detect a beam failure. The wireless device may detect a beam failure, for example, based on one or more first RSs (e.g., SSB, CSI-RS). The BFR procedure may be used for indicating to the base station of a candidate RS (e.g., SSB or CSI-RS). The BFR procedure may be used for indicating to the base station of a candidate RS (e.g., SSB or CSI-RS), for example, if the wireless device detects the beam failure. The wireless device may detect the beam failure, for example, based on counting/determining a BFI indication from a lower layer of the wireless device (e.g., PHY layer) to the base station (e.g., a MAC entity of the base station)

A base station may reconfigure an information element (IE) (e.g., beamFailureRecoveryConfig) in an ongoing random access procedure. A base station may reconfigure an IE (e.g., beamFailureRecoveryConfig) in an ongoing random access procedure, for example, for a BFR. The base station (e.g., a MAC entity of the base station) may stop the ongoing random access procedure. The base station (e.g., a MAC entity of the base station) may stop the ongoing random access procedure, for example, based on reconfiguring the IE (e.g., beamFailureRecoveryConfig). The wireless device may initiate a second random access procedure for the BFR using/with the reconfigured IE (e.g., beamFailureRecoveryConfig). The wireless device may initiate a second random access procedure for the BFR using/with the reconfigured IE (e.g., beamFailureRecoveryConfig), for example, based on stopping the ongoing random access procedure.

An RRC message may configure a wireless device with one or more parameters. An RRC message may configure a wireless device with one or more parameters, for example, in a BFR parameter (e.g., BeamFailureRecoveryConfig) and/or in a radio link monitoring parameters (e.g., RadioLinkMonitoringConfig) for a beam failure detection and recovery procedure. The one or more parameters may comprise at least one of: beamFailureInstanceMaxCount for a beam failure detection; beamFailureDetectionTimer for the beam failure detection; beamFailureRecoveryTimer for a BFR; rsrp-ThresholdSSB: an RSRP threshold for the BFR; PowerRampingStep for the BFR; powerRampingStepHighPriority for the BFR; preambleReceivedTargetPower for the BFR; preambleTransMax for the BFR; scalingFactorBI for the BFR; ssb-perRACH-Occasion for the BFR; ra-OccasionList for the BFR; ra-ssb-OccasionMaskIndex for the BFR; prach-ConfigurationIndex for the BFR; and ra-ResponseWindow. The ra-ResponseWindow may be a time window to monitor at least one response (e.g., RAR, BFR response) for the BFR. The wireless device may use a contention-free random-access preamble for the BFR.

A wireless device may use at least one wireless device variable for a beam failure detection. BFI_COUNTER may be one of the at least one wireless device variable. The BFI_COUNTER may be a counter for a BFI indication. The wireless device may set the BFI_COUNTER initially to zero.

A wireless device (e.g., a MAC entity of a wireless device) may receive a BFI indication. A wireless device (e.g., a MAC entity of a wireless device) may receive a BFI indication, for example, from a lower layer (e.g., PHY) of the wireless device. The wireless device (e.g., MAC entity of the wireless device) may start or restart a BFR timer (e.g., beamFailureDetectionTimer). The wireless device (e.g., MAC entity of the wireless device) may start or restart a BFR timer (e.g., beamFailureDetectionTimer), for example, based on receiving the BFI indication. The wireless device (e.g., MAC entity of the wireless device) may increment a BFI counter (e.g., BFI_COUNTER) by one or any other value. The wireless device (e.g., MAC entity of the wireless device) may increment a BFI counter (e.g., BFI_ COUNTER) by one (or any other value), for example, based on receiving the BFI indication.

A BFI counter (e.g., BFI_COUNTER) may be equal to or greater than a BFI maximum (e.g., the beamFailureInstanceMaxCount). The wireless device (e.g., MAC entity of the wireless device) may initiate a random access procedure (e.g., on an SpCell) for a BFR. The wireless device (e.g., MAC entity of the wireless device) may initiate a random access procedure (e.g., on an SpCell) for a BFR, for example, based on the BFI counter (e.g., BFI_COUNTER) being equal to or greater than BFI maximum (e.g., the beamFailureInstanceMaxCount).

The wireless device may initiate the random access procedure. The wireless device may initiate the random access procedure, for example, if the BFI counter (e.g., BFI_ COUNTER) is equal to or greater than a particular BFI value (e.g., the beamFailureInstanceMaxCount) (e.g., 3, or any other quantity).

The wireless device may select/determine an uplink carrier (e.g., SUL, NUL) to perform the random access procedure. The wireless device may select/determine an uplink carrier (e.g., SUL, NUL) to perform the random access procedure, for example, for the BFR. The base station may configure an active uplink BWP of the selected uplink carrier with a BFR configuration parameter and/or IE (e.g., beamFailureRecoveryConfig). The wireless device may start a BFR timer (e.g., beamFailureRecoveryTimer). The wireless device may start the BFR timer (e.g., beamFailureRecoveryTimer), for example, if the wireless device initiates the random access procedure for the BFR. The wireless device may start the BFR timer (e.g., beamFailureRecoveryTimer), for example, based on the active uplink BWP of the selected uplink carrier being configured with a BFR configuration parameter and/or IE (e.g., beamFailureRecoveryConfig). The wireless device may start a BFR timer (e.g., beamFailureRecoveryTimer), for example, if configured. The wireless device may use one or more parameters (e.g., powerRampingStep, preambleReceivedTargetPower, and preambleTransMax) that may be configured in a BFR configuration parameter and/or IE (e.g., BeamFailureRecoveryConfig) for the random access procedure. The wireless device may use one or more parameters (e.g., powerRampingStep, preambleReceivedTargetPower, and preambleTransMax) for the random access procedure, for example, if the wireless device initiates the random access procedure for the BFR. The wireless device may use one or more parameters (e.g., powerRampingStep, preambleReceivedTargetPower, and preambleTransMax) for the random access procedure, for example, based on the active uplink BWP of the selected uplink carrier being configured with a BFR configuration parameter and/or IE (e.g., beamFailureRecoveryConfig).

The base station may configure a power ramping parameter (e.g., powerRampingStepHighPriority) in a BFR configuration parameter and/or IE (e.g., beamFailureRecoveryConfig). The wireless device may set a preamble power ramping step (e.g., PREAMBLE_POWER_RAMPING_STEP) to a power ramping parameter (e.g., powerRampingStepHighPriority). The wireless device may set a preamble power ramping step (e.g., PREAMBLE_POWER_RAMPING_STEP) to a power ramping parameter (e.g., powerRampingStepHighPriority), for example, if the wireless device initiates the random access procedure for the BFR and/or if the active uplink BWP of the selected uplink carrier is configured with a BFR configuration parameter and/or IE (e.g., beamFailureRecoveryConfig). The wireless device may set a preamble power ramping step (e.g., PREAMBLE_POWER_RAMPING_STEP) to a power ramping parameter (e.g., powerRampingStepHighPriority), for example, based on a power ramping parameter (e.g., powerRampingStepHighPriority) being configured in a BFR configuration parameter and/or IE (e.g., beamFailureRecoveryConfig).

The base station may not configure a power ramping parameter (e.g., powerRampingStepHighPriority) in a BFR configuration parameter and/or IE (e.g., beamFailureRecoveryConfig). The wireless device may set a preamble power ramping step (e.g., PREAMBLE_POWER_RAMPING_STEP) to a parameter (e.g., powerRampingStep). The wireless device may set a preamble power ramping step (e.g., PREAMBLE_POWER_RAMPING_STEP) to a parameter (e.g., powerRampingStep), for example, if the wireless device initiates the random access procedure for the BFR and the active uplink BWP of the selected uplink carrier is configured with a BFR configuration parameter and/or IE (e.g., beamFailureRecoveryConfig). The wireless device may set a preamble power ramping step (e.g., PREAMBLE_POWER_RAMPING_STEP) to a parameter (e.g., powerRampingStep), for example, based on the preamble power ramping step (e.g., powerRampingStepHighPriority) not being configured in the BFR configuration parameter and/or IE (e.g., beamFailureRecoveryConfig).

A base station may configure a scaling factor (e.g., scalingFactorBI) in a parameter and/or IE (e.g., beamFailureRecoveryConfig). The wireless device may set a scaling factor (e.g., SCALING_FACTOR_BI) to another scaling factor (e.g., scalingFactorBI). The wireless device may set a scaling factor (e.g., SCALING_FACTOR_BI) to another scaling factor (e.g., scalingFactorBI), for example, if the wireless device initiates the random access procedure for the BFR and/or if the active uplink BWP of the selected uplink carrier is configured with a BFR configuration parameter and/or IE (e.g., beamFailureRecoveryConfig). The wireless device may set a scaling factor (e.g., SCALING_FACTOR_BI) to another scaling factor (e.g., scalingFactorBI), for example, based on the other scaling factor (e.g., scalingFactorBI) being configured in a BFR configuration parameter and/or IE (e.g., beamFailureRecoveryConfig).

The base station may configure the active uplink BWP of the selected uplink carrier. The base station may configure the active uplink BWP of the selected uplink carrier, for example, with the BFR configuration parameter and/or IE (e.g., beamFailureRecoveryConfig). The random access procedure may be a contention-free random access procedure.

The random access procedure may be a contention-free random access procedure, for example, based on the active uplink BWP of the selected uplink carrier being configured with a BFR configuration parameter and/or IE (e.g., beamFailureRecoveryConfig).

The base station may not configure the active uplink BWP of the selected uplink carrier. The base station may not configure the active uplink BWP of the selected uplink carrier, for example, with the BFR configuration parameter and/or IE (e.g., beamFailureRecoveryConfig). The random access procedure may be a contention-based random access procedure. The random access procedure may be a contention-based random access procedure, for example, based on the active uplink BWP of the selected uplink carrier not being configured with a BFR configuration parameter and/or IE (e.g., beamFailureRecoveryConfig).

A BFR detection timer (e.g., beamFailureDetectionTimer) may expire. A wireless device (e.g., a MAC entity of the wireless device) may set a BFI counter (e.g., BFI_COUNTER) to zero. A wireless device (e.g., MAC entity of the wireless device) may set a BFI counter (e.g., BFI_COUNTER) to zero (or any other value), for example, based on a BFR detection timer (e.g., beamFailureDetectionTimer) expiring.

A base station may configure a wireless device with one or more first RSs (e.g., SS/PBCH block, CSI-RS, etc.). A base station may configure a wireless device with one or more first RSs (e.g., SS/PBCH block, CSI-RS, etc.), for example, for a beam failure detection (e.g., by RadioLink-MonitoringRS in the IE RadioLinkMonitoringConfig). The base station may reconfigure the BRF timer (e.g., beamFailureDetectionTimer) or the BFI maximum (e.g., beamFailureInstanceMaxCount) or at least one RS of the one or more first RSs by higher layers (e.g., RRC). The wireless device (e.g., MAC entity of the wireless device) may set a BFI counter (e.g., BFI_COUNTER) to zero (or any other value). The wireless device (e.g., MAC entity of the wireless device) may set the BFI counter (e.g., BFI_COUNTER) to zero (or any other value), for example, based on reconfiguring, a BFR detection timer (e.g., beamFailureDetectionTimer) and/or a BFI count (e.g., beamFailureInstanceMaxCount) and/or at least one RS of the one or more first RSs by a higher layer (e.g., RRC).

The wireless device may complete the random access procedure (e.g., contention-free random-access or contention-based random-access) for the BFR successfully. The wireless device may determine/consider that the BFR is successfully completed. The wireless device may determine/consider that the BFR is successfully completed, for example, based on completing the random access procedure successfully.

The wireless device may complete the random access procedure for the BFR successfully. The wireless device may stop a BFR timer (e.g., beamFailureRecoveryTimer). The wireless device may stop a BFR timer (e.g., beamFailureRecoveryTimer), for example, based on completing the random access procedure successfully. The wireless device may stop a BFR timer (e.g., beamFailureRecoveryTimer), for example, if configured. The wireless device may set the BFI counter (e.g., BFI_COUNTER) to zero (or any other value). The wireless device may set the BFI counter (e.g., BFI_COUNTER) to zero, for example, based on completing the random access procedure successfully.

The BFR timer (e.g., beamFailureRecoveryTimer) may be running. The base station may not configure the wireless device with the BFR timer (e.g., beamFailureRecoveryTimer). The base station may provide the wireless device with one or more second RSs (e.g., SS/PBCH blocks, periodic CSI-RSs, etc.). The base station may provide the wireless device with one or more second RSs (e.g., SS/PBCH blocks, periodic CSI-RSs, etc.), for example, for a BFR by a higher layer parameter (e.g., candidateBeamRSList) in a BFR configuration parameter and/or IE (e.g., beamFailureRecoveryConfig). The base station may provide the wireless device with one or more uplink resources (e.g., contention-free random-access resources). The base station may provide the wireless device with one or more uplink resources (e.g., contention-free random-access resources), for example, for a BFR request (BFRQ) used in the BFR by a higher layer (e.g., RRC) parameter (e.g., candidateBeamRSList, ssb-perRACH-Occasion, ra-ssb-OccasionMaskIndex in the IE beamFailureRecoveryConfig). An uplink resource of the one or more uplink resources may be associated with a candidate RS (e.g., SSB, CSI-RS) of the one or more second RSs. The association between the uplink resource and the candidate RS may be one-to-one.

At least one RS among the one or more second RSs may have an RSRP (e.g., SS-RSRP, CSI-RSRP) higher than a second threshold (e.g., rsrp-ThresholdSSB, rsrp-Threshold-CSI-RS). The wireless device may select/determine a candidate RS among the at least one RS for the BFR. The candidate RS may be a CSI-RS. There may be no random access preamble index (e.g., ra-PreambleIndex) associated with the candidate RS. The wireless device (e.g., MAC entity of the wireless device) may set a preamble index (e.g., PREAMBLE_INDEX) to a random access preamble index (e.g., ra-PreambleIndex). The wireless device (e.g., MAC entity of the wireless device) may set a preamble index (e.g., PREAMBLE_INDEX) to a random access preamble index (e.g., ra-PreambleIndex), for example, based on the candidate RS being the CSI-RS and no random access preamble index (e.g., ra-PreambleIndex) being associated with the candidate RS. The random access preamble index (e.g., ra-PreambleIndex) may be associated/corresponding to an SSB in the one or more second RSs (e.g., indicated candidateBeamRSList). The SSB may be QCLed with the candidate RS.

The candidate RS may be a CSI-RS. There may be a random access preamble index (e.g., ra-PreambleIndex) associated with the candidate RS. The candidate RS may be an SSB. The wireless device (e.g., a MAC entity of the wireless device) may set preamble index (e.g., PREAMBLE_INDEX) to a random access preamble index (e.g., ra-PreambleIndex). The wireless device (e.g., a MAC entity of the wireless device) may set preamble index (e.g., PREAMBLE_INDEX) to a random access preamble index (e.g., ra-PreambleIndex), for example, associated/corresponding to the candidate RS. The wireless device (e.g., a MAC entity of the wireless device) may set preamble index (e.g., PREAMBLE_INDEX) to a random access preamble index (e.g., ra-PreambleIndex), for example, from a set of random-access preambles for the BFRQ. A higher layer (RRC) parameter may configure the set of random-access preambles. A higher layer (RRC) parameter may configure the set of random-access preambles, for example, for the BFRQ for the random access procedure for the BFR.

A wireless device (e.g., a MAC entity of the wireless device) may send (e.g., transmit) an uplink signal (e.g., contention-free random-access preamble) for the BFRQ. The wireless device (e.g., a MAC entity of the wireless device) may start a response window (e.g., ra-ResponseWindow configured in the IE BeamFailureRecoveryConfig) at a first PDCCH occasion from the end of the sending (e.g., transmitting) the uplink signal. The wireless device (e.g., a MAC entity of the wireless device) may start a response window (e.g., ra-ResponseWindow configured in the IE BeamFailureRecoveryConfig) at a first PDCCH occasion from the end of the sending (e.g., transmitting) the uplink signal, for example, based on sending (e.g., transmitting) the uplink signal. The wireless device may monitor at least one PDCCH on a search space (e.g., of an SpCell) indicated by an RRC message (e.g., recoverySearchSpaceId) for DCI. The wireless device may monitor at least one PDCCH on a search space (e.g., of an SpCell) indicated by an RRC message (e.g., recoverySearchSpaceId) for DCI, for example, based on sending (e.g., transmitting) the uplink signal. The wireless device may monitor at least one PDCCH on a search space (e.g., of an SpCell) indicated by an RRC message (e.g., recoverySearchSpaceId) for DCI, for example, if the response window is running. The DCI may be identified by an RNTI (e.g., C-RNTI, MCS-C-RNTI) of the wireless device.

The wireless device (e.g., a MAC entity of the wireless device) may receive a notification. The wireless device (e.g., a MAC entity of the wireless device) may receive a notification, for example, from a lower layer (e.g., PHY) of the wireless device. The wireless device (e.g., a MAC entity of the wireless device) may receive a notification, for example, of a reception of the DCI on the search space indicated by the RRC message (e.g., recoverySearchSpaceId). The wireless device may receive the DCI on a serving cell. The wireless device may send (e.g., transmit) the uplink signal via the serving cell. The DCI may be addressed to the RNTI (e.g., C-RNTI) of the wireless device. The wireless device may determine/consider the random access procedure being successfully completed. The wireless device may determine/consider the random access procedure being successfully completed, for example, based on receiving the notification and the DCI being addressed to the RNTI.

The wireless device may send (e.g., transmit) the uplink signal on an SpCell. The response window configured in the BFR configuration parameter and/or IE (e.g., beamFailureRecoveryConfig) may expire. The wireless device may not receive DCI (or a PDCCH transmission). The wireless device may not receive DCI (or a PDCCH transmission), for example, addressed to the RNTI of the wireless device on the search space indicated by an RRC message (e.g., recoverySearchSpaceId) on the serving cell (e.g., before the response window expires). The wireless device may consider a reception of an RAR (e.g., BFR response) unsuccessful. The wireless device may consider a reception of an RAR (e.g., BFR response) unsuccessful, for example, based on the response window expiring and not receiving the DCI. The wireless device may increment a transmission counter (e.g., PREAMBLE_TRANSMISSION_COUNTER) by one. The wireless device may increment a transmission counter (e.g., PREAMBLE_TRANSMISSION_ COUNTER) by one, for example, based on the response window expiring and not receiving the DCI. The transmission counter may be equal to a RACH parameter (e.g., preambleTransMax) plus one. The wireless device may indicate a random-access problem to upper layers (e.g., RRC). The wireless device may indicate a random-access problem to upper layers (e.g., RRC), for example, based on the transmission counter being equal to a RACH parameter (e.g., preambleTransMax) plus one and sending (e.g., transmitting) the uplink signal on the SpCell.

The wireless device (e.g., a MAC entity of the wireless device) may stop the response window (and hence monitoring for the RAR). The wireless device (e.g., a MAC entity of the wireless device) may stop the response window (and hence monitoring for the RAR), for example, based on successful reception of the RAR (e.g., the DCI addressed to the RNTI of the wireless device, BFR response). The wireless device (e.g., a MAC entity of the wireless device) may stop the response window (and hence monitoring for the RAR), for example, if the RAR comprises a random access preamble identifier that matches the sent (e.g., transmitted) preamble index (e.g., PREAMBLE_INDEX).

A wireless device (e.g., a MAC entity of the wireless device) may discard explicitly signalled contention-free random-access resources. A wireless device (e.g., a MAC entity of the wireless device) may discard explicitly signalled contention-free random-access resources, for example, based on completion of a random access procedure. A wireless device (e.g., a MAC entity of the wireless device) may discard explicitly signalled contention-free random-access resources, for example, except one or more uplink resources (e.g., contention-free random-access resources) for BFRQ.

A base station may provide a wireless device with a first set of resource configuration indexes (e.g., periodic CSI-RS resource configuration indexes). A base station may provide a wireless device with a first set of resource configuration indexes (e.g., periodic CSI-RS resource configuration indexes), for example, for a serving cell (e.g., primary cell, secondary cell). A base station may provide a wireless device with a first set of resource configuration indexes (e.g., periodic CSI-RS resource configuration indexes), for example, by a higher layer parameter (e.g., failureDetectionResources) (e.g., explicit beam failure detection configuration). The first set of resource configuration indexes may indicate one or more first RSs (e.g., CSI-RS, SS/PBCH block, etc.). The base station may configure the higher layer parameter (e.g., failureDetectionResources) for a downlink BWP (of configured downlink BWPs) of the serving cell. The base station may provide the wireless device with a second set of resource configuration indexes (e.g., periodic CSI-RS resource configuration indexes, SS/PBCH block indexes). The base station may provide the wireless device with a second set of resource configuration indexes (e.g., periodic CSI-RS resource configuration indexes, SS/PBCH block indexes), for example, for the serving cell. The base station may provide the wireless device with a second set of resource configuration indexes (e.g., periodic CSI-RS resource configuration indexes, SS/PBCH block indexes), for example, by a higher layer parameter (e.g., candidateBeamRSList). The second set of resource configuration indexes may indicate one or more second RSs (e.g., CSI-RS, SS/PBCH block, etc.). The base station may configure the higher layer parameter (e.g., candidateBeamRSList) for an uplink BWP (of configured uplink BWPs) of the serving cell. The wireless device may use the one or more first RSs and/or the one or more second RSs for radio link quality measurements on the serving cell.

A base station may not provide a wireless device with a higher layer parameter (e.g., failureDetectionResources). The wireless device may determine a first set of resource configuration indexes (e.g., periodic CSI-RS resource configuration indexes) to include a resource configuration index (e.g., implicit beam failure detection configuration). The wireless device may determine a first set of resource configuration indexes (e.g., periodic CSI-RS resource configuration indexes) to include a resource configuration index (e.g., implicit beam failure detection configuration), for example, based on not being provided with the higher layer parameter (e.g., failureDetectionResources). The resource configuration index may be same as an RS index in an RS set. The RS index may be indicated by a TCI state (e.g., via a higher layer parameter TCI-state). The TCI state may be used for a CORESET that the wireless device is configured to monitor at least one PDCCH. The base station may configure the TCI state for the CORESET. The TCI state may comprise two RS indexes. The first set of resource configuration indexes may include an RS index, of the two RS indexes, with QCL-TypeD configuration. The first set of resource configuration indexes may include an RS index, of the two RS indexes, with QCL-TypeD configuration, for example, based on the TCI state comprising two RS indexes. The base station may configure the TCI state for the CORESET.

The wireless device may expect the first set of resource configuration indexes to include up to two RS indexes. The wireless device may expect a single port RS in the first set of resource configuration indexes. The one or more first RSs may comprise up to two RSs indicated by the two RS indexes.

A first threshold (e.g., Qout,LR) may correspond to a default value of a higher layer parameter (e.g., rlmInSyncOutOfSyncThreshold). A second threshold (e.g., Qin,LR) may correspond to a value provided by a higher layer parameter (e.g., rsrp-ThresholdSSB) in the BFR configuration parameter and/or IE (e.g., beamFailureRecoveryConfig).

A physical layer in a wireless device may assess a first radio link quality of the one or more first RSs (or the first set of resource configuration indexes). A physical layer in a wireless device may assess a first radio link quality of the one or more first RSs (or the first set of resource configuration indexes), for example, against the first threshold. A first RS of the one or more first RSs may be associated (e.g., QCLed) with at least one DM-RS of a PDCCH monitored by the wireless device.

The wireless device may use the second threshold for a first L1-RSRP measurement obtained from a SS/PBCH block of the one or more second RSs (or the second set of resource configuration indexes). The wireless device may use the second threshold for a second L1-RSRP measurement obtained from a CSI-RS of the one or more second RSs (or the second set of resource configuration indexes). The wireless device may use the second threshold for a second L1-RSRP measurement obtained from a CSI-RS of the one or more second RSs (or the second set of resource configuration indexes), for example, based on scaling a reception power of the CSI-RS with a value provided by a higher layer parameter (e.g., powerControlOffsetSS).

A wireless device may assess the first radio link quality of the one or more first RSs (indicated by the first set of resource configuration indexes). A physical layer in the wireless device may provide a BFI indication to a higher layer (e.g., MAC) of the wireless device. A physical layer in the wireless device may provide a BFI indication to a higher layer (e.g., MAC) of the wireless device, for example, if the first radio link quality is worse than the first threshold. The physical layer may inform the higher layer with a first periodicity. The physical layer may inform the higher layer with a first periodicity, for example, in non-DRX mode operation. The physical layer may inform the higher layer with a first periodicity, for example, if the first radio link quality is worse than the first threshold. The wireless device may determine the first periodicity. The wireless device may determine the first periodicity, for example, by the maximum between a shortest periodicity among one or more periodicities of the one or more first RSs (e.g., resource configurations in the first set) and a first value (e.g., 2 msec). The first periodicity may be defined as max (the first value, TBFD-RS,M). The first periodicity may be defined as max (the first value, TBFD-RS,M), for example, where TBFD-RS,M is the shortest periodicity.

The physical layer may inform the higher layer with a second periodicity. The physical layer may inform the higher layer with a second periodicity, for example, in DRX mode operation. The physical layer may inform the higher layer with a second periodicity, for example, if the first radio link quality is worse than the first threshold. The base station may configure the wireless device with a DRX_cycle_length for the DRX mode operation. The wireless device may determine the second periodicity by max (1.5*DRX_cycle_length, 1.5*TBFD-RS,M). The wireless device may determine the second periodicity by max (1.5*DRX_cycle_length, 1.5*TBFD-RS,M), for example, if the DRX_cycle_length is less than or equal to 320 ms. The wireless device may determine that the second periodicity is equal to the DRX_cycle_length. The wireless device may determine that the second periodicity is equal to the DRX_cycle_length, for example, if the DRX_cycle_length is greater than 320 ms.

The wireless device may provide to the higher layer one or more candidate RSs (e.g., the periodic CSI-RS configuration indexes, the SS/PBCH blocks indexes). The wireless device may provide to the higher layer one or more candidate RSs (e.g., the periodic CSI-RS configuration indexes, the SS/PBCH blocks indexes), for example, based on a request from a higher layer (e.g., MAC) of the wireless device. The wireless device may provide to the higher layer one or more candidate RSs (e.g., the periodic CSI-RS configuration indexes, the SS/PBCH blocks indexes), for example, from the one or more second RSs (e.g., the second set) and one or more L1-RSRP measurements. Each candidate RS of the one or more candidate RSs may be associated with a L1-RSRP measurement of the one or more L1-RSRP measurements. The association may be one-to-one. The one or more L1-RSRP measurements associated with the one or more candidate RSs may be larger than or equal to the second threshold. The higher layer may select a candidate RS (e.g., periodic CSI-RS resource configuration, SS/PBCH block) among the one or more candidate RSs. The candidate RS may be identified by a first RS index of the second set of resource configuration indexes. The first RS index may indicate the candidate RS.

A wireless device may be provided/configured with a CORESET. A wireless device may be provided/configured with a CORESET, for example, through a link to a search space set. The CORESET may be wireless device specific or dedicated to the wireless device. The wireless device may monitor the CORESET for a BFR. The base station may provide the wireless device with the search space set. The base station may provide the wireless device with the search space set, for example, by a higher layer parameter in an RRC message (e.g., recoverySearchSpaceId) in the BFR configuration parameter and/or IE (e.g., beamFailureRecoveryConfig). The wireless device may monitor at least one PDCCH in the CORESET.

The base station may provide the wireless device with a higher layer parameter in an RRC message (e.g., recoverySearchSpaceId). The wireless device may not expect to be provided with a second search space set for monitoring at least one PDCCH in the CORESET. The wireless device may not expect to be provided with a second search space set for monitoring at least one PDCCH in the CORESET, for example, based on being provided with the higher layer parameter in an RRC message (e.g., recoverySearchSpaceId). The CORESET may be associated with the search space set provided by the higher layer parameter in an RRC message (e.g., recoverySearchSpaceId). The wireless device may not expect that the CORESET is associated with a second search space set. The wireless device may not expect that the CORESET is associated with a second search space set, for example, based on the CORESET being associated with the search space set provided by the higher layer parameter in an RRC message (e.g., recoverySearchSpaceId).

The base station may provide the wireless device with a configuration for a transmission of an uplink signal (e.g., a PRACH transmission). The base station may provide the wireless device with a configuration for a transmission of an uplink signal (e.g., a PRACH transmission), for example, by a higher layer parameter (e.g., PRACH-ResourceDedicatedBFR) in the BFR configuration parameter and/or IE (e.g., beamFailureRecoveryConfig). The wireless device may monitor at least one PDCCH in a search space set (e.g., provided by the higher layer parameter recoverySearchSpaceId). The wireless device may monitor at least one PDCCH in a search space set (e.g., provided by the higher layer parameter recoverySearchSpaceId), for example, based on the transmission of the uplink signal (e.g., the PRACH transmission) in a first slot (e.g., slot n) and starting from a second slot (e.g., slot n+4). The wireless device may monitor at least one PDCCH in a search space set (e.g., provided by the higher layer parameter recoverySearchSpaceId), for example, for detection of a DCI format within a response window (e.g., ra-responseWindow). The wireless device may monitor the at least one PDCCH in the search space set (or CORESET). The wireless device may monitor the at least one PDCCH in the search space set (or CORESET), for example, according to antenna port QCL parameters associated with the candidate RS (provided by the higher layer). The response window may be configured by the BFR configuration parameter and/or IE (e.g., beamFailureRecoveryConfig). The DCI format may be configured with CRC scrambled by a RNTI (e.g., C-RNTI, MCS-C-RNTI).

The wireless device may assume that antenna port QCL parameters for the at least one PDCCH and the corresponding PDSCH are same as the candidate RS. The wireless device may assume that antenna port QCL parameters for the at least one PDCCH and the corresponding PDSCH are same as the candidate RS, for example, if the wireless device monitors at least one PDCCH in the search space set (e.g., provided by the higher layer parameter recoverySearchSpaceId) and for a reception of corresponding PDSCH. The wireless device may assume that antenna port QCL parameters for the at least one PDCCH and the corresponding PDSCH are same as the candidate RS, for example, until the wireless device receives, by higher layers, an activation for a TCI state or a higher layer parameter (e.g., TCI-StatesPDCCH-ToAddlist) and/or a higher layer parameter (e.g., TCI-StatesPDCCH-ToReleaseList). A DCI format received in the search space set may schedule the corresponding PDSCH. A DCI format received in the search space set may schedule the corresponding PDSCH, for example, if monitoring the at least one PDCCH.

The wireless device may continue to monitor at least one PDCCH in the search space set. The wireless device may continue to monitor at least one PDCCH in the search space set, for example, based on the wireless device detecting the DCI format with CRC scrambled by the RNTI (e.g., C-RNTI or MCS-C-RNTI) in the search space set (e.g., provided by the higher layer parameter recoverySearchSpaceId). The wireless device may continue to monitor at least one PDCCH in the search space set, for example, until the wireless device receives an activation command (e.g., MAC CE) for a TCI state or a higher layer parameter (e.g., TCI-StatesPDCCH-ToAddlist) and/or a higher layer parameter (e.g., TCI-StatesPDCCH-ToReleaseList).

The wireless device may perform the transmission of the uplink signal (e.g., PRACH transmission) on a serving cell (e.g., PCell, SCell). The wireless device may use a spatial filter for the transmission of the uplink signal (e.g., preamble transmission for the PRACH transmission). The wireless device may detect a DCI format. The wireless device may detect a DCI format, for example, with CRC scrambled by the RNTI. The wireless device may detect a DCI format, for example, in at least one PDCCH in the search space set (e.g., provided by the higher layer parameter recoverySearchSpaceId). The wireless device may send (e.g., transmit) a second uplink signal via PUCCH on the serving cell. The wireless device may send (e.g., transmit) a second uplink signal via PUCCH on the serving cell, for example, based on a first number of symbols (e.g., 28 symbols) from a last symbol of a reception of the at least one PDCCH. The wireless device may send (e.g., transmit) a second uplink signal via PUCCH on the serving cell, for example, using the spatial filter used for the transmission of the uplink signal (e.g., the PRACH transmission). The wireless device may send (e.g., transmit) a second uplink signal via PUCCH on the serving cell, for example, until the wireless device receives an activation command (e.g., MAC CE) for a spatial relation (e.g., PUCCH-Spatialrelationinfo) or is provided a spatial relation (e.g., PUCCH-Spatialrelationinfo) for PUCCH resource(s) for the serving cell.

The wireless device may assume that antenna port QCL parameters for a CORESET with index zero (e.g., CORESET 0) are same as the candidate RS for PDCCH monitoring in the CORESET with index zero. The wireless device may assume that antenna port QCL parameters for a CORESET with index zero (e.g., CORESET 0) are same as the candidate RS for PDCCH monitoring in the CORESET with index zero, for example, based on a first number of symbols (e.g., 28 symbols) from a last symbol of a reception of the at least one PDCCH.

The base station may not provide the wireless device with a higher layer parameter (e.g., recoverySearchSpaceId). The wireless device may not initiate a contention-free random access procedure for a BFR. The wireless device may not initiate a contention-free random access procedure for a BFR, for example, based on not being provided with the higher layer parameter (e.g., recoverySearchSpaceId). The wireless device may initiate a contention-based random access procedure for a BFR. The wireless device may initiate a contention-based random access procedure for a BFR, for example, based on not being provided with the higher layer parameter (e.g., recoverySearchSpaceId).

A wireless device may assess a downlink link quality of a serving cell. A wireless device may assess a downlink link quality of a serving cell, for example, based on one or more first RSs (e.g., periodic CSI-RS, SSB, etc.) in the first set of resource configuration indexes. A wireless device may assess a downlink link quality of a serving cell, for example, to detect a BFI.

A wireless device may estimate a first radio link quality for an RS of the one or more first RSs. A wireless device may compare the first radio link quality to a first threshold (Qout_LR) to access downlink radio link quality of the serving cell. The first threshold may be defined as a level at which a downlink radio level link may not be reliably received. The first threshold may correspond to a first percent (e.g., 10%) block error rate (BLER) of a hypothetical PDCCH transmission.

A wireless device may perform L1-RSRP measurements. A wireless device may perform L1-RSRP measurements, for example, based on one or more second RSs (e.g., periodic CSI-RS, SSB, etc.) in the second set of resource configuration indexes. A wireless device may perform L1-RSRP measurements, for example, in order to detect candidate beam (or candidate RS). An L1-RSRP measurement of the candidate beam (or candidate RS) may be better (e.g., higher) than a second threshold (e.g., indicated by higher layer parameter rsrp-ThresholdSSB, rsrp-ThresholdCSI-rs (rsrp-ThresholdSSB+powerControlOffsetSS)). The wireless device may not be required to perform candidate beam detection outside the active DL BWP.

A wireless device may perform a L1-RSRP measurement for an RS of the one or more second RSs. A wireless device may compare the L1-RSRP measurement to the second threshold (rsrp-ThresholdSSB, rsrp-ThresholdCSI-rs). A wireless device may compare the L1-RSRP measurement to the second threshold (rsrp-ThresholdSSB, rsrp-ThresholdCSI-rs), for example, to select at least one candidate beam (or candidate RS) for a BFR.

A wireless device may be active on a first DL BWP of a serving cell. The first DL BWP may be an active DL BWP of the serving cell, for example, based on being active on the first DL BWP. The wireless device may not perform a beam failure detection outside the active DL BWP. The wireless device may not perform a candidate beam detection outside the active DL BWP. A second DL BWP of the serving cell may be deactivated. The wireless device may not perform a beam failure detection for the second DL BWP, for example, based on the second DL BWP being deactivated. The wireless device may not perform a candidate beam detection for the second DL BWP, for example, based on the second DL BWP being deactivated.

A wireless device may estimate a first radio link quality of a CSI-RS with a first subcarrier spacing (SCS). A wireless device may estimate a first radio link quality of a CSI-RS with a first SCS, for example, for a beam failure detection. A wireless device may estimate a second radio link quality of a SSB with a second SCS. A wireless device may estimate a second radio link quality of a SSB with a second SCS, for example, for a beam failure detection. The wireless device may not perform beam failure detection measurements. The wireless device may not perform beam failure detection measurements, for example, based on the first SCS and the second SCS being different. The wireless device may not perform beam failure detection measurements, for example, based on the CSI-RS and the SSB being frequency division multiplexes (FDM-ed) in at least one symbol (e.g., OFDM).

In at least some wireless communications, a wireless device may send a PUCCH transmission, via a PCell or a SCell, using one or more PUCCH transmission parameters (e.g., transmission power, spatial domain transmission filter). A wireless device may send a PUCCH transmission, via a PCell or a SCell using one or more PUCCH transmission parameters (e.g., transmission power, spatial domain transmission filter), for example, if the wireless device successfully completes a BFR procedure of a PCell (e.g., such as specified in 3GPP Release 15, or any other release or standard) or an SCell (e.g., such as specified in Release 16), or any other release or standard). The wireless device may send a PUCCH transmission, via a PCell or an SCell using a transmission power, for example, where a pathloss estimation of the transmission power is determined based on a candidate beam. The candidate beam may be identified/indicated for the BFR procedure. The wireless device may estimate pathloss of one or more PUCCH transmissions. The wireless device may estimate pathloss of one or more PUCCH transmissions, for example, based on completion of the BFR procedure. The wireless device may estimate pathloss of one or more PUCCH transmissions, for example, based on the candidate beam (e.g., overwrite the activated/configured pathloss beam with the candidate beam). The wireless device may send a PUCCH transmission, via a PCell or an SCell using a spatial domain transmission filter, for example, where the spatial domain transmission filter is determined based on a candidate beam. The wireless device may determine the spatial domain transmission filter, for example, based on the candidate beam (e.g., overwrite the activated/configured spatial domain transmission with the spatial domain transmission filter associated with the candidate beam).

In at least some wireless communications, a BFR procedure may be specified for a single TRP only and/or fewer than all TRPs (e.g., such as in 3GPP Release 15, Release 16, and/or other standards/releases). In at least some other wireless communications (e.g., such as in 3GPP Release 17, and/or other standards/releases), a per-TRP BFR procedure may be supported. A per-TRP BFR procedure may be supported, for example, such that if a TRP has a beam failure, the wireless device may recover the TRP before multiple TRPs have beam failures. A wireless device may initiate a BFR procedure for TRP-1. A wireless device may initiate a BFR procedure for TRP-1, for example, if per-TRP BFR procedure is specified (e.g., such as in 3GPP Release 17 and/or any other standard/release). A wireless device may estimate pathloss of PUCCH transmissions based on a candidate beam identified/indicated for the BFR procedure, for example, if the wireless device follows an particular rule (e.g., such as in 3GPP Release 15, Release 16, and/or any other standard/release). The wireless device may estimate pathloss of PUCCH transmissions based on a candidate beam identified/indicated for the BFR procedure, for example, if the wireless device successfully completes the BFR procedure of the TRP-1. The wireless device may estimate pathloss of PUCCH transmissions of some of the PUCCH resources associated with TRP-2. Using a pathloss estimate of the candidate beam which belongs to TRP-1 for a PUCCH transmission belonging to TRP-2 may not be efficient. Using a pathloss estimate of the candidate beam which belongs to TRP-1 for a PUCCH transmission belonging to TRP-2 may not be efficient, for example, if the TRPs are located in different directions. Using a pathloss estimate of TRP-1 for PUCCH transmission of TRP-2 may result in inaccurate transmission power and increased interference to other cells and/or wireless devices. Increased interference to other cells and wireless devices may occur, for example, if inaccurate transmission power is used and if the inaccurate transmission power is higher than required transmission power. Increased interference may degrade the quality of desired signals and quality-of-service (QoS) may be reduced. Base stations of other cells and/or other wireless devices may not successfully decode the data, for example, if QoS is reduced, which may increase retransmissions. The uplink signal sent by the wireless device may not reach the base station, for example, if inaccurate transmission power is used and if the inaccurate transmission power is less than required transmission power, which may result in coverage loss.

A wireless device may send a PUCCH with a spatial domain transmission filter based on a candidate beam identified/indicated for the BFR procedure, for example, if the wireless device follows an particular rule (e.g., such as in 3GPP Release 15, Release 16 and/or any other standard/release). The wireless device may send a PUCCH with a spatial domain transmission filter based on a candidate beam identified/indicated for the BFR procedure, for example, if the wireless device successfully completes the BFR procedure of the TRP-1. The wireless device may send a PUCCH with a spatial domain transmission filter via some of the PUCCH resources associated with TRP-2. Using a spatial domain transmission filter associated with the candidate beam which belongs to TRP-1 for a PUCCH transmission belonging to TRP-2 may not be efficient, for example, if the TRPs are located in different directions. Using a spatial domain transmission filter of TRP-1 for PUCCH transmission of TRP-2 may result in increased interference to other cells and/or wireless devices.

As described herein, a wireless device may determine a pathloss estimate based on the candidate beam for PUCCH transmissions only belonging to a first location and/or device (e.g., a first TRP (e.g., TRP-1), a first antenna and/or antenna panel, and/or any other device/location for transmission and/or reception, which may be generally referred to herein as TRP). The wireless device may determine a pathloss estimate based on the candidate beam for PUCCH transmissions only belonging to the TRP-1, for example, if the wireless device completes a BFR of TRP-1. The wireless device may determine the pathloss estimate based on the activated/configured beams of the PUCCH resources belonging to a second location and/or device (e.g., a second TRP (e.g., TRP-2), a second antenna and/or antenna panel, and/or any other device/location for transmission and/or reception, which may be generally referred to herein as TRP). The wireless device may determine the pathloss estimate based on the activated/configured beams of the PUCCH resources belonging to the TRP-2, for example, for PUCCH transmissions belonging to the TRP-2. The wireless device may avoid inaccurate transmission power and increased interference to other cells and/or wireless devices, for example, based the determining on a pathloss estimate based on the candidate beam for PUCCH transmissions only belonging to the TRP-1. The usage of accurate transmission power (e.g., more or less required transmission power) may result in decreased interference to other cells and/or wireless devices. The usage of accurate transmission power (e.g., more or less required transmission power) may result in increased QoS and reduced retransmissions due to increased QoS, which may decrease the power consumption.

As described herein, a wireless device may use a spatial domain transmission filter based on the candidate beam for PUCCH transmissions only belonging to the TRP-1. The wireless device may use a spatial domain transmission filter based on the candidate beam for PUCCH transmissions only belonging to the TRP-1, for example, if the wireless device completes a BFR of TRP-1. The wireless device may use an activated/configured spatial domain transmission filter based on the activated/configured beams of the PUCCH resources belonging to the TRP-2. The wireless device may use an activated/configured spatial domain transmission filter based on the activated/configured beams of the PUCCH resources belonging to the TRP-2, for example, for PUCCH transmissions belonging to the TRP-2. The wireless device may avoid increased interference to other cells and/or wireless devices, for example, based the using a spatial domain transmission filter based on the candidate beam for PUCCH transmissions only belonging to the TRP-1.

At least some wireless devices may monitor a special CORESET, such as named CORESET-0 of the PCell with a candidate beam identified/indicated for the BFR procedure (e.g., such as in 3GPP Release 15, and/or other standards/releases). A wireless device may monitor a special CORESET named CORESET-0 of the PCell with a candidate beam identified/indicated for the BFR procedure, for example, if the wireless device successfully completes a BFR procedure of a PCell. At least some wireless devices may monitor all of the CORESETs in the SCell with a candidate beam identified/indicated for the BFR procedure (e.g., such as in 3GPP Release 16, and/or other standards/releases). A wireless device may monitor all of the CORESETs in the SCell with a candidate beam identified for the BFR procedure, for example, if a wireless device successfully completes a BFR procedure of an SCell.

A BFR procedure may be specified for a single TRP only. A per-TRP BFR procedure may be supported. A per-TRP BFR procedure may be supported, for example, such that if a TRP has a beam failure, the wireless device may recover the TRP before multiple TRPs have beam failures. The wireless device may initiate a BFR procedure for TRP-1. The wireless device may initiate a BFR procedure for TRP-1, for example, if per-TRP BFR procedure is specified/indicated. The wireless device may monitor the CORESET-0 of the PCell or all of the CORESETs in the SCell with a candidate beam identified for the BFR procedure of the TRP-1. The wireless device may monitor the CORESET-0 of the PCell or all of the CORESETs in the SCell with a candidate beam identified for the BFR procedure of the TRP-1, for example, if the wireless device follows a particular rule (e.g., 3GPP Release-15, of Release-16, etc.). The wireless device may monitor the CORESET-0 of the PCell or all of the CORESETs in the SCell with a candidate beam identified/indicated for the BFR procedure of the TRP-1, for example, if the wireless device successfully completes the BFR procedure of the TRP-1. The CORESET-0 in the PCell or some of the CORESETs in the SCell may belong to the TRP-2. Monitoring a CORESET belonging to TRP-2 with the candidate beam of TRP-1 may not be efficient, for example, if the TRPs are located in different directions and using different transmitting/receiving beams. The wireless device may not receive DCI via the CORESET belonging to TRP-2 with the candidate beam of TRP-1. The wireless device may not receive DCI via the CORESET belonging to TRP-2 with the candidate beam of TRP-1, for example, based on monitoring a CORESET belonging to TRP-2 with the candidate beam of TRP-1 if the TRPs are located in different directions and using different transmitting/receiving beams. The not receiving DCI may increase retransmissions and power consumptions. The base station may resend DCI, for example, if the wireless device cannot receive DCI via a CORESET. The resending DCI may increase signaling overhead (e.g., increased DCI transmissions), increased latency/delay for a successful communication, and/or increased power consumption due to the wireless device monitoring an increased number of DCI retransmissions. The wireless device may detect a beam failure and start a BFR procedure if the CORESET fails (e.g., the quality of CORESET is low) based on not receiving DCI. The starting the BFR procedure may increase power consumption.

The wireless device may monitor CORESET-0 with the candidate beam only if the CORESET-0 belongs to the TRP-1. The wireless device may monitor CORESET-0 with the candidate beam only if the CORESET-0 belongs to the TRP-1, for example, if the wireless device completes a BFR of TRP-1 of a PCell. The wireless device may monitor the CORESET-0 with an activated/configured beam. The wireless device may monitor the CORESET-0 with an activated/configured beam, for example, if the CORESET-0 does not belong to the TRP-1.

The wireless device may monitor one or more first CORESETs of the SCell with the candidate beam. The wireless device may monitor one or more first CORESETs of the SCell with the candidate beam, for example, if the wireless device completes a BFR of TRP-1 of an SCell. The wireless device may monitor one or more first CORESETs of the SCell with the candidate beam, for example, only if the one or more first CORESETs belong to the TRP-1. The wireless device may monitor one or more second CORESETs of the SCell belonging to the TRP-2 with activated/configured beams. The wireless device may monitor one or more second CORESETs of the SCell belonging to the TRP-2 with activated/configured beams, for example, if the one or more second CORESETs do not belong to the TRP-1. The monitoring one or more first CORESETs of the SCell with the candidate beam only if the one or more first CORESETs belong to the TRP-1 may result in reduced signalling overhead, reduced latency/delay, reduced power consumption, and/or a reduced likelihood of detecting a beam failure.

FIG. 17, FIG. 18, FIG. 19, FIG. 20 and FIG. 21 show examples of beam failure recovery (BFR). FIGS. 17-19 and 21 show various configurations of BFR. For example, in FIG. 17, a wireless device may receive one or more messages for example, from a base station. The one or more messages may comprise one or more configuration parameters. The wireless device may determine that the one or more configuration parameters do not indicate one or more beam failure detection RSs. The wireless device may select/determine a CORESET group among the plurality of CORESET groups. The wireless device may determine/select one or more RSs (e.g., Beam 1, Beam 2, Beam 3, Beam 4, Beam 5, Beam 6, Beam 7, and/or Beam 8), for example, based on selecting/determining the CORESET group. The wireless device (e.g., a physical layer in the wireless device) may assess/measure a radio link quality (e.g., BLER, SINR, RSRP) of the one or more RSs.

Figure 18:
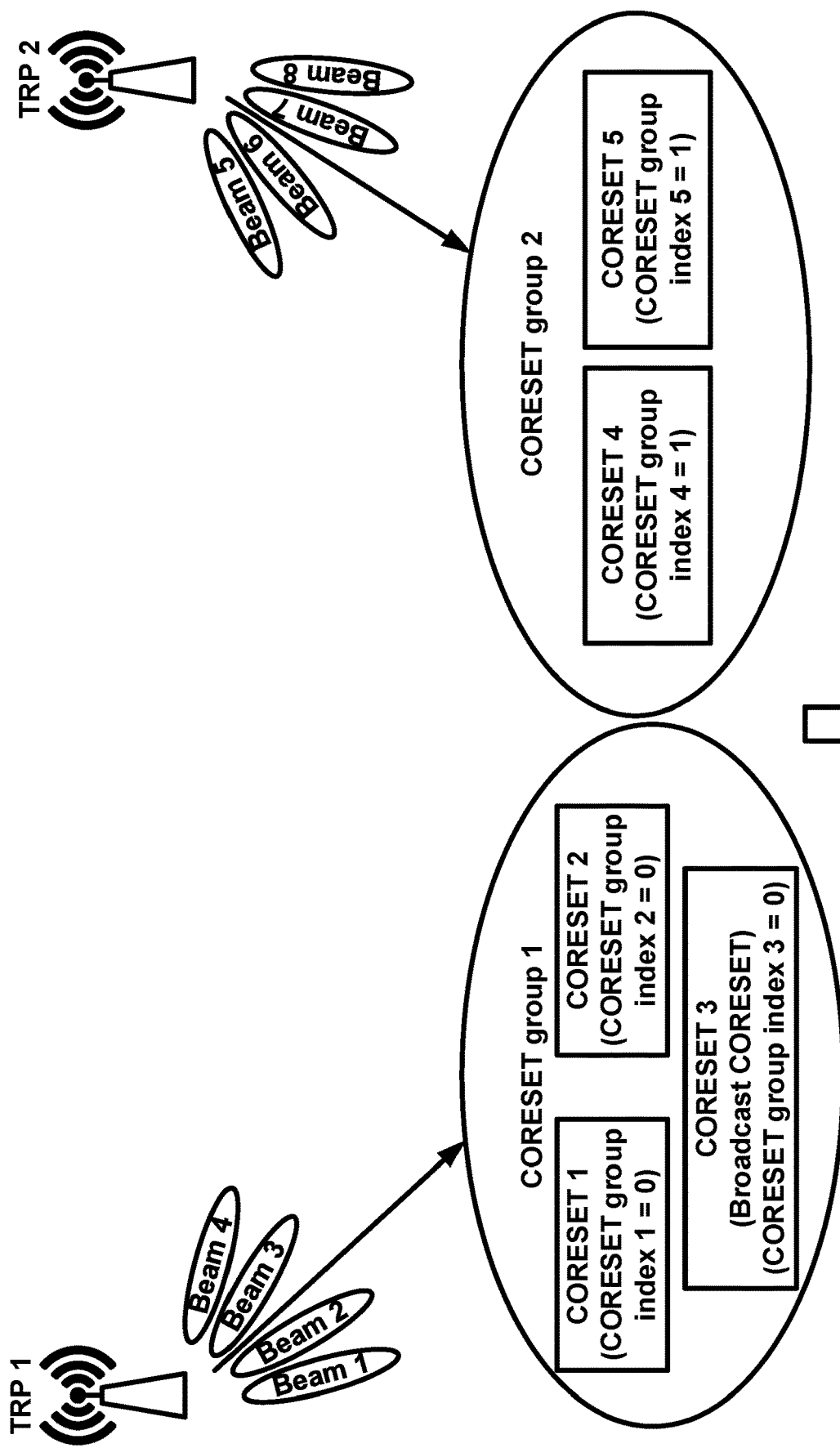
FIG. 18 shows an example of beam failure recovery using a control resource set (CORESET) group comprising a BFR CORESET.

FIG. 18 shows an example of beam failure recovery using a control resource set (CORESET) group comprising a BFR CORESET. A wireless device may receive one or more configuration parameters, for example, from a base station. The wireless device may determine that the one or more configuration parameters do not indicate one or more beam failure detection RSs. The wireless device may determine whether the one or more configuration parameters indicate a recovery search space set, for example, for a BFR procedure of the downlink BWP. The wireless device may select/determine a CORESET group among the plurality of CORESET groups. The wireless device may select/determine a CORESET group among the plurality of CORESET groups, for example, based on determining that the one or more configuration parameters do indicate the recovery search space set. The wireless device may select/determine a CORESET group among the plurality of CORESET groups, for example, based on determining that the one or more configuration parameters do not indicate the one or more beam failure detection RSs and the recovery search space set. The wireless device may determine/select one or more RSs, for example, based on selecting/determining the CORESET group. The wireless device (e.g., a physical layer in the wireless device) may assess/measure a radio link quality (e.g., BLER, SINR, RSRP) of the one or more RSs.

Figure 19:
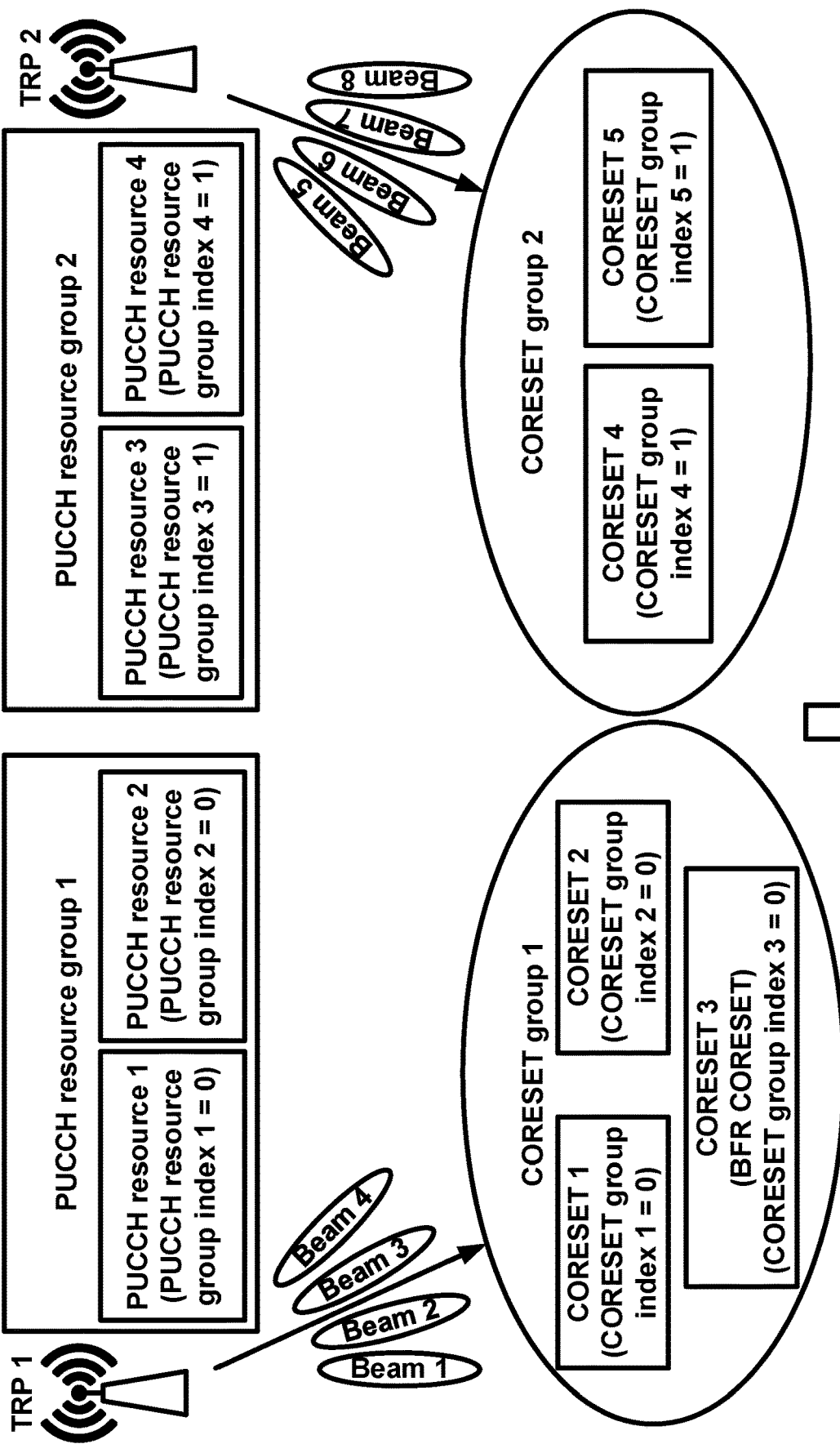
FIG. 19 shows an example of beam failure recovery.

FIG. 19 shows an example of beam failure recovery. The wireless device may send (e.g., transmit) an uplink signal with a spatial transmission filter. The wireless device may select/identify/determine a candidate RS among one or more second RSs, for example, for candidate beam selection/identification. The wireless device may complete a BFR procedure successfully, for example, based on receiving a BFR response in the CORESET (or in the recovery search space set). One or more configuration parameters may indicate a CORESET group index for the CORESET. The wireless device may select/determine a PUCCH resource group among a plurality of PUCCH resource groups, for example, based on a group index of the PUCCH resource group and the CORESET group index. The wireless device may send, via a PUCCH resource of one or more PUCCH resources in the PUCCH resource group, a PUCCH with the spatial transmission filter. The wireless device may send, for example, a PUCCH with a second spatial transmission filter via one or more second PUCCH resources in a second PUCCH resource group that is different from the PUCCH resource group.

Figure 20:
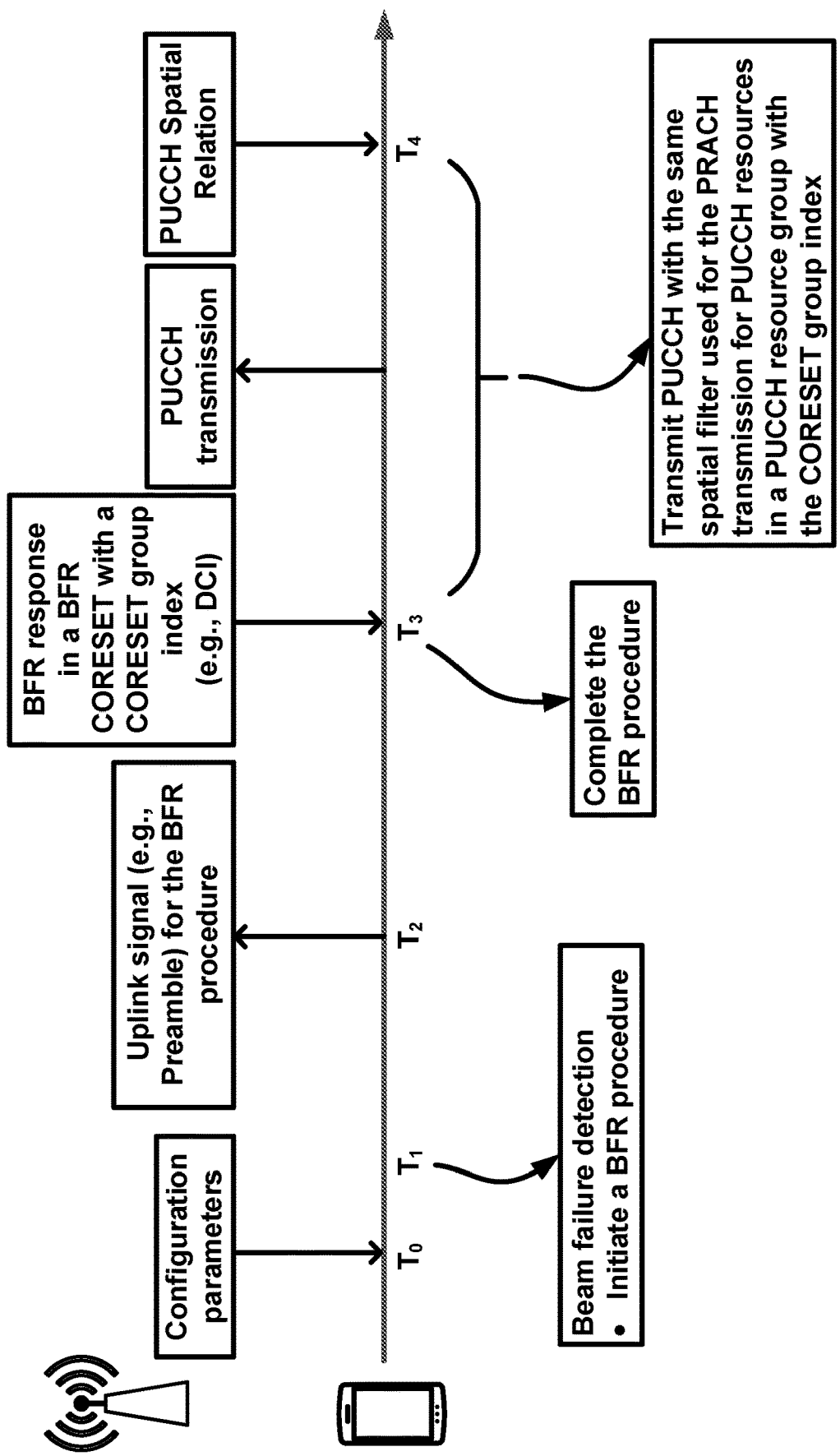
FIG. 20 shows an example of a beam failure recovery procedure.

FIG. 20 shows an example of a beam failure recovery procedure. A wireless device may receive one or more configuration parameters, for example, from a base station. The wireless device may initiate a BFR procedure. The wireless device may send an uplink signal (e.g., Preamble) with a spatial filter for the BFR procedure. The wireless device may complete a BFR procedure successfully, for example, based on receiving a BFR response in a CORESET (or in the recovery search space set). The one or more configuration parameters may indicate a CORESET group index for the CORESET. The wireless device may transmit a PUCCH with the spatial filter via a PUCCH resource of one or more PUCCH resources in a PUCCH resource group with a PUCCH resource group index that is the same as the CORESET group index.

Figure 21:
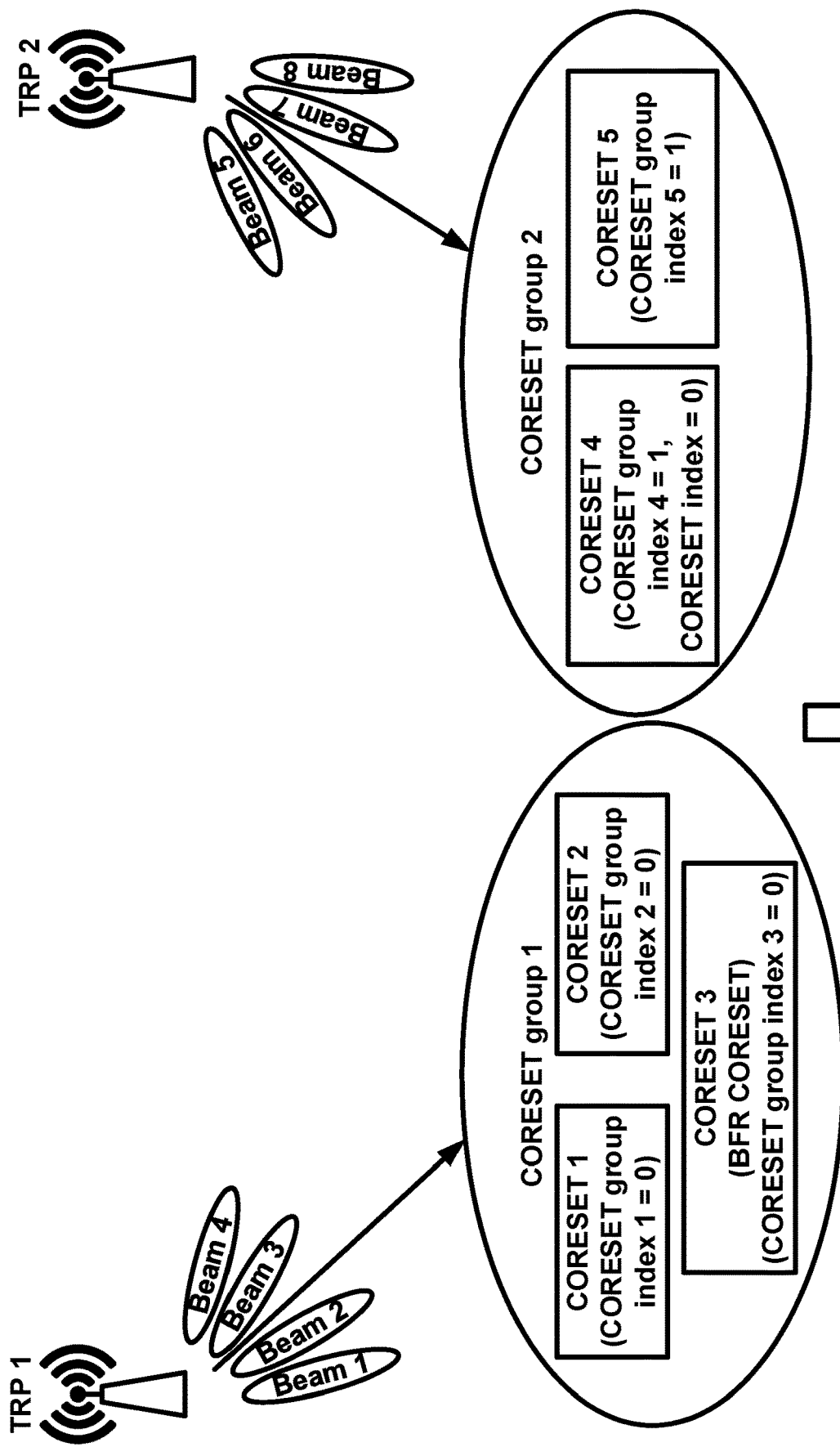
FIG. 21 shows an example of beam failure recovery.

FIG. 21 shows an example of beam failure recovery. A wireless device may complete a BFR procedure successfully, for example, based on receiving a BFR response in a CORESET (or in the recovery search space set) with a CORESET group index. The wireless device may determine if a second CORESET is configured with the CORESET group index. The wireless device may monitor, for DCI, the second CORESET based on a candidate RS identified in a candidate beam selection of the BFR procedure. The wireless device may monitor, for DCI, the second CORESET based on a candidate RS identified in a candidate beam selection of the BFR procedure, for example, if the second CORESET is configured with the CORESET group index. The wireless device may monitor, for DCI, the second CORESET based on an RS that is activated/configured for the second CORESET. The wireless device may monitor, for DCI, the second CORESET based on an RS that is activated/configured for the second CORESET, for example, if the second CORESET is not configured with the CORESET group index.

A wireless device may receive one or more messages (e.g., at time T0 in FIG. 20). The wireless device may receive the one or more messages, for example, from a base station. The one or more messages may comprise one or more configuration parameters.

The one or more configuration parameters may be for a cell. The cell may be a primary cell (PCell). The cell may be a secondary cell (SCell). The cell may be a secondary cell configured with PUCCH (e.g., PUCCH SCell). The cell may be an unlicensed cell. The cell may be an unlicensed cell, for example, operating in an unlicensed band. The cell may be a licensed cell. The cell may be a licensed cell, for example, operating in a licensed band.

The cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be (e.g., at a particular time) in one of an active state and an inactive state. The wireless device may monitor a downlink channel/signal (e.g., PDCCH, DCI, CSI-RS, PDSCH). The wireless device may monitor a downlink channel/signal (e.g., PDCCH, DCI, CSI-RS, PDSCH), for example, in the active state of a downlink BWP of the one or more downlink BWPs. The wireless device may monitor a downlink channel/signal (e.g., PDCCH, DCI, CSI-RS, PDSCH), for example, on/for/via the downlink BWP. The wireless device may receive a PDSCH transmission. The wireless device may receive a PDSCH transmission, for example, in the active state of a downlink BWP of the one or more downlink BWPs. The wireless device may receive a PDSCH transmission, for example, on/via the downlink BWP. The wireless device may not monitor a downlink channel/signal (e.g., PDCCH, DCI, CSI-RS, PDSCH). The wireless device may not monitor a downlink channel/signal (e.g., PDCCH, DCI, CSI-RS, PDSCH), for example, in the inactive state of a downlink BWP of the one or more downlink BWPs. The wireless device may not monitor a downlink channel/signal (e.g., PDCCH, DCI, CSI-RS, PDSCH), for example, on/for the downlink BWP. The wireless device may not receive a PDSCH transmission on/via the downlink BWP. The wireless device may not receive a PDSCH transmission on/via the downlink BWP, for example, in the inactive state of a downlink BWP of the one or more downlink BWPs.

The wireless device may send (e.g., transmit) an uplink signal/channel (e.g., PUCCH, preamble, PUSCH, PRACH, SRS, etc.). The wireless device may send (e.g., transmit) an uplink signal/channel (e.g., PUCCH, preamble, PUSCH, PRACH, SRS, etc.), for example, in the active state of an uplink BWP of the one or more uplink BWPs. The wireless device may send (e.g., transmit) an uplink signal/channel (e.g., PUCCH, preamble, PUSCH, PRACH, SRS, etc.), for example, via the uplink BWP. The wireless device may not send (e.g., transmit) an uplink signal/channel (e.g., PUCCH, preamble, PUSCH, PRACH, SRS, etc.). The wireless device may not send (e.g., transmit) an uplink signal/channel (e.g., PUCCH, preamble, PUSCH, PRACH, SRS, etc.), for example, in the inactive state of an uplink BWP of the one or more uplink BWPs. The wireless device may not send (e.g., transmit) an uplink signal/channel (e.g., PUCCH, preamble, PUSCH, PRACH, SRS, etc.), for example, via the uplink BWP.

The wireless device may activate the downlink BWP of the one or more downlink BWPs of the cell. The activating the downlink BWP may comprise the wireless device setting the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device may activate the uplink BWP of the one or more uplink BWPs of the cell. The activating the uplink BWP may comprise the wireless device setting the uplink BWP as an active uplink BWP of the cell. The activating the uplink BWP may comprise the wireless device setting the uplink BWP in the active state. The activating the uplink BWP may comprise switching the uplink BWP from the inactive state to the active state.

The one or more configuration parameters may be for the downlink BWP of the cell. The one or more configuration parameters may indicate a plurality of CORESET groups (e.g., CORESET group 1, CORESET group 2 in FIG. 17-FIG. 19, FIG. 21). The one or more configuration parameters may indicate a plurality of CORESET groups (e.g., CORESET group 1, CORESET group 2 in FIG. 17-FIG. 19, FIG. 21), for example, for the downlink BWP of the cell. The downlink BWP may comprise the plurality of CORESET groups. The plurality of CORESET groups may comprise a plurality of CORESETs (e.g., CORESET 1, CORESET 2, CORESET 3, CORESET 4 and CORESET 5 in FIG. 17-FIG. 19, FIG. 21). The one or more configuration parameters may indicate the plurality of CORESETs. The one or more configuration parameters may indicate the plurality of CORESETs, for example, for the downlink BWP of the cell. The downlink BWP may comprise the plurality of CORESETs. Each CORESET group of the plurality of CORESET groups may comprise respective one or more CORESETs (e.g., CORESET 1, CORESET 2 and CORESET 3 for CORESET group 1; CORESET 4 and CORESET 5 for CORESET group 2). The one or more configuration parameters may indicate the plurality of CORESETs grouped into the plurality of CORESET groups.

The plurality of CORESET groups may comprise a first CORESET group (e.g., CORESET group 1 in FIG. 17-FIG. 19, FIG. 21) and a second CORESET group (e.g., CORESET group 2 in FIG. 17-FIG. 19, FIG. 21). The first CORESET group may comprise one or more first CORESETs (e.g., CORESET 1, CORESET 2 and CORESET 3 in FIG. 17-FIG. 19, FIG. 21). The second CORESET group may comprise one or more second CORESETs (e.g., CORESET 4 and CORESET 5 in FIG. 17-FIG. 19, FIG. 21).

The cell may comprise a plurality of TRPs. The plurality of TRPs may comprise a first TRP (e.g., TRP 1 in FIG. 17-FIG. 19, FIG. 21) and a second TRP (e.g., TRP 2 in FIG. 17-FIG. 19, FIG. 21). The first TRP may send (e.g., transmit) a downlink signal/channel (e.g., PDSCH, PDCCH, DCI) via the first CORESET group. Sending (e.g., transmitting) the downlink signal/channel (e.g., PDCCH, DCI) via the first CORESET group may comprise that the first TRP transmits the downlink signal/channel via a CORESET (e.g., CORESET 1, CORESET 2 and CORESET 3) among the first CORESET group. The first TRP may not send (e.g., transmit) a downlink signal/channel (e.g., PDSCH, PDCCH, DCI) via the second CORESET group. Not sending (e.g., transmitting) the downlink signal/channel (e.g., PDSCH, PDCCH, DCI) via the second CORESET group may comprise that the first TRP does not send (e.g., transmit) the downlink signal/channel via a CORESET (e.g., CORESET 4 and CORESET 5 in FIG. 17-FIG. 19, FIG. 21) among the second CORESET group. The second TRP may send (e.g., transmit) a downlink signal/channel (e.g., PDSCH, PDCCH, DCI) via the second CORESET group. Sending (e.g., transmitting) the downlink signal/channel (e.g., PDCCH, DCI) via the second CORESET group may comprise that the second TRP transmits the downlink signal/channel via a CORESET (e.g., CORESET 4 and CORESET 5 in FIG. 17-FIG. 19, FIG. 21) among the second CORESET group. The second TRP may not send (e.g., transmit) a downlink signal/channel (e.g., PDCCH, DCI) via the first CORESET group. Not sending (e.g., transmitting) the downlink signal/channel (e.g., PDCCH, DCI) via the first CORESET group may comprise that the second TRP does not send (e.g., transmit) the downlink signal/channel via a CORESET (e.g., CORESET 1, CORESET 2 and CORESET 3) among the first CORESET group.

The one or more configuration parameters may indicate TRP indexes for the plurality of TRPs. Each TRP of the plurality of TRPs may be identified/indicated by a respective TRP index of the TRP indexes. A first TRP (e.g., TRP 1 in FIG. 17-FIG. 19, FIG. 21) of the plurality of TRPs may be identified/indicated by a first TRP index of the TRP indexes. A second TRP (e.g., TRP 2 in FIG. 17-FIG. 19, FIG. 21) of the plurality of TRPs may be identified/indicated by a second TRP index of the TRP indexes.

The one or more configuration parameters may indicate CORESET indexes (e.g., provided by a higher layer parameter ControlResourceSetId) for the plurality of CORESETs. Each CORESET of the plurality of CORESETs may be identified/indicated by a respective CORESET index of the CORESET indexes. A first CORESET of the plurality of CORESETs may be identified/indicated by a first CORESET index of the CORESET indexes. A second CORESET of the plurality of CORESETs may be identified/indicated by a second CORESET index of the CORESET indexes.

The one or more configuration parameters may indicate CORESET group indexes for the plurality of CORESETs. Each CORESET of the plurality of CORESETs may be identified/indicated by a respective CORESET group index of the CORESET group indexes. A first CORESET in a first CORESET group of the plurality of CORESET groups may be identified/indicated by (or configured with) a first CORESET group index of the CORESET group indexes. A second CORESET in the first CORESET group may be identified/indicated by (or configured with) a second CORESET group index of the CORESET group indexes. A third CORESET in a second CORESET group of the plurality of CORESET groups may be identified/indicated by (or configured with) a third CORESET group index of the CORESET group indexes. A fourth CORESET in the second CORESET group may be identified/indicated by (or configured with) a fourth CORESET group of the CORESET group indexes.

The wireless device may group one or more CORESETs, of the plurality of CORESETs, with the same CORESET group index in a (same) CORESET group of the plurality of CORESET groups. The wireless device may group CORESETs, of the plurality of CORESETs, with different CORESET group indexes in different CORESET groups. One or more CORESETs, of the plurality of CORESETs, in a CORESET group of the plurality of CORESET groups may have (or be configured with) the same CORESET group index. The one or more configuration parameters may indicate the same CORESET group index for the one or more CORESETs in the CORESET group. One or more CORESET group indexes of the one or more CORESETs in the CORESET group may be the same/equal. A respective CORESET group index of each CORESET of the one or more CORESETs in the CORESET group may be the same/equal.

The one or more first CORESETs in the first CORESET group may have/share (or be configured with) the same CORESET group index (e.g., zero, one, two, etc., for example CORESET group index 1, CORESET group index 2, and CORESET group index 3 in CORESET group 1 are equal to 0). The one or more configuration parameters may indicate the same CORESET group index for the one or more first CORESETs in the first CORESET group. The one or more configuration parameters may indicate the same CORESET group index for each CORESET of the one or more first CORESETs in the first CORESET group. A first CORESET group index (e.g., CORESET group index 1 in FIG. 17-FIG. 19, FIG. 21) of a first CORESET (e.g., CORESET 1 in FIG. 17-FIG. 19, FIG. 21) in the first CORESET group (e.g., CORESET group 1 in FIG. 17-FIG. 19, FIG. 21) and a second CORESET group index (e.g., CORESET group index 2 in FIG. 17-FIG. 19, FIG. 21) of a second CORESET (e.g., CORESET 2 in FIG. 17-FIG. 19, FIG. 21) in the first CORESET group may be the same/equal. The wireless device may group the first CORESET and the second CORESET in the first CORESET group. The wireless device may group the first CORESET and the second CORESET in the first CORESET group, for example, based on the first CORESET group index and the second CORESET group index being the same/equal. The first CORESET and the second CORESET may be in the same CORESET group (e.g., the first CORESET group). The first CORESET and the second CORESET may be in the same CORESET group (e.g., the first CORESET group), for example, based on the first CORESET group index and the second CORESET group index being the same/equal.

The one or more second CORESETs in the second CORESET group may have/share (or be configured with) the same CORESET group index (e.g., zero, one, two, etc., for example CORESET group index 4 and CORESET group index 5 in CORESET group 2 are equal to 1). The one or more configuration parameters may indicate the same CORESET group index for the one or more second CORESETs in the second CORESET group. The one or more configuration parameters may indicate the same CORESET group index for each CORESET of the one or more second CORESETs in the second CORESET group. A first CORESET group index (e.g., CORESET group index 4 in FIG. 17-FIG. 19, FIG. 21) of a first CORESET (e.g., CORESET 4 in FIG. 17-FIG. 19, FIG. 21) in the second CORESET group (e.g., CORESET group 2 in FIG. 17-FIG. 19, FIG. 21) and a second CORESET group index (e.g., CORESET group index 5 in FIG. 17-FIG. 19, FIG. 21) of a second CORESET (e.g., CORESET 5 in FIG. 17-FIG. 19, FIG. 21) in the second CORESET group may be the same/equal. The wireless device may group the first CORESET and the second CORESET in the second CORESET group. The wireless device may group the first CORESET and the second CORESET in the second CORESET group, for example, based on the first CORESET group index and the second CORESET group index being the same/equal. The first CORESET and the second CORESET may be in the same CORESET group (e.g., the second CORESET group). The first CORESET and the second CORESET may be in the same CORESET group (e.g., the second CORESET group), for example, based on the first CORESET group index and the second CORESET group index being the same/equal.

A first CORESET group index (e.g., CORESET group index 1 in FIG. 17-FIG. 19, FIG. 21) of a first CORESET (e.g., CORESET 1 in FIG. 17-FIG. 19, FIG. 21) and a second CORESET group index (e.g., CORESET group index 4 in FIG. 17-FIG. 19, FIG. 21) of a second CORESET (e.g., CORESET 4 in FIG. 17-FIG. 19, FIG. 21) may be different. The wireless device may group the first CORESET and the second CORESET in different CORESET groups. The wireless device may group the first CORESET and the second CORESET in different CORESET groups, for example, based on the first CORESET group index and the second CORESET group index being different. The wireless device may group the first CORESET in a first CORESET group. The wireless device may group the second CORESET in a second CORESET group. The wireless device may group the second CORESET in a second CORESET group, for example, that is different from the first CORESET group. The wireless device may group the second CORESET in a second CORESET group, for example, based on the first CORESET group index and the second CORESET group index being different.

The plurality of CORESET groups may be identified/indicated by (or associated with or configured with) group indexes. Each CORESET group of the plurality of CORESET groups may be identified/indicated by (or associated with or configured with) a respective group index of the group indexes. The one or more configuration parameters may indicate the group indexes for the plurality of CORESET groups. A first CORESET group (e.g., CORESET group 1 in FIG. 17-FIG. 19, FIG. 21) of the plurality of CORESET groups may be identified by (or associated with or configured with) a first group index (e.g., zero) of the group indexes. The first CORESET group being identified/indicated by (or associated with or configured with) the first group index may comprise that a respective CORESET group index of each CORESET in the first CORESET group is equal to the first group index. The first CORESET group being identified by (or associated with or configured with) the first group index may comprise that a respective CORESET group index of each CORESET of one or more first CORESETs in the first CORESET group is equal to the first group index. A first CORESET group index (e.g., CORESET group index 1=0 in FIG. 17-FIG. 19, FIG. 21) of a first CORESET (e.g., CORESET 1 in FIG. 17-FIG. 19, FIG. 21) in the first CORESET group may be equal to the first group index (e.g., zero). A second CORESET group index (e.g., CORESET group index 2=0 in FIG. 17-FIG. 19, FIG. 21) of a second CORESET (e.g., CORESET 2 in FIG. 17-FIG. 19, FIG. 21) in the first CORESET group may be equal to the first group index (e.g., zero). A second CORESET group (e.g., CORESET group 2 in FIG. 17-FIG. 19, FIG. 21) of the plurality of CORESET groups may be identified/indicated by (or associated with or configured with) a second group index (e.g., one) of the group indexes. The second CORESET group being identified by (or associated with or configured with) the second group index may comprise that a respective CORESET group index of each CORESET in the second CORESET group is equal to the second group index. The second CORESET group being identified by (or associated with or configured with) the second group index may comprise that a respective CORESET group index of each CORESET of one or more second CORESETs in the second CORESET group is equal to the second group index. A first CORESET group index (e.g., CORESET group index 4=1 in FIG. 17-FIG. 19, FIG. 21) of a first CORESET (e.g., CORESET 4 in FIG. 17-FIG. 19, FIG. 21) in the second CORESET group may be equal to the second group index (e.g., one). A second CORESET group index (e.g., CORESET group index 5=1 in FIG. 17-FIG. 19, FIG. 21) of a second CORESET (e.g., CORESET 5 in FIG. 17-FIG. 19, FIG. 21) in the second CORESET group may be equal to the second group index (e.g., one).

The one or more configuration parameters may indicate a plurality of PUCCH resource groups (e.g., PUCCH resource group 1, PUCCH resource group 2 in FIG. 19). The one or more configuration parameters may indicate a plurality of PUCCH resource groups (e.g., PUCCH resource group 1, PUCCH resource group 2 in FIG. 19), for example, for the uplink BWP of the cell. The uplink BWP may comprise the plurality of PUCCH resource groups. The plurality of PUCCH resource groups may comprise a plurality of PUCCH resources (e.g., PUCCH resource 1, PUCCH resource 2, PUCCH resource 3, and PUCCH resource 4 in FIG. 19). The one or more configuration parameters may indicate the plurality of PUCCH resources for the uplink BWP of the cell. The uplink BWP may comprise the plurality of PUCCH resources. Each PUCCH resource group of the plurality of PUCCH resource groups may comprise respective one or more PUCCH resources (e.g., PUCCH resource 1 and PUCCH resource 2 for PUCCH resource group 1; PUCCH resource 3 and PUCCH resource 4 for PUCCH resource group 2). The one or more configuration parameters may indicate the plurality of PUCCH resources grouped into the plurality of PUCCH resource groups.

The plurality of PUCCH resource groups may comprise a first PUCCH resource group (e.g., PUCCH resource group 1 in FIG. 19) and a second PUCCH resource group (e.g., PUCCH resource group 2 in FIG. 19). The first PUCCH resource group may comprise one or more first PUCCH resources (e.g., PUCCH resource 1 and PUCCH resource 2 in FIG. 19). The second PUCCH resource group may comprise one or more second PUCCH resources (e.g., PUCCH resource 3 and PUCCH resource 4 in FIG. 19).

A first TRP may receive an uplink signal/channel (e.g., PUSCH, PUCCH, SRS). The first TRP may receive an uplink signal/channel (e.g., PUSCH, PUCCH, SRS), for example, from the wireless device. The first TRP may receive an uplink signal/channel (e.g., PUSCH, PUCCH, SRS), for example, via the first PUCCH resource group. Receiving the uplink signal/channel via the first PUCCH resource group may comprise that the first TRP receives (or monitors for) the uplink signal/channel via a PUCCH resource (e.g., PUCCH resource 1, and PUCCH resource 2) among the first PUCCH resource group. The first TRP may not receive an uplink signal/channel via the second PUCCH resource group. Not receiving the uplink signal/channel via the second PUCCH resource group may comprise the first TRP does not receiving (or not monitoring for) the uplink signal/channel via a PUCCH resource (e.g., PUCCH resource 3 and PUCCH resource 4 in FIG. 19) among the second PUCCH resource group. The second TRP may receive an uplink signal/channel. The second TRP may receive an uplink signal/channel, for example, from the wireless device. The second TRP may receive an uplink signal/channel, for example, via the second PUCCH resource group. Receiving the uplink signal/channel via the second PUCCH resource group may comprise that the second TRP receives (or monitors for) the uplink signal/channel via a PUCCH resource (e.g., PUCCH resource 3 and PUCCH resource 4 in FIG. 19) among the second PUCCH resource group. The second TRP may not receive an uplink signal/channel via the first PUCCH resource group. Not receiving the uplink signal/channel via the first PUCCH resource group may comprise the second TRP not receiving (or not monitoring for) the uplink signal/channel via a PUCCH resource (e.g., PUCCH resource 1 and PUCCH resource 2) among the first PUCCH resource group.

The one or more configuration parameters may indicate PUCCH resource indexes (e.g., provided by a higher layer parameter PUCCH-ResourceId). The one or more configuration parameters may indicate PUCCH resource indexes (e.g., provided by a higher layer parameter PUCCH-ResourceId), for example, for the plurality of PUCCH resources. Each PUCCH resource of the plurality of PUCCH resources may be identified/indicated by a respective PUCCH resource index of the PUCCH resource indexes. A first PUCCH resource of the plurality of PUCCH resources may be identified/indicated by a first PUCCH resource index of the PUCCH resource indexes. A second PUCCH resource of the plurality of PUCCH resources may be identified/indicated by a second PUCCH resource index of the PUCCH resource indexes.

The one or more configuration parameters may indicate PUCCH resource group indexes. The one or more configuration parameters may indicate PUCCH resource group indexes, for example, for the plurality of PUCCH resources. Each PUCCH resource of the plurality of PUCCH resources may be identified/indicated by (or associated with or configured with) a respective PUCCH resource group index of the PUCCH resource group indexes. A first PUCCH resource in a first PUCCH resource group of the plurality of PUCCH resource groups may be identified/indicated by (or associated with or configured with) a first PUCCH resource group index of the PUCCH resource group indexes. A second PUCCH resource in the first PUCCH resource group may be identified/indicated by (or associated with or configured with) a second PUCCH resource group index of the PUCCH resource group indexes. A third PUCCH resource in a second PUCCH resource group of the plurality of PUCCH resource groups may be identified/indicated by (or associated with or configured with) a third PUCCH resource group index of the PUCCH resource group indexes. A fourth PUCCH resource in the second PUCCH resource group may be identified by (or associated with or configured with) a fourth PUCCH resource group index of the PUCCH resource group indexes.

A PUCCH resource being identified/indicated by (or associated with or configured with) a PUCCH resource group index may comprise that the one or more configuration parameters indicate the PUCCH resource group index for the PUCCH resource. The one or more configuration parameters for the PUCCH resource may comprise the PUCCH resource group index for the PUCCH resource. A PUCCH resource set may comprise a first PUCCH resource (e.g., PUCCH resource 1 in FIG. 19). A PUCCH resource set may comprise a first PUCCH resource (e.g., PUCCH resource 1 in FIG. 19), for example, in/from/among the first PUCCH resource group. A PUCCH resource set may comprise a second PUCCH resource (e.g., PUCCH resource 4 in FIG. 19). A PUCCH resource set may comprise a second PUCCH resource (e.g., PUCCH resource 4 in FIG. 19), for example, in/from/among the second PUCCH resource group. A PUCCH resource set may comprise a first PUCCH resource (e.g., PUCCH resource 1 in FIG. 19) and a second PUCCH resource (e.g., PUCCH resource 4 in FIG. 19).

A PUCCH resource being identified/indicated by (or associated with or configured with) a PUCCH resource group index may comprise that the one or more configuration parameters indicate the PUCCH resource group index for a PUCCH resource set comprising the PUCCH resource. The one or more configuration parameters for the PUCCH resource set may comprise the PUCCH resource group index. The one or more configuration parameters for the PUCCH resource may not comprise the PUCCH resource group index for the PUCCH resource. A PUCCH resource set comprising a first PUCCH resource in/from/among the first PUCCH resource group may not comprise a second PUCCH resource in/from/among the second PUCCH resource group. A PUCCH resource set comprising a second PUCCH resource in/from/among the second PUCCH resource group may not comprise a first PUCCH resource in/from/among the first PUCCH resource group.

The wireless device may group one or more PUCCH resources, of the plurality of PUCCH resources, with (or identified/indicated by or associated with or configured with) the same PUCCH resource group index in a (same) PUCCH resource group of the plurality of PUCCH resource groups. The wireless device may group PUCCH resources, of the plurality of PUCCH resources, with different PUCCH resource group indexes in different PUCCH resource groups. One or more PUCCH resources, of the plurality of PUCCH resources, in a PUCCH resource group of the plurality of PUCCH resource groups may have (or be configured with or associated with) the same PUCCH resource group index. The one or more configuration parameters may indicate the same PUCCH resource group index for the one or more PUCCH resources in the PUCCH resource group. One or more PUCCH resource group indexes of the one or more PUCCH resources in the PUCCH resource group may be the same/equal. A respective PUCCH resource group index of each PUCCH resource of the one or more PUCCH resources in the PUCCH resource group may be the same/equal.

The one or more first PUCCH resources in the first PUCCH resource group may have/share (or be configured with or be associated with or identified with) the same PUCCH resource group index (e.g., zero, one, two, etc., for example PUCCH resource group index 1 and PUCCH resource group index 2 in PUCCH resource group 1 are equal to 0). The one or more configuration parameters may indicate the same PUCCH resource group index for the one or more first PUCCH resources in the first PUCCH resource group. The one or more configuration parameters may indicate the same PUCCH resource group index for each PUCCH resource of the one or more first PUCCH resources in the first PUCCH resource group. A first PUCCH resource group index (e.g., PUCCH resource group index 1 in FIG. 19) of a first PUCCH resource (e.g., PUCCH resource 1 in FIG. 19) in the first PUCCH resource group (e.g., PUCCH resource group 1 in FIG. 19) and a second PUCCH resource group index (e.g., PUCCH resource group index 2 in FIG. 19) of a second PUCCH resource (e.g., PUCCH resource 2 in FIG. 19) in the first PUCCH resource group may be the same/equal. The wireless device may group the first PUCCH resource and the second PUCCH resource in the first PUCCH resource group. The wireless device may group the first PUCCH resource and the second PUCCH resource in the first PUCCH resource group, for example, based on the first PUCCH resource group index and the second PUCCH resource group index being the same/equal. The first PUCCH resource and the second PUCCH resource may be in the same PUCCH resource group (e.g., the first PUCCH resource group). The first PUCCH resource and the second PUCCH resource may be in the same PUCCH resource group (e.g., the first PUCCH resource group), for example, based on the first PUCCH resource group index and the second PUCCH resource group index being the same/equal.

The one or more second PUCCH resources in the second PUCCH resource group may have/share (or be configured with or be associated with or identified/indicated with) the same PUCCH resource group index (e.g., zero, one, two, etc., for example PUCCH resource group index 3 and PUCCH resource group index 4 in PUCCH resource group 2 are equal to 1). The one or more configuration parameters may indicate the same PUCCH resource group index for the one or more second PUCCH resources in the second PUCCH resource group. The one or more configuration parameters may indicate the same PUCCH resource group index for each PUCCH resource of the one or more second PUCCH resources in the second PUCCH resource group. A first PUCCH resource group index (e.g., PUCCH resource group index 3 in FIG. 19) of a first PUCCH resource (e.g., PUCCH resource 3 in FIG. 19) in the second PUCCH resource group (e.g., PUCCH resource group 2 in FIG. 19) and a second PUCCH resource group index (e.g., PUCCH resource group index 4 in FIG. 19) of a second PUCCH resource (e.g., PUCCH resource 4 in FIG. 19) in the second PUCCH resource group may be the same/equal. The wireless device may group the first PUCCH resource and the second PUCCH resource in the second PUCCH resource group. The wireless device may group the first PUCCH resource and the second PUCCH resource in the second PUCCH resource group, for example, based on the first PUCCH resource group index and the second PUCCH resource group index being the same/equal. The first PUCCH resource and the second PUCCH resource may be in the same PUCCH resource group (e.g., the second PUCCH resource group). The first PUCCH resource and the second PUCCH resource may be in the same PUCCH resource group (e.g., the second PUCCH resource group), for example, based on the first PUCCH resource group index and the second PUCCH resource group index being the same/equal.

A first PUCCH resource group index (e.g., PUCCH resource group index 1 in FIG. 19) of a first PUCCH resource (e.g., PUCCH resource 1 in FIG. 19) and a second PUCCH resource group index (e.g., PUCCH resource group index 4 in FIG. 19) of a second PUCCH resource (e.g., PUCCH resource 4 in FIG. 19) may be different. The wireless device may group the first PUCCH resource and the second PUCCH resource in different PUCCH resource groups. The wireless device may group the first PUCCH resource and the second PUCCH resource in different PUCCH resource groups, for example, based on the first PUCCH resource group index and the second PUCCH resource group index being different. The wireless device may group the first PUCCH resource in a first PUCCH resource group. The wireless device may group the second PUCCH resource in a second PUCCH resource group that is different from the first PUCCH resource group. The wireless device may group the second PUCCH resource in a second PUCCH resource group that is different from the first PUCCH resource group, for example, based on the first PUCCH resource group index and the second PUCCH resource group index being different.

The plurality of PUCCH resource groups may be identified/indicated by (or associated with) group indexes. Each PUCCH resource group of the plurality of PUCCH resource groups may be identified by a respective group index of the group indexes. The one or more configuration parameters may indicate the group indexes for the plurality of PUCCH resource groups. A first PUCCH resource group (e.g., PUCCH resource group 1 in FIG. 19) of the plurality of PUCCH resource groups may be identified by (or associated with) a first group index (e.g., zero) of the group indexes. The first PUCCH resource group being identified/indicated by (or associated with) the first group index may comprise that a respective PUCCH resource group index of each PUCCH resource in the first PUCCH resource group is equal to the first group index. The first PUCCH resource group being identified/indicated by (or associated with) the first group index may comprise that a respective PUCCH resource group index of each PUCCH resource of one or more first PUCCH resources in the first PUCCH resource group is equal to the first group index. The first group index may be zero. A first PUCCH resource group index (e.g., PUCCH resource group index 1=0 in FIG. 19) of a first PUCCH resource (e.g., PUCCH resource 1 in FIG. 19) in the first PUCCH resource group may be equal to the first group index (e.g., zero). A second PUCCH resource group index (e.g., PUCCH resource group index 2=0 in FIG. 19) of a second PUCCH resource (e.g., PUCCH resource 2 in FIG. 19) in the first PUCCH resource group may be equal to the first group index (e.g., zero). A second PUCCH resource group (e.g., PUCCH resource group 2 in FIG. 19) of the plurality of PUCCH resource groups may be identified by (or associated with) a second group index (e.g., one) of the group indexes. The second PUCCH resource group being identified/indicated by (or associated with) the second group index may comprise that a respective PUCCH resource group index of each PUCCH resource in the second PUCCH resource group is equal to the second group index. The second PUCCH resource group being identified/indicated by (or associated with) the second group index may comprise that a respective PUCCH resource group index of each PUCCH resource of one or more second PUCCH resources in the second PUCCH resource group is equal to the second group index. The second group index may be one. A first PUCCH resource group index (e.g., PUCCH resource group index 3=1 in FIG. 19) of a first PUCCH resource (e.g., PUCCH resource 3 in FIG. 19) in the second PUCCH resource group may be equal to the second group index (e.g., one). A second PUCCH resource group index (e.g., PUCCH resource group index 4=1 in FIG. 19) of a second PUCCH resource (e.g., PUCCH resource 4 in FIG. 19) in the second PUCCH resource group may be equal to the second group index (e.g., one).

The one or more configuration parameters (e.g., time T0 in FIG. 20) may indicate one or more beam failure detection reference signals (e.g., SS/PBCH block, CSI-RS). The one or more configuration parameters (e.g., time T0 in FIG. 20) may indicate one or more beam failure detection RSs (e.g., SS/PBCH block, CSI-RS), for example, for a beam failure detection. The one or more configuration parameters (e.g., time T0 in FIG. 20) may indicate one or more beam failure detection RSs (e.g., SS/PBCH block, CSI-RS), for example, for the downlink BWP of the cell (e.g., explicit beam failure detection configuration). The one or more configuration parameters may indicate the one or more beam failure detection RSs for the beam failure detection of the downlink BWP. The wireless device may measure/assess the one or more beam failure detection RSs for the beam failure detection of the downlink BWP.

The one or more configuration parameters may indicate a maximum BFI counter (e.g., beamFailureInstanceMaxCount). The one or more configuration parameters may indicate the maximum BFI counter for the cell. The one or more configuration parameters may indicate the maximum BFI counter for the downlink BWP of the cell. The one or more configuration parameters may indicate the maximum BFI counter for a beam failure detection of the downlink BWP of the cell.

The one or more configuration parameters may indicate a first threshold (e.g., provided by rlmInSyncOutOfSyncThreshold, Qout,LR). The one or more configuration parameters may indicate the first threshold for the cell. The one or more configuration parameters may indicate the first threshold for the downlink BWP of the cell. The one or more configuration parameters may indicate the first threshold for a beam failure detection of the downlink BWP of the cell.

The one or more configuration parameters may indicate one or more second RSs (e.g., SS/PBCH block, CSI-RS, for example candidateBeamRSList provided in IE BeamFailureRecoveryConfig). The one or more configuration parameters may indicate the one or more second RSs for the uplink BWP of the cell. The one or more configuration parameters may indicate the one or more second RSs for a BFR procedure of the downlink BWP of the cell. The wireless device may measure/assess the one or more second RSs for a candidate beam selection/identification. The wireless device may measure/assess the one or more second RSs for a candidate beam selection/identification, for example, in the BFR procedure of the downlink BWP of the cell. The wireless device may measure/assess the one or more second RSs to select/identify a candidate RS. The wireless device may measure/assess the one or more second RSs for a candidate beam selection/identification, for example, among the one or more second RSs. The wireless device may measure/assess the one or more second RSs for a candidate beam selection/identification, for example, for the candidate beam selection/identification in the BFR procedure of the downlink BWP of the cell.

The one or more configuration parameters may indicate a second threshold (e.g., provided by rsrp-ThresholdSSB in the IE BeamFailureRecoveryConfig). The one or more configuration parameters may indicate the second threshold for the cell. The one or more configuration parameters may indicate the second threshold for the downlink BWP of the cell. The one or more configuration parameters may indicate the second threshold for the uplink BWP of the cell. The one or more configuration parameters may indicate the second threshold for a candidate beam selection/identification in a BFR procedure of the downlink BWP of the cell.

The one or more configuration parameters may indicate a recovery search space set (e.g., provided by recoverySearchSpaceID in the IE BeamFailureRecoveryConfig). The one or more configuration parameters may indicate the recovery search space set, for example, for the cell. The one or more configuration parameters may indicate the recovery search space set, for example, for the downlink BWP of the cell. The one or more configuration parameters may indicate the recovery search space set, for example, for the uplink BWP of the cell. The recovery search space set may be associated with (or linked to) a CORESET (e.g., CORESET 3 (BFR CORESET) in FIG. 17, FIG. 19 and FIG. 21) of the plurality of CORESETs. The recovery search space set being associated with the CORESET may comprise that a CORESET index (e.g., controlResourceSetId in higher layer parameter SearchSpace) in the recovery search space set may indicate the CORESET. The recovery search space set being associated with the CORESET may comprise that the CORESET index in the recovery search space set may be equal to a CORESET index (e.g., controlResourceSetId in higher layer parameter ControlResourceSet) of (or identifying) the CORESET). The recovery search space set may indicate the CORESET. The one or more configuration parameters may indicate the recovery search space set (and the CORESET) for a BFR procedure of the downlink BWP of the cell. The wireless device may monitor the CORESET for (or in) the BFR procedure of the downlink BWP of the cell. The base station may configure the CORESET on the cell. The downlink BWP may comprise the CORESET. The base station may configure the CORESET on a second cell that is different from the cell.

The wireless device may determine that the one or more configuration parameters do not indicate one or more beam failure detection RSs. The wireless device may determine that the one or more configuration parameters do not indicate one or more beam failure detection RSs, for example, for a beam failure detection. The wireless device may determine that the one or more configuration parameters do not indicate one or more beam failure detection RSs, for example, for the downlink BWP of the cell (e.g., no explicit beam failure detection configuration). The wireless device may select/determine a CORESET group among the plurality of CORESET groups. The wireless device may select/determine a CORESET group among the plurality of CORESET groups, for example, based on determining that the one or more configuration parameters do not indicate the one or more beam failure detection RSs. The wireless device may select/determine the CORESET group (e.g., CORESET group 1 in FIG. 17) comprising the CORESET (e.g., CORESET 3 (BFR CORESET) in FIG. 17) associated with (or linked to) the recovery search space set.

The wireless device may determine/select one or more RSs (e.g., SS/PBCH block, CSI-RS). The wireless device may determine/select one or more RSs (e.g., SS/PBCH block, CSI-RS), for example, based on selecting/determining the CORESET group. The wireless device may determine/select one or more RSs (e.g., SS/PBCH block, CSI-RS), for example, for a beam failure detection of the downlink BWP. The wireless device may determine/select one or more RSs (e.g., SS/PBCH block, CSI-RS), for example, based on one or more CORESETs in the CORESET group (e.g., implicit beam failure detection configuration). The CORESET group may comprise the one or more CORESETs. The one or more CORESETs may exclude (or do not comprise) the CORESET associated with (or linked to) the recovery search space set.

Figure 17:
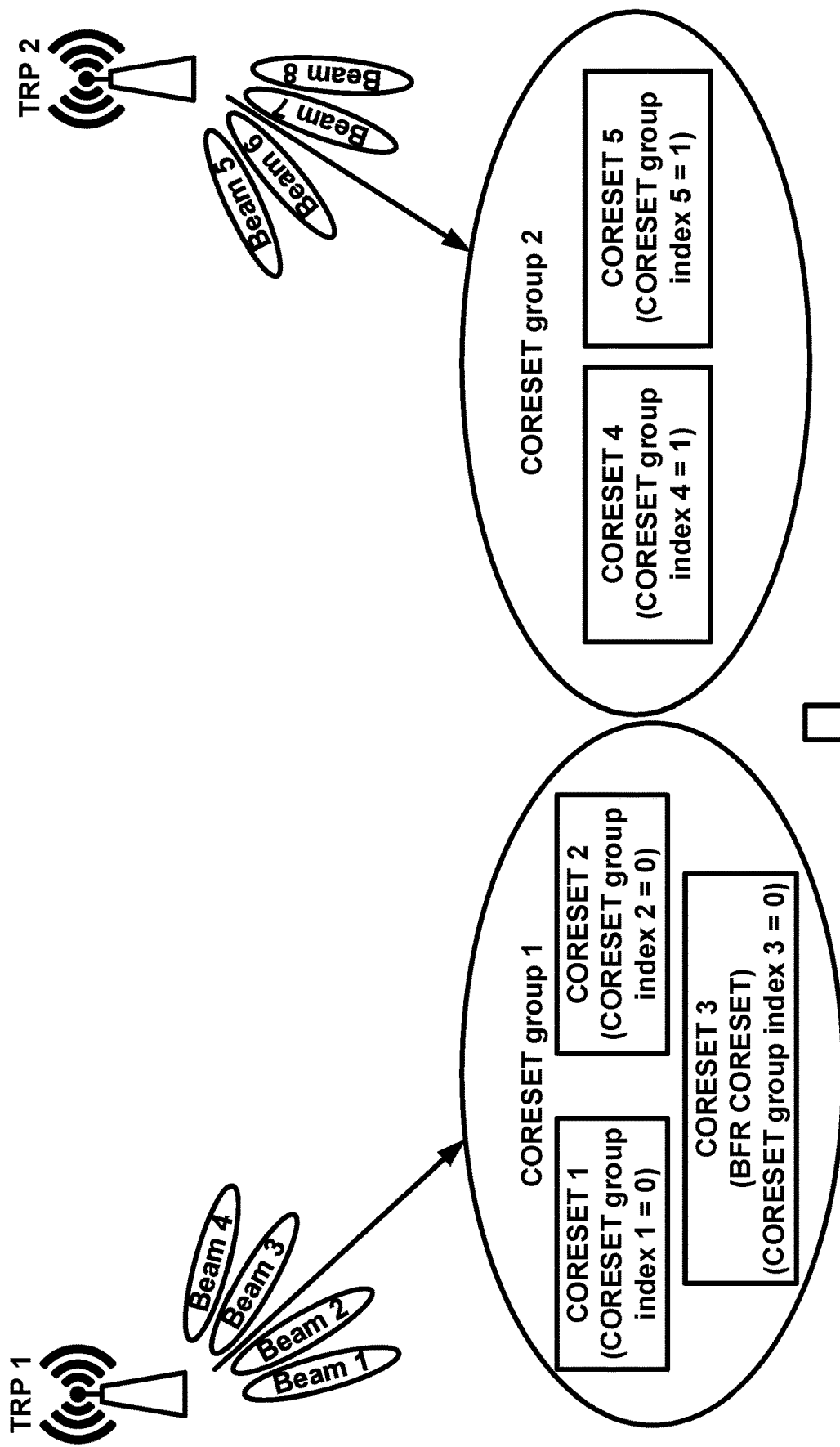
FIG. 17 shows an example of beam failure recovery (BFR).

The wireless device may not determine/select the one or more RSs from a second CORESET group (e.g., CORESET group 2 in FIG. 17). The wireless device may not determine/select the one or more RSs from a second CORESET group (e.g., CORESET group 2 in FIG. 17), for example, that are different from the (selected/determined) CORESET group. The wireless device may not determine/select the one or more RSs from a second CORESET group (e.g., CORESET group 2 in FIG. 17). The wireless device may not determine/select the one or more RSs from a second CORESET group (e.g., CORESET group 2 in FIG. 17), for example, that do not comprise the CORESET associated with (or linked to) the recovery search space set.

The wireless device may determine that the one or more configuration parameters do not indicate one or more beam failure detection RSs. The wireless device may determine that the one or more configuration parameters do not indicate one or more beam failure detection RSs, for example, for a beam failure detection. The wireless device may determine that the one or more configuration parameters do not indicate one or more beam failure detection RSs, for example, for the downlink BWP of the cell (e.g., no explicit beam failure detection configuration). The wireless device may determine that the one or more configuration parameters do not indicate a recovery search space set (e.g., provided by recoverySearchSpaceID in the IE BeamFailureRecoveryConfig). The wireless device may determine that the one or more configuration parameters do not indicate a recovery search space set (e.g., provided by recoverySearchSpaceID in the IE BeamFailureRecoveryConfig), for example, for a BFR procedure of the downlink BWP. The wireless device may select/determine a CORESET group among the plurality of CORESET groups. The wireless device may select/determine a CORESET group among the plurality of CORESET groups, for example, based on determining that the one or more configuration parameters do not indicate the one or more beam failure detection RSs and the recovery search space set. The wireless device may select/determine the CORESET group (e.g., CORESET group 1 in FIG. 18) comprising a CORESET (e.g., CORESET 3 (Broadcast CORESET) in FIG. 18). The wireless device may monitor the CORESET for an SIB. The wireless device may monitor the CORESET for an MIB. The wireless device may monitor the CORESET for paging signals. The wireless device may monitor the CORESET for random access channel messages (e.g., RAR, Msg2, Msg4, contention-resolution). The wireless device may monitor the CORESET for broadcast information. The wireless device may select/determine the CORESET group comprising the CORESET associated with (or linked to) a search space set configured with at least one of: searchSpaceZero, searchSpaceSIB1, searchSpaceOtherSystemInformation, pagingSearchSpace, ra-SearchSpace (e.g., a Type2-PDCCH CSS set, a Type1-PDCCH CSS set, a Type0-PDCCH CSS set, a Type0A-PDCCH CSS set).

The wireless device may monitor, for DCI, at least one PDCCH in the one or more CORESETs. The wireless device may monitor, for DCI, at least one PDCCH in the one or more CORESETs, for example, based on one or more TCI states (or QCL assumptions). The monitoring, for the DCI, the at least one PDCCH in the one or more CORESETs based on the one or more TCI states may comprise monitoring, for the DCI, the at least one PDCCH in each CORESET of the one or more CORESETs. The monitoring, for the DCI, the at least one PDCCH in the one or more CORESETs based on the one or more TCI states may comprise monitoring, for the DCI, the at least one PDCCH in each CORESET of the one or more CORESETs, for example, based on a respective TCI state of the one or more TCI states. The one or more RSs, for the beam failure detection, may comprise RS(s) indicated by the one or more TCI states of the one or more CORESETs. Each TCI state of the one or more TCI states may indicate a respective RS of the RS(s). The determining the one or more RSs, for the beam failure detection of the downlink BWP, based on the one or more CORESETs may comprise determining/selecting the one or more RSs. The determining the one or more RSs, for the beam failure detection of the downlink BWP, based on the one or more CORESETs may comprise determining/selecting the one or more RSs, for example, based on the RS(s) indicated by the one or more TCI states of the one or more CORESETs.

The one or more CORESETs may comprise a first CORESET (e.g., CORESET 1) and a second CORESET (e.g., CORESET 2). The one or more CORESETs may comprise a first CORESET (e.g., CORESET 1) and a second CORESET (e.g., CORESET 2), for example, if the (selected/determined) CORESET group is the first CORESET group (e.g., CORESET group 1). The one or more CORESETs may comprise the one or more first CORESETs in the first CORESET group. The wireless device may monitor, for DCI, at least one PDCCH in the first CORESET. The wireless device may monitor, for DCI, at least one PDCCH in the first CORESET, for example, based on a first TCI state indicating a first RS. Monitoring the least one PDCCH in the first CORESET based on the first TCI state indicating the first RS may comprise that (the wireless device determines that) at least one DM-RS port of the at least one PDCCH in the first CORESET is QCLed with the first RS. The wireless device may monitor, for DCI, at least one PDCCH in the second CORESET. The wireless device may monitor, for DCI, at least one PDCCH in the second CORESET, for example, based on a second TCI state indicating a second RS. Monitoring the least one PDCCH in the second CORESET based on the second TCI state indicating the second RS may comprise that (the wireless device determines that) at least one DM-RS port of the at least one PDCCH in the second CORESET is QCLed with the second RS. The one or more RSs, for the beam failure detection, may comprise the first RS indicated by the first TCI state of the first CORESET and the second RS indicated by the second TCI state of the second CORESET.

The one or more CORESETs in the CORESET group may be associated with search space sets. The one or more CORESETs in the CORESET group may be associated with search space sets, for example, with the shortest PDCCH monitoring periodicities among PDCCH monitoring periodicities of CORESETs in the CORESET group. The CORESETs in the CORESET group may comprise the one or more CORESETs. The one or more CORESETs may be a subset of the CORESETs in the CORESET group.

The one or more CORESETs in the CORESET group may be identified with the highest CORESET indexes among CORESET indexes of CORESETs in the CORESET group. The CORESETs in the CORESET group may comprise the one or more CORESETs. The one or more CORESETs may be a subset of the CORESETs in the CORESET group.

The one or more configuration parameters may indicate a response window (e.g., ra-ResponseWindow configured in BeamFailureRecoveryConfig). The one or more configuration parameters may indicate the response window, for example, for the cell. The one or more configuration parameters may indicate the response window, for example, for the downlink BWP of the cell. The one or more configuration parameters may indicate the response window, for example, for the uplink BWP of the cell. The one or more configuration parameters may indicate the response window, for example, for a BFR procedure of the downlink BWP of the cell.

The one or more configuration parameters may indicate a maximum transmission counter (e.g., sr-TransMax, bfrq-TransMax, preambleTransMax). The one or more configuration parameters may indicate the maximum transmission counter, for example, for the cell. The one or more configuration parameters may indicate the maximum transmission counter, for example, for the downlink BWP of the cell. The one or more configuration parameters may indicate the maximum transmission counter, for example, for the uplink BWP of the cell. The one or more configuration parameters may indicate the maximum transmission counter, for example, for a BFR procedure of the downlink BWP of the cell.

The wireless device (e.g., a physical layer in the wireless device) may assess/measure a radio link quality (e.g., BLER, SINR, RSRP) of the one or more RSs. The wireless device (e.g., a physical layer in the wireless device) may assess/measure a radio link quality (e.g., BLER, SINR, RSRP) of the one or more RSs, for example, for a beam failure detection of the downlink BWP. The wireless device may determine that the radio link quality of the one or more RSs is worse (e.g., higher BLER, lower L1-RSRP, lower L1-SINR) than the first threshold (e.g., provided by rlmIn-SyncOutOfSyncThreshold, Qout,LR). The radio link quality of the one or more RSs being worse than the first threshold may comprise that a respective radio link quality of each RS of the one or more RSs is worse than the first threshold. The radio link quality of the one or more RSs being worse than the first threshold may comprise that a radio link quality of each RS of the one or more RSs is worse than the first threshold.

The physical layer of the wireless device may send (e.g., transmit) a BFI indication to a higher layer (e.g., MAC) of the wireless device. The physical layer of the wireless device may transmit/provide a BFI indication to a higher layer (e.g., MAC) of the wireless device, for example, based on determining the radio link quality of the one or more RSs being worse than the first threshold.

The wireless device may increment a BFI counter (e.g., BFI_COUNTER). The wireless device may increment a BFI counter (e.g., BFI_COUNTER), for example, based on the BFI indication. The higher layer (e.g., MAC) of the wireless device may increment the BFI counter (e.g., BFI_ COUNTER). The incrementing the BFI counter (e.g., BFI_ COUNTER) may comprise incrementing the BFI counter (e.g., BFI_COUNTER) by one. The incrementing the BFI counter (e.g., BFI_COUNTER) may comprise incrementing the BFI counter (e.g., BFI_COUNTER) by a number. The number may be fixed (or preconfigured). The one or more configuration parameters may indicate the number. The BFI counter (e.g., BFI_COUNTER) may be a counter for a BFI indication. The wireless device may initially set the BFI counter (e.g., BFI_COUNTER) to zero.

The wireless device may determine that the BFI counter (e.g., BFI_COUNTER) is equal to or greater than the maximum BFI counter (e.g., beamFailureInstanceMaxCount). The wireless device may determine that the BFI counter (e.g., BFI_COUNTER) is equal to or greater than the maximum BFI counter (e.g., beamFailureInstanceMaxCount), for example, based on incrementing the BFI counter (e.g., BFI_COUNTER). The wireless device may detect a beam failure of the downlink BWP of the cell. The wireless device may detect a beam failure of the downlink BWP of the cell, for example, based on determining that the BFI counter (e.g., BFI_COUNTER) is equal to or greater than the maximum BFI counter (e.g., at time T1 in FIG. 20). The wireless device may initiate a BFR procedure for the downlink BWP. The wireless device may initiate a BFR procedure for the downlink BWP, for example, based on detecting the beam failure of the downlink BWP (e.g., at time T1 in FIG. 20). The wireless device may start a BFR timer. The wireless device may start a BFR timer, for example, if configured. The wireless device may start a BFR timer, for example, based on initiating the BFR procedure. The one or more configuration parameters may indicate a value for the BFR timer.

The wireless device may assess/measure the one or more second RSs. The wireless device may assess/measure the one or more second RSs, for example, for a candidate beam selection/identification in the BFR procedure of the downlink BWP. The wireless device may assess/measure the one or more second RSs, for example, based on initiating the BFR procedure (e.g., before time T1 in FIG. 20, between time T0 and T1 in FIG. 20). The wireless device may assess/measure the one or more second RSs, for example, based on detecting the beam failure (e.g., before time T1 in FIG. 20, between time T0 and T1 in FIG. 20). The wireless device may perform the beam failure detection and candidate beam selection/identification in parallel. The wireless device may assess/measure the one or more second RSs for the (ongoing) BFR procedure. The wireless device may assess/measure the one or more second RSs, for example, based on initiating the BFR procedure (e.g., after or at time T1 in FIG. 20). The wireless device may select/identify a candidate RS among the one or more second RSs. The wireless device may select/identify/determine a candidate RS among the one or more second RSs, for example, for the candidate beam selection/identification. The wireless device may determine that a radio link quality (e.g., SINR, L1-RSRP) of the candidate RS is better (e.g., higher SINR, higher L1-RSRP) than the second threshold (e.g., provided by rsrp-ThresholdSSB in the IE BeamFailureRecoveryConfig). The wireless device may select/identify the candidate RS, for example, based on determining that the radio link quality of the candidate RS is better than the second threshold.

The one or more configuration parameters may indicate uplink physical channels (e.g., PUCCH, PRACH, PUSCH). The uplink physical channels may comprise physical random-access channels (PRACH) resources. The uplink physical channels may comprise physical uplink control channel (PUCCH) resources. The uplink physical channels may comprise physical uplink shared channel (PUSCH) resources.

The one or more configuration parameters may indicate the uplink physical channels for a BFR procedure. The one or more configuration parameters may indicate the uplink physical channels for a BFR procedure, for example, of the cell. The one or more configuration parameters may indicate the uplink physical channels for a BFR procedure, for example, of the downlink BWP of the cell. The wireless device may use (or send (e.g., transmit) via at least one uplink physical channel of) the uplink physical channels for the BFR procedure of the downlink BWP of the cell.

The wireless device may send (e.g., transmit) an uplink signal (e.g., preamble via PRACH, BFR request (BFRQ) transmission via PUCCH, scheduling request (SR) via PUCCH, MAC-CE via PUSCH, aperiodic CSI-RS via PUSCH). The wireless device may send (e.g., transmit) an uplink signal (e.g., preamble via PRACH, BFR request (BFRQ) transmission via PUCCH, scheduling request (SR) via PUCCH, MAC-CE via PUSCH, aperiodic CSI-RS via PUSCH), for example, via at least one uplink physical channel (e.g., PRACH or PUCCH or PUSCH) of the uplink physical channels. The wireless device may send (e.g., transmit) an uplink signal (e.g., preamble via PRACH, BFR request (BFRQ) transmission via PUCCH, scheduling request (SR) via PUCCH, MAC-CE via PUSCH, aperiodic CSI-RS via PUSCH), for example, based on initiating the BFR procedure (at time T2 in FIG. 20). The at least one uplink physical channel may be associated with the candidate RS. The one or more configuration parameters may indicate the association between the at least one uplink physical channel and the candidate RS.

The wireless device may send (e.g., transmit) the uplink signal with a spatial transmission filter. The wireless device may determine the spatial transmission filter. The wireless device may determine the spatial transmission filter, for example, based on the candidate RS. The wireless device may use the spatial transmission filter for a reception of the candidate RS (e.g., under beam correspondence). The wireless device may determine the spatial transmission filter, for example, based on a beam management procedure (e.g., P1, P2, P3, U1, U2, U3, etc.).

The BFR procedure may be PUCCH-based (e.g., BFR-PUCCH). The uplink signal may be a BFRQ (e.g., BFRQ, SR, SR-like) and the at least one uplink physical channel may be a PUCCH. The uplink signal may be a BFRQ (e.g., BFRQ, SR, SR-like) and the at least one uplink physical channel may be a PUCCH, for example, based on the BFR procedure being the PUCCH-based.

The BFR procedure may be MAC-CE based (e.g., BFR-PUSCH). The uplink signal may be a MAC-CE (e.g., BFR MAC-CE) and the at least one uplink physical channel may be a PUSCH. The uplink signal may be a MAC-CE (e.g., BFR MAC-CE) and the at least one uplink physical channel may be a PUSCH, for example, based on the BFR procedure being MAC-CE based.

The BFR procedure may be PRACH-based (e.g., BFR-PRACH). The uplink signal may be a random-access preamble and the at least one uplink physical channel may be a PRACH. The uplink signal may be a random-access preamble and the at least one uplink physical channel may be a PRACH, for example, based on the BFR procedure being PRACH-based. The random-access preamble may be associated with the candidate RS. The one or more configuration parameters may indicate the association between the random-access preamble and the candidate RS.

The wireless device may start the response window (e.g., ra-responseWindow, sr-prohibit timer, bfrq-prohibit timer). The wireless device may start the response window (e.g., ra-responseWindow, sr-prohibit timer, bfrq-prohibit timer), for example, for a BFR response from the base station. The wireless device may start the response window (e.g., ra-responseWindow, sr-prohibit timer, bfrq-prohibit timer), for example, based on sending (e.g., transmitting) the uplink signal. The wireless device may monitor, for the BFR response from the base station, at least one PDCCH in the CORESET (linked to the recovery search space set) within the response window (or if the response window is running). The wireless device may monitor the at least one PDCCH in the CORESET. The wireless device may monitor the at least one PDCCH in the CORESET, for example, based on the candidate RS. Monitoring the at least one PDCCH in the CORESET based on the candidate RS may comprise that (the wireless device determines that) at least one DM-RS port of the at least one PDCCH is QCLed with the candidate RS. The at least one DM-RS port of the at least one PDCCH may be QCLed with the candidate RS with respect to a QCL type. The QCL type may be QCL TypeD. The QCL type may be QCL TypeA. The QCL type may be QCL TypeB, and so on.

The BFR response may comprise DCI indicating an uplink grant (e.g., for the cell or for the downlink BWP). The BFR response may comprise DCI indicating a downlink assignment (e.g., for the cell or for the downlink BWP). The DCI may be (configured) with a CRC scrambled by a RNTI (e.g., C-RNTI, MCS-C-RNTI) of the wireless device. The DCI may be addressed to the RNTI. The DCI may comprise a CRC scrambled by a RNTI (e.g., C-RNTI, MCS-C-RNTI)

The wireless device may increment a transmission counter (e.g., preamble_transmission_counter, sr-counter, bfrq-counter). The wireless device may increment a transmission counter (e.g., preamble_transmission_counter, sr-counter, bfrq-counter), for example, based on sending (e.g., transmitting) the uplink signal. The incrementing the transmission counter may comprise incrementing the transmission counter by one. The wireless device may (initially) set the transmission counter to an initial value (e.g., zero, one). The wireless device may (initially) set the transmission counter to an initial value (e.g., zero, one), for example, based on initiating the BFR procedure.

The wireless device may retransmit the uplink signal for the BFR procedure. The wireless device may retransmit the uplink signal for the BFR procedure, for example, until the transmission counter reaches to the maximum transmission counter.

The wireless device may not complete the BFR procedure successfully. The wireless device may complete the BFR procedure unsuccessfully. The wireless device may complete the BFR procedure unsuccessfully, for example, based on an expiry of the BFR timer. The wireless device may complete the BFR procedure unsuccessfully, for example, based on the transmission counter being equal to or greater than the maximum transmission counter.

The wireless device may receive the at least one PDCCH. The wireless device may receive the at least one PDCCH, for example, via the CORESET. The wireless device may receive the at least one PDCCH, for example, with the BFR response. The wireless device may receive the at least one PDCCH with the BFR response, for example, if monitoring, for the BFR response, the at least one PDCCH in the CORESET. The wireless device may receive the BFR response within the response window.

The wireless device may complete the BFR procedure successfully. The wireless device may complete the BFR procedure successfully, for example, based on receiving the BFR response in the CORESET (or in the recovery search space set) (e.g., at time T3 in FIG. 20). The wireless device may complete the BFR procedure successfully, for example, based on receiving the BFR response in the CORESET (or in the recovery search space set) within the response window. The wireless device may complete the BFR procedure successfully, for example, based on receiving at least one PDCCH with the BFR response in the CORESET (or in the recovery search space set) within the response window (e.g., at time T3 in FIG. 20).

One or more configuration parameters may indicate one or more spatial relations (or settings) (e.g., indicated/provided by an IE PUCCH-Spatialrelationinfo and/or provided by a higher layer parameter spatialRelationInfoToAddModList). One or more configuration parameters may indicate one or more spatial relations (or settings) (e.g., indicated/provided by an IE PUCCH-Spatialrelationinfo and/or provided by a higher layer parameter spatialRelationInfoToAddModList), for example, for the uplink BWP of the cell. The one or more spatial relations may indicate spatial relations (or settings) for PUCCH transmissions via the plurality of PUCCH resources.

The one or more configuration parameters may indicate one or more spatial relation indexes for the one or more spatial relations. Each spatial relation of the one or more spatial relations may be identified/indicated by a respective spatial relation index (e.g., provided by a higher layer parameter PUCCH-SpatialRelationInfoId) of the one or more spatial relation indexes. A first spatial relation of the one or more spatial relations may be identified/indicated by a first spatial relation index of the one or more spatial relation indexes. A second spatial relation of the one or more spatial relations may be identified/indicated by a second spatial relation index of the one or more spatial relation indexes.

The wireless device may receive an activation command (e.g., PUCCH spatial relation Activation/Deactivation MAC CE). The wireless device may receive an activation command (e.g., PUCCH spatial relation Activation/Deactivation MAC CE), for example, activating a spatial relation among the one or more spatial relations for a PUCCH resource of the plurality of PUCCH resources. The activation command may be identified/indicated by a MAC PDU subheader with LCID (e.g., index 49). The activation command may comprise a field comprising/indicating a cell index (e.g., ServCellIndex) of the cell. The field may indicate an identity of the cell for which the activation command applies. The activation command may comprise a field comprising/indicating a BWP index (e.g., BWP-Id) of the uplink BWP for which the activation command applies. The activation command may comprise a field comprising/indicating a PUCCH resource index (e.g., a higher layer parameter PUCCH-ResourceId) of the PUCCH resource. The PUCCH resource indexes may comprise the PUCCH resource index. The activation command may comprise a field comprising/indicating a PUCCH resource group index of a PUCCH resource group, among the plurality of PUCCH resource groups, comprising the PUCCH resource. The PUCCH resource group indexes may comprise the PUCCH resource group index. The activation command may comprise a field comprising a spatial relation index (e.g., PUCCH-SpatialRelationInfoId) of the spatial relation (e.g., provided by IE PUCCH-Spatialrelationinfo) among the one or more spatial relations.

The spatial relation for the PUCCH resource may provide/indicate/comprise an RS index (e.g., ssb-Index, csi-RS-Index, NZP CSI-RS resource index, srs, SRS-ResourceId). The spatial relation for the PUCCH resource may provide/indicate/comprise an RS index (e.g., ssb-Index, csi-RS-Index, NZP CSI-RS resource inde, srs, SRS-ResourceId), for example, indicating (or identifying) an RS (e.g., SS/PBCH block, CSI-RS, SRS). The one or more configuration parameters may indicate the RS index for the RS. The spatial relation may indicate the RS for spatial relationship derivation for the PUCCH resource. The spatial relation may indicate the RS to update a spatial relation of the PUCCH resource. The spatial relation may provide/indicate a spatial setting for transmission of a PUCCH (e.g., UCI, SR, HARQ-ACK, CSI report, etc.) via the PUCCH resource. The wireless device may determine a spatial domain transmission filter. The wireless device may determine a spatial domain transmission filter, for example, for transmission of the PUCCH via the PUCCH resource. The wireless device may determine a spatial domain transmission filter, for example, based on the RS.

The RS may be a downlink signal. The downlink signal may comprise an SS/PBCH block. The downlink signal may comprise a CSI-RS (e.g., periodic CSI-RS, semi-persistent CSI-RS, aperiodic CSI-RS). The downlink signal may comprise a DM-RS (e.g., for PUCCH, PUSCH, etc.). The wireless device may use a spatial domain receiving filter to receive the downlink signal. The wireless device may send (e.g., transmit) the PUCCH. The wireless device may send (e.g., transmit) the PUCCH, for example, based on the RS (e.g., indicated by the spatial relation) being the downlink signal. The wireless device may send (e.g., transmit) the PUCCH, for example, via the PUCCH resource. The wireless device may send (e.g., transmit) the PUCCH, for example, with a spatial domain transmission filter that is the same as the spatial domain receiving filter. The wireless device may send (e.g., transmit) the PUCCH, for example, with the spatial domain receiving filter.

The RS may be an uplink signal (e.g., periodic SRS, semi-persistent SRS, aperiodic SRS, DM-RS). The wireless device may use a spatial domain transmission filter to send (e.g., transmit) the uplink signal. The wireless device may send (e.g., transmit) the PUCCH, for example, based on the RS (e.g., indicated by the spatial relation) being the uplink signal. The wireless device may send (e.g., transmit) the PUCCH, for example, with a spatial domain transmission filter that is the same as the spatial domain transmission filter used to send (e.g., transmit) the uplink signal.

The wireless device may complete the BFR procedure successfully. The wireless device may complete the BFR procedure successfully, for example, based on receiving the BFR response in the CORESET (or in the recovery search space set) (e.g., at time T3 in FIG. 20). The one or more configuration parameters may indicate a CORESET group index (e.g., CORESET group index 3=0) for the CORESET. The CORESET group indexes for the plurality of CORESETs may comprise the CORESET group index. A CORESET group (e.g., CORESET group 1 in FIG. 19) of the plurality of CORESET groups may comprise the CORESET.

The wireless device may select/determine a PUCCH resource group among the plurality of PUCCH resource groups. The wireless device may select/determine the PUCCH resource group. The wireless device may select/determine the PUCCH resource group, for example, based on a group index of the PUCCH resource group and the CORESET group index. The PUCCH resource group may be identified by (or associated with) the group index that is the same as the CORESET group index of the CORESET. The group indexes of the plurality of PUCCH resource groups may comprise the group index.

The PUCCH resource group may comprise one or more PUCCH resources. The wireless device may select/determine the PUCCH resource group. The wireless device may select/determine the PUCCH resource group, for example, based on PUCCH resource group index(es) of (identifying or associated with or configured for) the one or more PUCCH resources being same as the CORESET group index. The PUCCH resource group index(es) of the one or more PUCCH resources being same as the CORESET group index may comprise that a respective PUCCH resource group index of (identifying or associated with or configured for) each PUCCH resource of the one or more PUCCH resources is the same as the CORESET group index.

The wireless device may select/determine the PUCCH resource group. The wireless device may select/determine the PUCCH resource group, for example, based on the PUCCH resource group being associated with the CORESET group comprising the CORESET. The PUCCH resource group being associated with the CORESET group may comprise that a TRP sends (e.g., transmits) via the CORESET group and receives via the PUCCH resource group. The PUCCH resource group being associated with the CORESET group may comprise that a TRP sending (e.g., transmitting) via the CORESET group may not receive (or monitor) via a second PUCCH resource group that is different from the PUCCH resource group. The PUCCH resource group being associated with the CORESET group may comprise that a group index of the PUCCH resource group and a group index of the CORESET group are the same.

The wireless device may send (e.g., transmit) a PUCCH (e.g., PUCCH transmission in FIG. 20) with the spatial transmission filter that is used to the send (e.g., transmit) the uplink signal for the BFR procedure (e.g., at time T2 in FIG. 20). The wireless device may send (e.g., transmit) a PUCCH (e.g., PUCCH transmission in FIG. 20) with the spatial transmission filter that is used to the send (e.g., transmit) the uplink signal for the BFR procedure (e.g., at time T2 in FIG. 20), for example, based on selecting/determining the PUCCH resource group. The wireless device may send (e.g., transmit) a PUCCH (e.g., PUCCH transmission in FIG. 20) with the spatial transmission filter that is used to the send (e.g., transmit) the uplink signal for the BFR procedure (e.g., at time T2 in FIG. 20), for example, via the one or more PUCCH resources in the PUCCH resource group. The sending (e.g., transmitting), via the one or more PUCCH resources in the PUCCH resource group, the PUCCH with the spatial transmission filter may comprise sending (e.g., transmitting), via each PUCCH resource of the one or more PUCCH resources in the PUCCH resource group, the PUCCH with the spatial transmission filter. The sending (e.g., transmitting), via the one or more PUCCH resources in the PUCCH resource group, the PUCCH with the spatial transmission filter may comprise sending (e.g., transmitting), via each PUCCH resource of the one or more PUCCH resources in the PUCCH resource group, a respective PUCCH with the spatial transmission filter. The wireless device may send (e.g., transmit) the PUCCH on the cell.

The wireless device may send (e.g., transmit) the PUCCH with the spatial transmission filter. The wireless device may send (e.g., transmit) the PUCCH with the spatial transmission filter, for example, via the one or more PUCCH resources in the PUCCH resource group. The wireless device may send (e.g., transmit) the PUCCH with the spatial transmission filter, for example, based on a number of symbols from a last symbol of a reception of the at least one PDCCH in the CORESET (or in the recovery search space set). The number of symbols may be fixed (e.g., 28 symbols).

The wireless device may send (e.g., transmit), via the one or more PUCCH resources in the PUCCH resource group, the PUCCH with the spatial transmission filter. The wireless device may send (e.g., transmit), via the one or more PUCCH resources in the PUCCH resource group, the PUCCH with the spatial transmission filter, for example, until the wireless device receives an activation command (e.g., PUCCH spatial relation Activation/Deactivation MAC CE) activating at least one spatial relation (e.g., PUCCH-Spatialrelationinfo) for at least one PUCCH resource of the one or more PUCCH resources in the PUCCH resource group (e.g., at time T4 in FIG. 20).

The wireless device may send (e.g., transmit), via the one or more PUCCH resources in the PUCCH resource group, the PUCCH with the spatial transmission filter. The wireless device may send (e.g., transmit), via the one or more PUCCH resources in the PUCCH resource group, the PUCCH with the spatial transmission filter, for example, until the wireless device receives an activation command (e.g., PUCCH spatial relation Activation/Deactivation MAC CE) activating at least one spatial relation (e.g., PUCCH-Spatialrelationinfo) for the one or more PUCCH resources in the PUCCH resource group (e.g., at time T4 in FIG. 20).

The wireless device may send (e.g., transmit), via a PUCCH resource of the one or more PUCCH resources in the PUCCH resource group, the PUCCH with the spatial transmission filter. The wireless device may send (e.g., transmit), via a PUCCH resource of the one or more PUCCH resources in the PUCCH resource group, the PUCCH with the spatial transmission filter, for example, until the wireless device receives an activation command (e.g., PUCCH spatial relation Activation/Deactivation MAC CE) activating a spatial relation (e.g., PUCCH-Spatialrelationinfo) for the PUCCH resource (e.g., at time T4 in FIG. 20).

The wireless device may send (e.g., transmit), via the one or more PUCCH resources in the PUCCH resource group, the PUCCH with the spatial transmission filter. The wireless device may send (e.g., transmit), via the one or more PUCCH resources in the PUCCH resource group, the PUCCH with the spatial transmission filter, for example, until the wireless device receives one or more second configuration parameters indicating at least one second spatial relation (e.g., indicated/provided by an IE PUCCH-Spatialrelationinfo and/or provided by a higher layer parameter spatialRelationInfoToAddModList) for at least one PUCCH resource of the one or more PUCCH resources in the PUCCH resource group (e.g., at time T4 in FIG. 20).

The wireless device may send (e.g., transmit), via the one or more PUCCH resources in the PUCCH resource group, the PUCCH with the spatial transmission filter. The wireless device may send (e.g., transmit), via the one or more PUCCH resources in the PUCCH resource group, the PUCCH with the spatial transmission filter, for example, until the wireless device receives one or more second configuration parameters indicating one or more second spatial relations (e.g., indicated/provided by an IE PUCCH-Spatialrelationinfo and/or provided by a higher layer parameter spatialRelationInfoToAddModList) for the one or more PUCCH resources in the PUCCH resource group (e.g., at time T4 in FIG. 20).

The wireless device may send (e.g., transmit), via a PUCCH resource of the one or more PUCCH resources in the PUCCH resource group, the PUCCH with the spatial transmission filter. The wireless device may send (e.g., transmit), via a PUCCH resource of the one or more PUCCH resources in the PUCCH resource group, the PUCCH with the spatial transmission filter, for example, until the wireless device receives one or more second configuration parameters indicating a second spatial relation (e.g., indicated/provided by an IE PUCCH-Spatialrelationinfo and/or provided by a higher layer parameter spatialRelation InfoToAddModList) for the PUCCH resource (e.g., at time T4 in FIG. 20).

A second PUCCH resource group different from the (selected/determined) PUCCH resource group may comprise one or more second PUCCH resources. The second PUCCH resource group may be identified by (or associated with) a second group index that is different from the CORESET group index of the CORESET. The group indexes of the plurality of PUCCH resource groups may comprise the second group index. Second PUCCH resource group index(es) of (identifying or associated with or configured for) the one or more second PUCCH resources may be different from the CORESET group index. The second PUCCH resource group index(es) of the one or more second PUCCH resources being different from the CORESET group index may comprise that a respective PUCCH resource group index of (identifying or associated with or configured for) each PUCCH resource of the one or more second PUCCH resources is different from the CORESET group index. The second group index of the second PUCCH resource group may be different from the group index of the PUCCH resource group.

The wireless device may receive one or more activation commands (e.g., PUCCH spatial relation Activation/Deactivation MAC CE). The wireless device may receive one or more activation commands (e.g., PUCCH spatial relation Activation/Deactivation MAC CE), for example, activating spatial relations among the one or more spatial relations for the one or more second PUCCH resources in the second PUCCH resource group. The wireless device may determine one or more spatial domain transmission filters. The wireless device may determine one or more spatial domain transmission filters, for example, for transmission of PUCCH via the one or more second PUCCH resources. The wireless device may determine one or more spatial domain transmission filters, for example, based on receiving the one or more activation commands the RS activating the spatial relations. The wireless device may send (e.g., transmit), via each PUCCH resource of the one or more second PUCCH resources, the PUCCH with a respective spatial domain transmission filter of the one or more spatial domain transmission filters.

The wireless device may send (e.g., transmit) PUCCH. The wireless device may send (e.g., transmit) PUCCH, for example, based on selecting/determining the PUCCH resource group. The wireless device may send (e.g., transmit) PUCCH, for example, via the one or more second PUCCH resources in the second PUCCH resource group that is different from the PUCCH resource group. The wireless device may send (e.g., transmit) PUCCH, for example, with the one or more spatial domain transmission filters that is different from the spatial transmission filter used for transmission via the one or more PUCCH resources in the PUCCH resource group.

The wireless device may send (e.g., transmit) PUCCH. The wireless device may send (e.g., transmit) PUCCH, for example, based on selecting/determining the PUCCH resource group. The wireless device may send (e.g., transmit) PUCCH, for example, via the one or more second PUCCH resources in the second PUCCH resource group that is different from the PUCCH resource group. The wireless device may send (e.g., transmit) PUCCH, for example, with the one or more spatial domain transmission filters. Each of the one or more spatial domain transmission filters may or may not be different from the spatial transmission filter used for transmission via the one or more PUCCH resources in the PUCCH resource group.

The wireless device may send (e.g., transmit) a PUCCH (e.g., PUCCH transmission in FIG. 20). The wireless device may send (e.g., transmit) a PUCCH (e.g., PUCCH transmission in FIG. 20), for example, based on selecting/determining the PUCCH resource group. The wireless device may send (e.g., transmit) a PUCCH (e.g., PUCCH transmission in FIG. 20), for example, via the one or more PUCCH resources in the PUCCH resource group. The wireless device may send (e.g., transmit) a PUCCH (e.g., PUCCH transmission in FIG. 20), for example, with a transmission power.

The wireless device may reset an accumulation of a power control adjustment state (e.g., PUSCH power control adjustment state). The wireless device may reset an accumulation of a power control adjustment state (e.g., PUSCH power control adjustment state), for example, to a value. The value may be zero (e.g., 1=0). The wireless device may determine the transmission power of the PUCCH. The wireless device may determine the transmission power of the PUCCH, for example, based on resetting the accumulation of a power control adjustment state (e.g., PUSCH power control adjustment state) to the value (e.g., 1=0).

The wireless device may calculate a downlink pathloss estimation (e.g., in dB) for the transmission power of the PUCCH. The wireless device may calculate a downlink pathloss estimation (e.g., in dB) for the transmission power of the PUCCH, for example, based on measuring/assessing the candidate RS (e.g., q_d=candidate reference signal).

The wireless device may set a value of a power control parameter/index to zero (e.g., q_u=0). The wireless device may determine the transmission power (e.g., $P_{O\_UE\_PUCCH}(q_u)$) of the PUCCH. The wireless device may determine the transmission power (e.g., $P_{O\_UE\_PUCCH}(q_u)$) of the PUCCH, for example, based on setting the value of the power control parameter/index to zero.

The wireless device may determine the transmission power. The wireless device may determine the transmission power, for example, based on the power control parameter/index being set to zero (e.g., q_u=0), the candidate RS (e.g., q_d=candidate reference signal), and the accumulation of a power control adjustment state set to the value (e.g., 1=0). The wireless device may determine the transmission power, for example, until the wireless device receives one or more second configuration parameters indicating one or more second spatial relations (e.g., indicated/provided by an IE PUCCH-Spatialrelationinfo and/or provided by a higher layer parameter spatialRelationInfoToAddModList) for the one or more PUCCH resources in the PUCCH resource group (e.g., at time T4 in FIG. 20).

The wireless device may determine the transmission power. The wireless device may determine the transmission power, for example, based on the power control parameter/index being set to zero (e.g., q_u=0), the candidate RS (e.g., q_d=candidate reference signal), and the accumulation of a power control adjustment state set to the value (e.g., 1=0). The wireless device may determine the transmission power, for example, until the wireless device receives an activation command (e.g., PUCCH spatial relation Activation/Deactivation MAC CE) activating at least one spatial relation (e.g., PUCCH-Spatialrelationinfo) for the one or more PUCCH resources in the PUCCH resource group (e.g., at time T4 in FIG. 20).

The wireless device may send (e.g., transmit) a PUCCH transmission. The wireless device may send (e.g., transmit) a PUCCH transmission, for example, based on selecting/determining the PUCCH resource group. The wireless device may send (e.g., transmit) a PUCCH transmission, for example, via the one or more second PUCCH resources in the second PUCCH resource group that is different from the PUCCH resource group. The wireless device may send (e.g., transmit) a PUCCH transmission, for example, using a second transmission power. The wireless device may determine the second transmission power with existing parameters. The wireless device determining the second transmission power with existing parameters may comprise that the wireless device does not set power control parameter/index set to zero (e.g., q_u=! 0). The wireless device determining the second transmission power with existing parameters may comprise that the wireless device does not calculate/determine the downlink pathloss estimation based on the candidate RS (e.g., q_d=! candidate reference signal, or q_d is not equal to the candidate beam). The wireless device determining the second transmission power with existing parameters may comprise that the wireless device does not set the value of the accumulation of a power control adjustment state to zero (e.g., 1=! 0).

The wireless device may complete the BFR procedure successfully. The wireless device may complete the BFR procedure successfully, for example, based on receiving the BFR response in the CORESET (or in the recovery search space set) (e.g., at time T3 in FIG. 20).

The one or more configuration parameters may indicate a CORESET group index (e.g., CORESET group index 3=0) for the CORESET. The CORESET group indexes for the plurality of CORESETs may comprise the CORESET group index. A CORESET group of the plurality of CORESET groups may comprise the CORESET.

The one or more configuration parameters may not indicate a CORESET group index for the CORESET. The wireless device may group/add/include the CORESET in a CORESET group of the plurality of CORESET groups. The wireless device may group/add/include the CORESET in a CORESET group of the plurality of CORESET groups, for example, based on the one or more configuration parameters not indicating the CORESET group index for the CORESET. The wireless device may select/determine the CORESET group with a lowest (or highest) group index among the group indexes of the plurality of CORESET groups. The wireless device may select/determine the CORESET group comprising a second CORESET (e.g., CORESET 3 (Broadcast CORESET) in FIG. 18) associated with (or linked to) a search space set configured with at least one of: searchSpaceZero, searchSpaceSIB1, searchSpaceOtherSystemInformation, pagingSearchSpace, ra-SearchSpace (e.g., a Type2-PDCCH CSS set, a Type1-PDCCH CSS set, a Type0-PDCCH CSS set, a Type0A-PDCCH CSS set).

The wireless device may determine whether a second CORESET, of the plurality of CORESETs, is configured with the CORESET group index of the CORESET. The wireless device may determine whether the second CORESET is configured with the CORESET group index of the CORESET. The wireless device may determine whether the second CORESET is configured with the CORESET group index of the CORESET, for example, based on completing the BFR procedure successfully. The wireless device may determine whether a second CORESET group index of the second CORESET is the same as the CORESET group index of the CORESET. The wireless device may determine whether a second CORESET group index of the second CORESET is the same as the CORESET group index of the CORESET, for example, based on completing the BFR procedure successfully. The CORESET group indexes for the plurality of CORESETs may comprise the second CORESET group index of the second CORESET. The second CORESET (e.g., CORESET 4 in FIG. 21) may be identified with a CORESET index that is equal to zero (e.g., CORESET index=0 in FIG. 21). The one or more configuration parameters may indicate the CORESET index for the second CORESET. The CORESET indexes (e.g., provided by a higher layer parameter ControlResourceSetId) for the plurality of CORESETs may comprise that CORESET index.

The wireless device may monitor, for DCI, at least one PDCCH in the second CORESET. The wireless device may monitor, for DCI, at least one PDCCH in the second CORESET, for example, based on an RS (e.g., SS/PBCH block). The wireless device may receive an activation command (e.g., MAC CE) indicating a TCI state of the downlink BWP. The TCI state may indicate the RS. The TCI state may indicate a second RS that is QCLed with the RS. The wireless device may select/identify/determine the RS for a random access procedure. The wireless device may not initiate the random access procedure. The wireless device may not initiate the random access procedure, for example, based on receiving a PDCCH order.

The wireless device may monitor, for DCI, at least one PDCCH in the second CORESET. The wireless device may monitor, for DCI, at least one PDCCH in the second CORESET, for example, based on determining whether the second CORESET group index of the second CORESET is the same as the CORESET group index of the CORESET. The wireless device may monitor, for DCI, at least one PDCCH in the second CORESET, for example, based on the candidate RS or the RS.

The wireless device may select a selected RS among the candidate RS and the RS. The wireless device may select a selected RS among the candidate RS and the RS, for example, based on determining whether the second CORESET group index of the second CORESET is the same as the CORESET group index of the CORESET. The wireless device may monitor, for DCI, at least one PDCCH in the second CORESET. The wireless device may monitor, for DCI, at least one PDCCH in the second CORESET, for example, based on selecting the selected RS. The wireless device may monitor, for DCI, at least one PDCCH in the second CORESET, for example, based on the selected RS.

The wireless device may determine that the second CORESET group index of the second CORESET is the same as the CORESET group index of the CORESET. The wireless device may monitor, for DCI, at least one PDCCH in the second CORESET. The wireless device may monitor, for DCI, at least one PDCCH in the second CORESET, for example, based on determining that the second CORESET group index of the second CORESET is the same as the CORESET group index of the CORESET. The wireless device may monitor, for DCI, at least one PDCCH in the second CORESET, for example, based on the candidate RS. The wireless device may select the candidate RS as the selected RS. The wireless device may select the candidate RS as the selected RS, for example, based on determining that the second CORESET group index of the second CORESET is the same as the CORESET group index of the CORESET. The wireless device may monitor, for the DCI, the at least one PDCCH in the second CORESET. The wireless device may monitor, for the DCI, the at least one PDCCH in the second CORESET, for example, based on the candidate RS. The wireless device may monitor, for the DCI, the at least one PDCCH in the second CORESET, for example, based on a number/quantity of symbols (e.g., 28 symbols or any other quantity of symbols) from a last symbol of a reception of at least one PDCCH in the CORESET (or in the recovery search space set).

The wireless device may determine that the second CORESET group index of the second CORESET is different from the CORESET group index of the CORESET. The wireless device may monitor, for DCI, at least one PDCCH in the second CORESET. The wireless device may monitor, for DCI, at least one PDCCH in the second CORESET, for example, based on determining that the second CORESET group index of the second CORESET is different from the CORESET group index of the CORESET. The wireless device may monitor, for DCI, at least one PDCCH in the second CORESET, for example, based on the RS. The wireless device may select/determine the RS as the selected RS. The wireless device may select the RS as the selected RS, for example, based on determining that the second CORESET group index of the second CORESET is different from the CORESET group index of the CORESET.

Monitoring, for the DCI, the at least one PDCCH in the second CORESET based on the candidate RS may comprise that (the wireless device determines that) at least one DM-RS port of the at least one PDCCH in the second CORESET QCLed with the candidate RS. The candidate RS may have one or more first antenna port QCL parameters (e.g., Doppler shift, Doppler spread, average delay, delay spread, spatial receiving filter, etc.). The monitoring the second CORESET based on the candidate RS may comprise that the wireless device determines/assumes, for PDCCH monitoring in the second CORESET with the CORESET index that is equal to zero, one or more second antenna port QCL parameters that is/are the same as the one or more first antenna port QCL parameters of the candidate RS. The monitoring the second CORESET based on the candidate RS may comprise that (the wireless device determines/assumes that) one or more second antenna port QCL parameters used for PDCCH monitoring in the second CORESET is/are the same as the one or more first antenna port QCL parameters of the candidate RS.

The one or more configuration parameters may not indicate a second CORESET group index for the second CORESET. The wireless device may receive a system information (e.g., SIB) indicating the second CORESET group index for the second CORESET. The wireless device may receive the system information in DL-SCH.

The one or more configuration parameters may not indicate a second CORESET group index for the second CORESET. The system information may not indicate the second CORESET group index for the second CORESET. The wireless device may group/add/include the second CORESET in a CORESET group of the plurality of CORESET groups. The wireless device may select/determine the CORESET group with a lowest (or highest) group index among the group indexes of the plurality of CORESET groups. The wireless device may select/determine the CORESET group comprising a third CORESET (e.g., CORESET 3 (Broadcast CORESET) in FIG. 18) associated with (or linked to) a search space set configured with at least one of: searchSpaceZero, searchSpaceSIB1, searchSpaceOtherSystemInformation, pagingSearchSpace, ra-Search Space (e.g., a Type2-PDCCH CSS set, a Type1-PDCCH CSS set, a Type0-PDCCH CSS set, a Type0A-PDCCH CSS set).

The wireless device may determine whether a second CORESET, of the plurality of CORESETs, and the CORESET are in the same CORESET group. The wireless device may determine whether the second CORESET is in the CORESET group comprising the CORESET. The wireless device may determine whether a second CORESET group comprising the second CORESET is the same as the CORESET group comprising the CORESET. The wireless device may determine whether a second CORESET group comprising the second CORESET is the same as the CORESET group comprising the CORESET, for example, based on completing the BFR procedure successfully. The plurality of CORESET groups may comprise the second CORESET group. The second CORESET group (e.g., CORESET group 2 in FIG. 21) may comprise the second CORESET (e.g., CORESET 4 in FIG. 21). The second CORESET may be identified/indicated with a CORESET index that is equal to zero (e.g., CORESET index=0 in FIG. 21). The one or more configuration parameters may indicate the CORESET index for the second CORESET. The CORESET indexes (e.g., provided by a higher layer parameter ControlResourceSetId) for the plurality of CORESETs may comprise that CORESET index.

The wireless device may monitor, for DCI, at least one PDCCH in the second CORESET. The wireless device may monitor, for DCI, at least one PDCCH in the second CORESET, for example, based on determining whether the second CORESET group comprising the second CORESET is the same as the CORESET group comprising the CORESET. The wireless device may monitor, for DCI, at least one PDCCH in the second CORESET, for example, based on the candidate RS or the RS.

The wireless device may select a selected RS among the candidate RS and the RS. The wireless device may select a selected RS among the candidate RS and the RS, for example, based on determining whether the second CORESET group comprising the second CORESET is the same as the CORESET group comprising the CORESET. The wireless device may monitor, for DCI, at least one PDCCH in the second CORESET. The wireless device may monitor, for DCI, at least one PDCCH in the second CORESET, for example, based on selecting the selected RS. The wireless device may monitor, for DCI, at least one PDCCH in the second CORESET, for example, based on selected RS.

The wireless device may determine that the second CORESET group (e.g., CORESET group 1) comprising the second CORESET is the same as the CORESET group (e.g., CORESET group 1) comprising the CORESET. The wireless device may monitor, for DCI, at least one PDCCH in the second CORESET. The wireless device may monitor, for DCI, at least one PDCCH in the second CORESET, for example, based on determining that the second CORESET group (e.g., CORESET group 1) comprising the second CORESET is the same as the CORESET group (e.g., CORESET group 1) comprising the CORESET. The wireless device may monitor, for DCI, at least one PDCCH in the second CORESET, for example, based on the candidate RS. The wireless device may select the candidate RS as the selected RS. The wireless device may select the candidate RS as the selected RS, for example, based on determining that the second CORESET group (e.g., CORESET group 1) comprising the second CORESET is the same as the CORESET group (e.g., CORESET group 1) comprising the CORESET.

The wireless device may determine that the second CORESET group (e.g., CORESET group 2 in FIG. 21) comprising the second CORESET is different from the CORESET group (e.g., CORESET group 1 in FIG. 21) comprising the CORESET. The wireless device may monitor, for DCI, at least one PDCCH in the second CORESET. The wireless device may monitor, for DCI, at least one PDCCH in the second CORESET, for example, based on determining that the second CORESET group (e.g., CORESET group 2 in FIG. 21) comprising the second CORESET is different from the CORESET group (e.g., CORESET group 1 in FIG. 21) comprising the CORESET. The wireless device may monitor, for DCI, at least one PDCCH in the second CORESET, for example, based on the RS. The wireless device may select the RS as the selected RS. The wireless device may select the RS as the selected RS, for example, based on determining that the second CORESET group (e.g., CORESET group 2 in FIG. 21) comprising the second CORESET is different from the CORESET group (e.g., CORESET group 1 in FIG. 21) comprising the CORESET.

The base station may validate that the second CORESET with the CORESET index that is equal to zero and the CORESET associated with (or linked to) the recovery search space set are in the same CORESET group. The one or more configuration parameters may indicate same CORESET group index for the CORESET and the second CORESET. The second CORESET group index of the second CORESET and the CORESET group index of the CORESET may be the same. The second CORESET group index of the second CORESET and the CORESET group index of the CORESET may be the same, for example, based on the one or more configuration parameters indicating the same CORESET group index.

The second CORESET group index indicated by the system information and the CORESET group index indicted by the one or more configuration parameters may be the same. The wireless device may receive the system information indicating a second CORESET group index for the second CORESET. The one or more configuration parameters may indicate a CORESET group index for the CORESET. The second CORESET group index and the CORESET group index may be the same.

The wireless device may validate that the second CORESET with the CORESET index that is equal to zero and the CORESET associated with (or linked to) the recovery search space set are in the same CORESET group. The wireless device may not be expected to be configured with the second CORESET and the CORESET in different CORESET groups.

The one or more configuration parameters may indicate the second CORESET group index of the second CORESET. The one or more configuration parameters may not indicate a CORESET group index for the CORESET. The wireless device may group/add/include the CORESET in the second CORESET group comprising the second CORESET. The wireless device may group/add/include the CORESET in the second CORESET group comprising the second CORESET, for example, based on the one or more configuration parameters not indicating the CORESET group index for the CORESET.

The one or more configuration parameters may not indicate a second CORESET group index for the second CORESET. The one or more configuration parameters may indicate a CORESET group index for the CORESET. The wireless device may group/add/include the second CORESET in the CORESET group comprising the CORESET. The wireless device may group/add/include the second CORESET in the CORESET group comprising the CORESET, for example, based on the one or more configuration parameters not indicating the second CORESET group index for the second CORESET.

The one or more configuration parameters may not indicate a second CORESET group index for the second CORESET. The one or more configuration parameters may not indicate a CORESET group index for the CORESET. The wireless device may group/add/include the second CORESET and the CORESET in the same CORESET group of the plurality of CORESET groups. The wireless device may select/determine the CORESET group with a lowest (or highest) group index among the group indexes of the plurality of CORESET groups. The wireless device may select/determine the CORESET group comprising a third CORESET (e.g., CORESET 3 (Broadcast CORESET) in FIG. 18) associated with (or linked to) a search space set configured with at least one of: searchSpaceZero, searchSpaceSIB1, searchSpaceOtherSystemInformation, pagingSearchSpace, ra-SearchSpace (e.g., a Type2-PDCCH CSS set, a Type1-PDCCH CSS set, a Type0-PDCCH CSS set, a Type0A-PDCCH CSS set).

Figure 22:
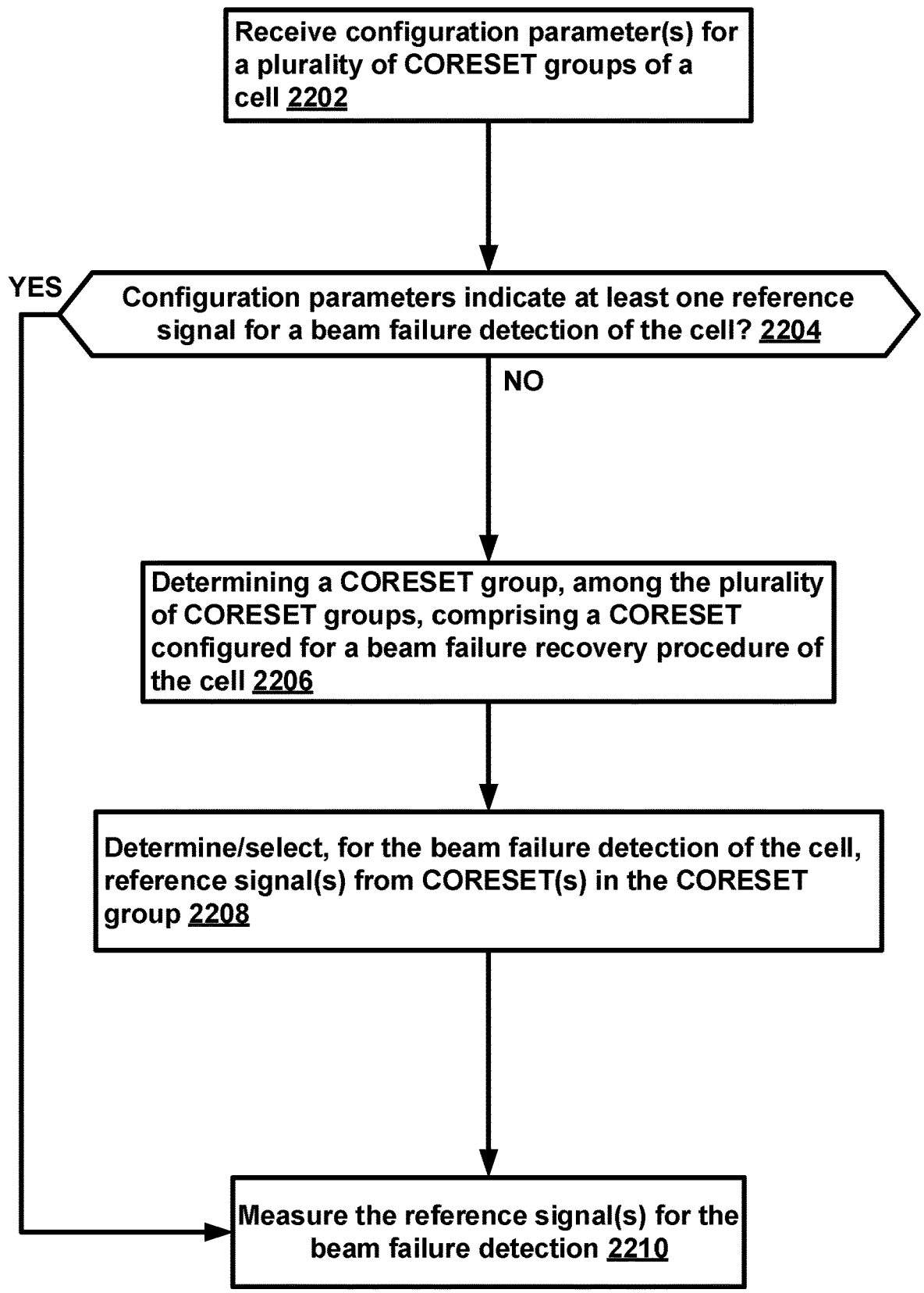
FIG. 22 shows an example method for beam failure recovery.

FIG. 22 shows an example of a method for beam failure recovery. At step 2202, a wireless device may receive one or more messages. The one or more messages may comprise one or more configuration parameters for a plurality of CORESET groups of a cell (or for a downlink BWP of a cell).

At step 2204, the wireless device may determine whether the configuration parameters indicate at least one RS for a beam failure detection of the cell. The wireless device may determine that the one or more configuration parameters do not indicate one or more beam failure detection RSs. The wireless device may determine that the one or more configuration parameters do not indicate one or more beam failure detection RSs, for example, for a beam failure detection of the cell (or for the downlink BWP of the cell). The wireless device may determine that the one or more configuration parameters do indicate one or more beam failure detection RSs. The wireless device may determine that the one or more configuration parameters do indicate one or more beam failure detection RSs, for example, for a beam failure detection of the cell (or for the downlink BWP of the cell).

At step 2206, the wireless device may determine/select a CORESET group. The wireless device may determine/select a CORESET group, among the plurality of CORESET groups, for example, comprising a CORESET (e.g., BFR CORESET in FIG. 17, associated with a recovery search space set) configured for a BFR procedure of the cell (or of the downlink BWP of the cell). The wireless device may determine/select the CORESET group. The wireless device may determine/select the CORESET group, for example, based on determining that the one or more configuration parameters do not indicate the one or more beam failure detection RSs.

At step 2208, the wireless device may determine/select one or more RSs from (or based on) one or more CORESETs (e.g., or from one or more TCI states of the one or more CORESETs) in the CORESET group. The wireless device may determine/select one or more RSs from (or based on) one or more CORESETs (e.g., or from one or more TCI states of the one or more CORESETs) in the CORESET group, for example, for the beam failure detection of the cell (or of the downlink BWP of the cell). The wireless device may determine/select one or more RSs from (or based on) one or more CORESETs (e.g., or from one or more TCI states of the one or more CORESETs) in the CORESET group, for example, based on determining the CORESET group.

At step 2210, the wireless device may measure/assess the one or more RSs for the beam failure detection. The wireless device may measure/assess the one or more RSs for the beam failure detection, for example, based on determining that the one or more configuration parameters do indicate one or more beam failure detection RSs. The wireless device may measure/assess the one or more RSs for the beam failure detection, for example, based on determining/selecting one or more RSs from (or based on) one or more CORESETs (e.g., or from one or more TCI states of the one or more CORESETs) in the CORESET group.

Figure 23:
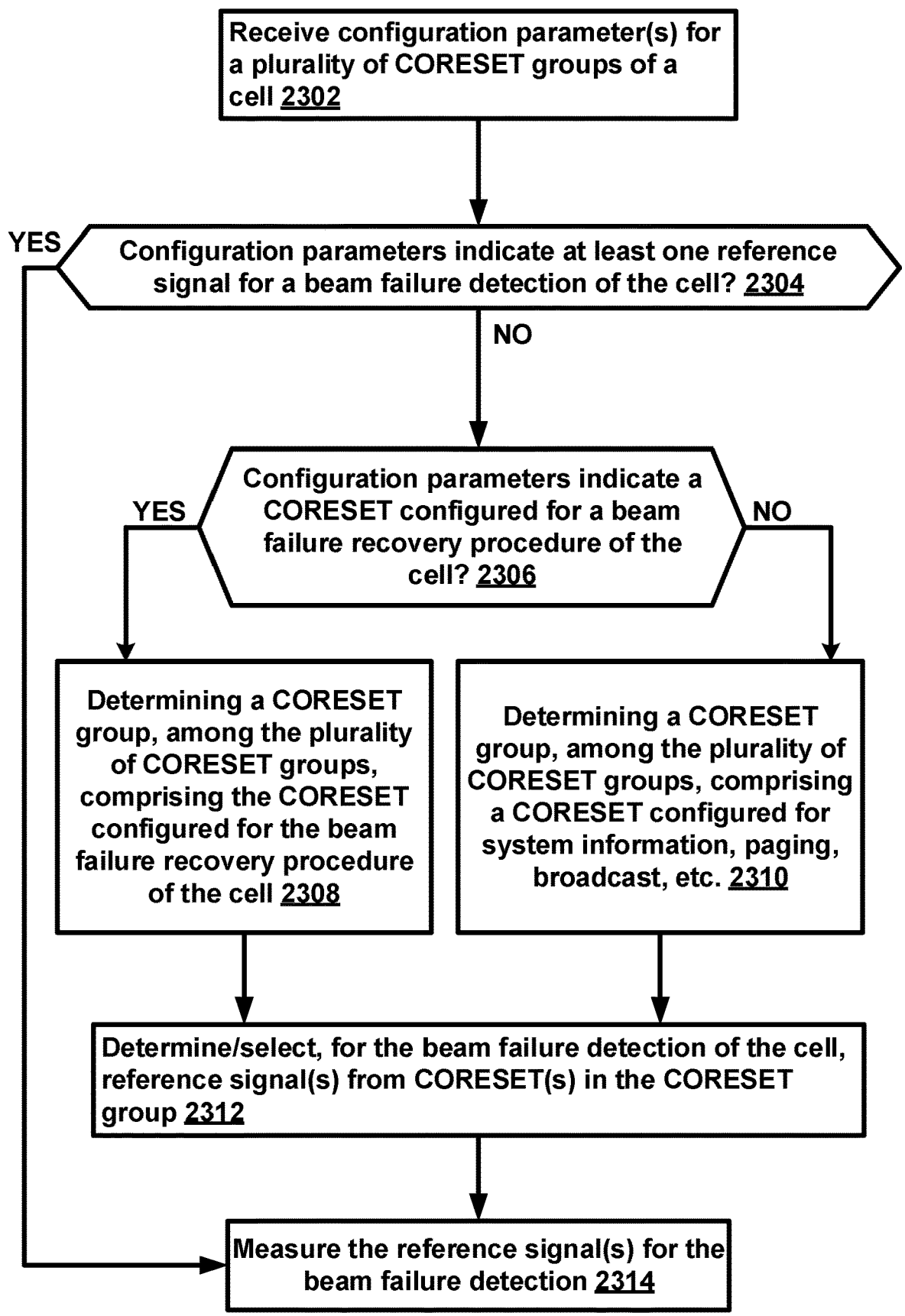
FIG. 23 shows an example method for beam failure recovery.

FIG. 23 shows an example of a method for beam failure recovery. At step 2302, a wireless device may receive one or more messages. The one or more messages may comprise one or more configuration parameters for a plurality of CORESET groups of a cell (or for a downlink BWP of a cell).

At step 2304, the wireless device may determine whether the one or more configuration parameters indicate at least one reference signal for a beam failure detection of the cell. The wireless device may determine that the one or more configuration parameters do not indicate one or more beam failure detection RSs. The wireless device may determine that the one or more configuration parameters do not indicate one or more beam failure detection RSs, for example, for a beam failure detection of the cell (or for the downlink BWP of the cell). The wireless device may determine that the one or more configuration parameters do indicate one or more beam failure detection RSs. The wireless device may determine that the one or more configuration parameters do indicate one or more beam failure detection RSs, for example, for a beam failure detection of the cell (or for the downlink BWP of the cell).

At step 2306, the wireless device may determine that the one or more configuration parameters indicate a CORESET (e.g., BFR CORESET in FIG. 17, associated with a recovery search space set). The wireless device may determine that the one or more configuration parameters indicate a CORESET (e.g., BFR CORESET in FIG. 17, associated with a recovery search space set), for example, configured for a BFR procedure of the cell (or of the downlink BWP of the cell).

At step, 2308, the wireless device may determine/select a CORESET group. The wireless device may determine/select a CORESET group, among the plurality of CORESET groups, for example, comprising the CORESET (e.g., BFR CORESET in FIG. 17, associated with a recovery search space set) configured for the BFR procedure of the cell (or of the downlink BWP of the cell). The wireless device may determine/select the CORESET group. The wireless device may determine/select the CORESET group, for example, based on determining that the one or more configuration parameters do not indicate the one or more beam failure detection RSs and the one or more configuration parameters indicate the CORESET.

The wireless device may determine that the one or more configuration parameters do not indicate a CORESET (e.g., BFR CORESET in FIG. 17, associated with a recovery search space set). The wireless device may determine that the one or more configuration parameters do not indicate a CORESET (e.g., BFR CORESET in FIG. 17, associated with a recovery search space set), for example, configured for a BFR procedure of the cell (or of the downlink BWP of the cell).

At step 2310, the wireless device may determine/select a CORESET group, among the plurality of CORESET groups, comprising a CORESET (e.g., Broadcast CORESET in FIG. 18). The wireless device may monitor the CORESET for an SIB. The wireless device may monitor the CORESET for an MIB. The wireless device may monitor the CORESET for paging signals. The wireless device may monitor the CORESET for random access channel messages (e.g., RAR, Msg2, Msg4, contention-resolution). The wireless device may monitor the CORESET for broadcast information. The wireless device may select/determine the CORESET group comprising the CORESET associated with (or linked to) a search space set configured with at least one of: searchSpaceZero, searchSpaceSIB1, searchSpaceOtherSystemInformation, pagingSearchSpace, ra-SearchSpace (e.g., a Type2-PDCCH CSS set, a Type1-PDCCH CSS set, a Type0-PDCCH CSS set, a Type0A-PDCCH CSS set). The wireless device may determine/select the CORESET group. The wireless device may determine/select the CORESET group, for example, based on determining that the one or more configuration parameters do not indicate the one or more beam failure detection RSs and the one or more configuration parameters do not indicate the CORESET for the BFR procedure of the cell.

At step 2312, the wireless device may determine/select one or more RSs from (or based on) one or more CORESETs (e.g., or from one or more TCI states of the one or more CORESETs) in the CORESET group. The wireless device may determine/select one or more RSs from (or based on) one or more CORESETs (e.g., or from one or more TCI states of the one or more CORESETs) in the CORESET group, for example, for the beam failure detection of the cell (or of the downlink BWP of the cell). The wireless device may determine/select one or more RSs from (or based on) one or more CORESETs (e.g., or from one or more TCI states of the one or more CORESETs) in the CORESET group, for example, based on determining the CORESET group.

Figure 24A:
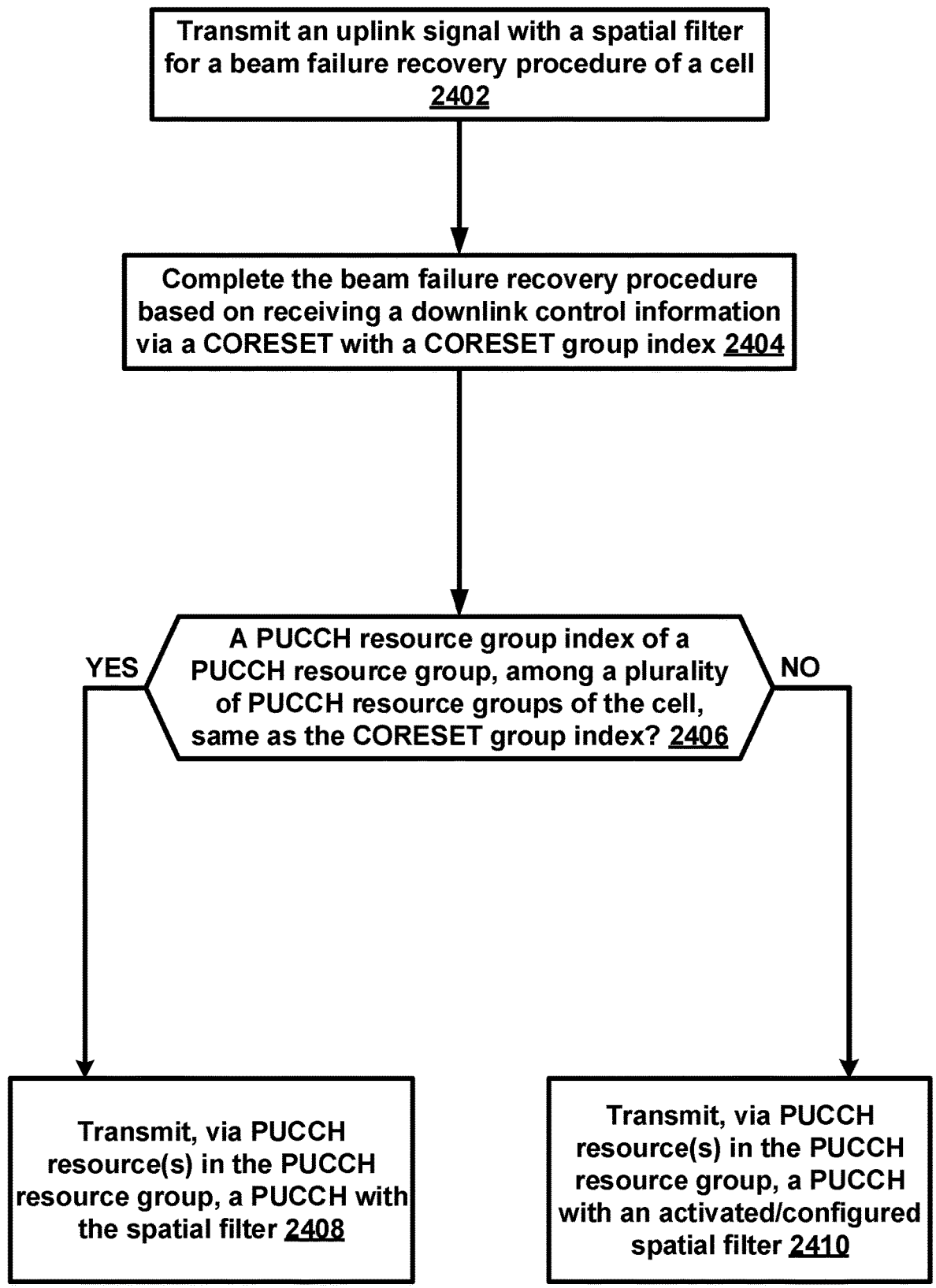
FIG. 24A shows an example method for beam failure recovery.

At step 2314, the wireless device may measure/assess the one or more RSs for the beam failure detection. The wireless device may measure/assess the one or more RSs for the beam failure detection, for example, based on determining that the one or more configuration parameters do indicate one or more beam failure detection RSs. The wireless device may measure/assess/determine the one or more RSs for the beam failure detection, for example, based on determining/selecting one or more RSs from (or based on) one or more CORESETs (e.g., or from one or more TCI states of the one or more CORESETs) in the CORESET group FIG. 24A shows an example method for beam failure recovery. A wireless device may send (e.g., transmit) an uplink signal (e.g., at time T2 in FIG. 20). At step 2402, a wireless device may send (e.g., transmit) an uplink signal (e.g., at time T2 in FIG. 20), for example, with a spatial transmission filter for a BFR procedure of a cell (or of a downlink BWP of a cell).

At step 2404, the wireless device may complete the BFR procedure. The wireless device may complete the BFR procedure, for example, based on receiving DCI via a CORESET (e.g., BFR CORESET in FIG. 19) with a CORESET group index (e.g., CORESET group index 3=0). The CORESET may be associated with (or identified with or configured with) the CORESET group index.

At step 2406, the wireless device may determine a physical uplink control channel (PUCCH) resource group (e.g., PUCCH resource group 1) among a plurality of PUCCH resource groups of the cell. The wireless device may determine a physical uplink control channel (PUCCH) resource group (e.g., PUCCH resource group 1) among a plurality of PUCCH resource groups of the cell, for example, based on a PUCCH resource group index of (associated with or identifying or configured for) the PUCCH resource group and the CORESET group index. The wireless device may determine the PUCCH resource group among the plurality of PUCCH resource groups. The wireless device may determine the PUCCH resource group among the plurality of PUCCH resource groups, for example, with the PUCCH resource group index that is the same as the CORESET group index. The wireless device may determine the PUCCH resource group. The wireless device may determine the PUCCH resource group, for example, based on completing the BFR procedure.

At step 2408, the wireless device may send (e.g., transmit), via one or more PUCCH resources in the PUCCH resource group, a PUCCH with the spatial transmission filter. The wireless device may send (e.g., transmit), via one or more PUCCH resources in the PUCCH resource group, a PUCCH with the spatial transmission filter, for example, based on determining the PUCCH resource group.

At step 2410, the wireless device may send (e.g., transmit), via one or more PUCCH resources in the PUCCH resource group of the plurality of PUCCH resource groups, a PUCCH with an activated/configured transmission filter. The wireless device may send (e.g., transmit), via one or more second PUCCH resources in a second PUCCH resource group of the plurality of PUCCH resource groups, a PUCCH with second spatial transmission filters. The wireless device may send (e.g., transmit), via one or more second PUCCH resources in a second PUCCH resource group of the plurality of PUCCH resource groups, a PUCCH with second spatial transmission filters, for example, based on determining the second PUCCH resource group. The second spatial transmission filters may be different from the spatial transmission filter. The wireless device may determine the second spatial transmission filters. The wireless device may determine the second spatial transmission filters, for example, based on receiving one or more activation commands (e.g., MAC CE) activating spatial relations for the one or more second PUCCH resources. The second spatial transmission filters may be existing/configured/activated spatial transmission filters for the one or more second PUCCH resources.

The second PUCCH resource group may be different from the PUCCH resource group. The PUCCH resource group index of (associated with or identifying or configured for) the PUCCH resource group may be different from a second PUCCH resource group index of (associated with or identifying or configured for) the second PUCCH resource group.

Figure 24B:
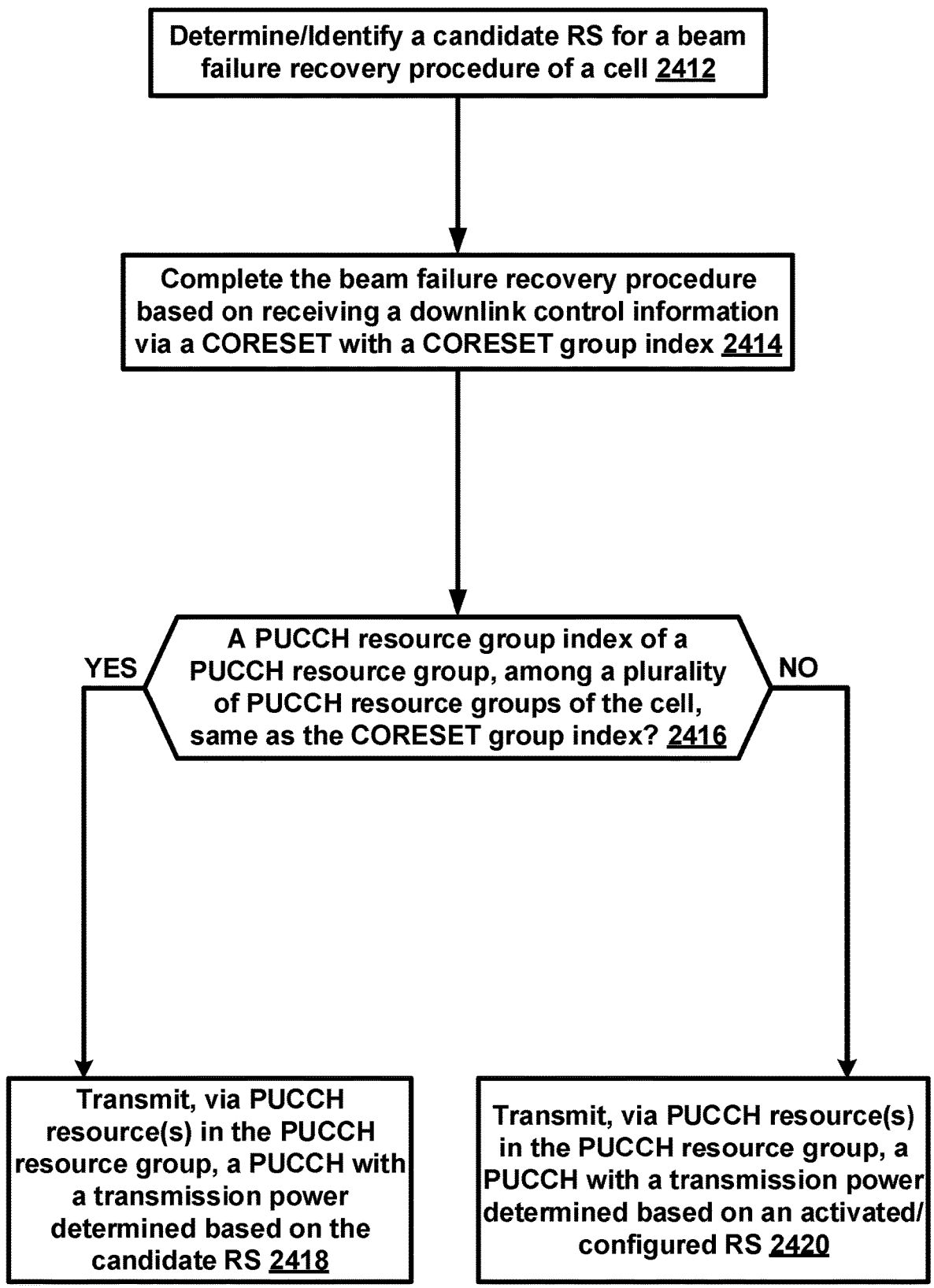
FIG. 24B shows an example method for beam failure recovery.

FIG. 24B shows an example method for beam failure recovery. At step 2412, a wireless device may assess/measure the one or more second RSs for the BFR procedure. The wireless device may assess/measure the one or more second RSs, for example, based on initiating the BFR procedure (e.g., after or at time T1 in FIG. 20). The wireless device may select/identify/determine a candidate RS among the one or more second RSs. The wireless device may select/identify/determine a candidate RS among the one or more second RSs, for example, for the candidate beam selection/identification. The wireless device may determine that a radio link quality (e.g., SINR, L1-RSRP) of the candidate RS is better (e.g., higher SINR, higher L1-RSRP) than the second threshold (e.g., provided by rsrp-Threshold-SSB in the IE BeamFailureRecoveryConfig). The wireless device may select/identify/determine the candidate RS, for example, based on determining that the radio link quality of the candidate RS is better than the second threshold.

At step 2414, the wireless device may complete the BFR procedure. The wireless device may complete the BFR procedure, for example, based on receiving DCI via a CORESET (e.g., BFR CORESET in FIG. 19) with a CORESET group index (e.g., CORESET group index 3=0). The CORESET may be associated with (or identified with or configured with) the CORESET group index.

At step 2416, the wireless device may determine a physical uplink control channel (PUCCH) resource group (e.g., PUCCH resource group 1) among a plurality of PUCCH resource groups of the cell. The wireless device may determine a physical uplink control channel (PUCCH) resource group (e.g., PUCCH resource group 1) among a plurality of PUCCH resource groups of the cell, for example, based on a PUCCH resource group index of (associated with or identifying or configured for) the PUCCH resource group and the CORESET group index. The wireless device may determine the PUCCH resource group among the plurality of PUCCH resource groups. The wireless device may determine the PUCCH resource group among the plurality of PUCCH resource groups, for example, with the PUCCH resource group index that is the same as the CORESET group index. The wireless device may determine the PUCCH resource group. The wireless device may determine the PUCCH resource group, for example, based on completing the BFR procedure.

At step 2418, the wireless device may send (e.g., transmit) a PUCCH (e.g., PUCCH transmission in FIG. 20). The wireless device may send (e.g., transmit) a PUCCH (e.g., PUCCH transmission in FIG. 20), for example, based on selecting/determining the PUCCH resource group. The wireless device may send (e.g., transmit) a PUCCH (e.g., PUCCH transmission in FIG. 20), for example, via the one or more PUCCH resources in the PUCCH resource group. The wireless device may send (e.g., transmit) a PUCCH (e.g., PUCCH transmission in FIG. 20), for example, with a transmission power. The wireless device may reset an accumulation of a power control adjustment state (e.g., PUSCH power control adjustment state). The wireless device may reset an accumulation of a power control adjustment state (e.g., PUSCH power control adjustment state), for example, to a value. The value may be zero (e.g., 1=0). The wireless device may determine the transmission power of the PUCCH. The wireless device may determine the transmission power of the PUCCH, for example, based on resetting the accumulation of a power control adjustment state (e.g., PUSCH power control adjustment state) to the value (e.g., 1=0). The wireless device may calculate a downlink pathloss estimation (e.g., in dB) for the transmission power of the PUCCH. The wireless device may calculate a downlink pathloss estimation (e.g., in dB) for the transmission power of the PUCCH, for example, based on measuring/assessing the candidate RS (e.g., q_d=candidate reference signal).

At step 2420, the wireless device may send (e.g., transmit), via one or more PUCCH resources in the PUCCH resource group, a PUCCH with a transmission power determined based on an activated/configured RS. The wireless device may send (e.g., transmit) a PUCCH, for example, based on selecting/determining the PUCCH resource group. The wireless device may send (e.g., transmit) a PUCCH, for example, via the one or more second PUCCH resources in the second PUCCH resource group that is/are different from the PUCCH resource group. The wireless device may send (e.g., transmit) a PUCCH, for example, with a second transmission power. The wireless device may determine the second transmission power with existing parameters. The wireless device determining the second transmission power with existing parameters may comprise that the wireless device calculates the downlink pathloss estimation based on the RS (e.g., activated/configured RS). The wireless device determining the second transmission power with existing parameters may comprise that the wireless device does not set power control parameter/index set to zero (e.g., q_u=! 0). The wireless device determining the second transmission power with existing parameters may comprise that the wireless device does not calculate the downlink pathloss estimation based on the candidate RS (e.g., q_d=!candidate reference signal). The wireless device determining the second transmission power with existing parameters may comprise that the wireless device does not set the value of the accumulation of a power control adjustment state to zero (e.g., 1=! 0).

The second PUCCH resource group may be different from the PUCCH resource group. The PUCCH resource group index of (associated with or identifying or configured for) the PUCCH resource group may be different from a second PUCCH resource group index of (associated with or identifying or configured for) the second PUCCH resource group.

Figure 25:
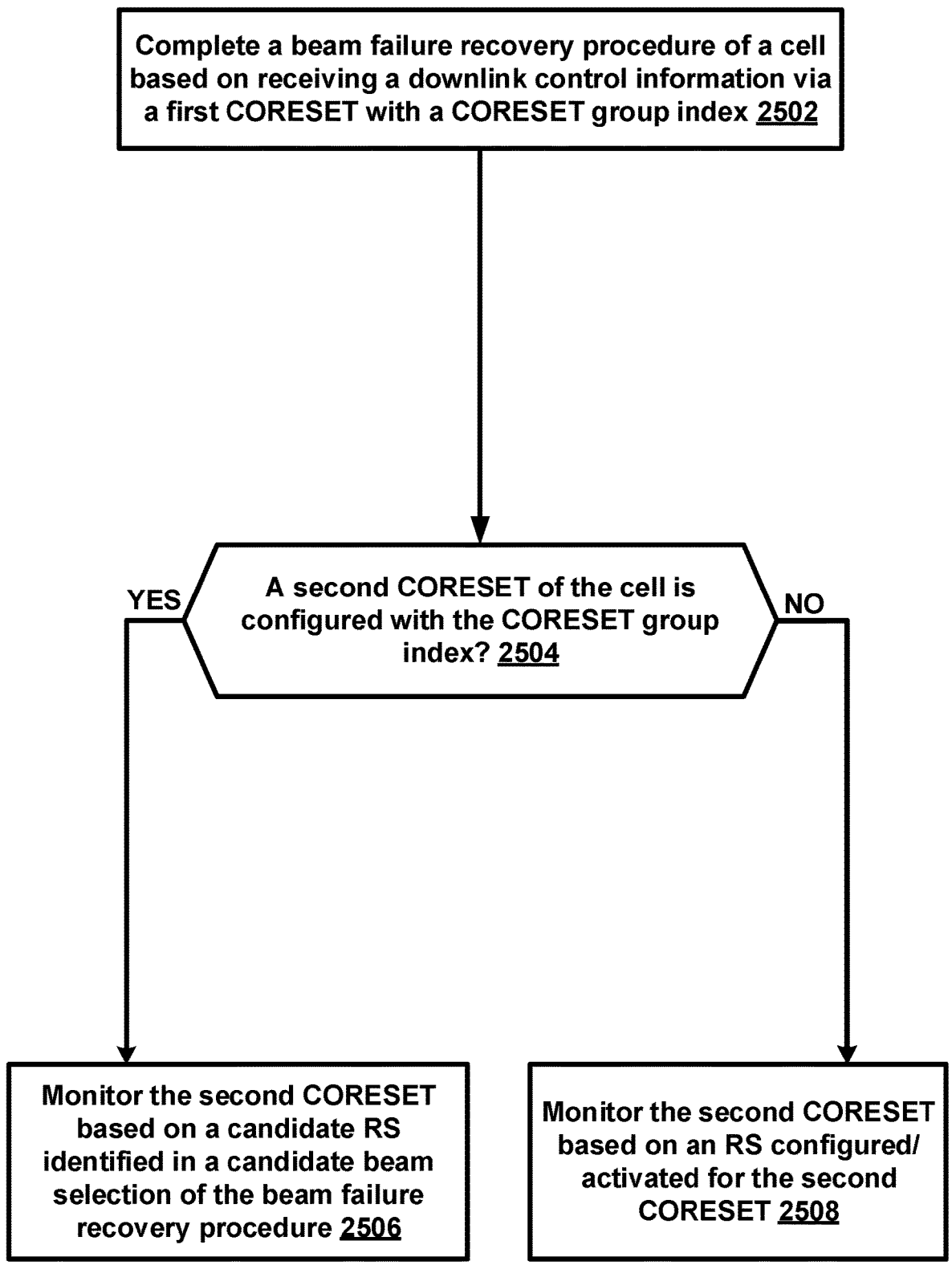
FIG. 25 shows an example method for beam failure recovery.

FIG. 25 shows an example method for beam failure recovery. At step 2502, a wireless device may complete a BFR procedure of a cell (or of a downlink BWP of a cell). A wireless device may complete a BFR procedure of a cell (or of a downlink BWP of a cell), for example, based on receiving DCI via a first CORESET with a first CORESET group index. The cell may comprise the first CORESET. The downlink BWP of the cell may comprise the first second CORESET.

At step 2504, the wireless device may determine whether a second CORESET, of the plurality of CORESETs, is configured with the CORESET group index of the CORESET. The wireless device may determine whether the second CORESET is configured with the CORESET group index of the CORESET, for example, based on completing the BFR procedure successfully. The wireless device may determine whether a second CORESET group index of the second CORESET is the same as the CORESET group index of the CORESET. The wireless device may determine whether a second CORESET group index of the second CORESET is the same as the CORESET group index of the CORESET, for example, based on completing the BFR procedure successfully. The CORESET group indexes for the plurality of CORESETs may comprise the second CORESET group index of the second CORESET. The second CORESET (e.g., CORESET 4 in FIG. 21) may be identified with a CORESET index that is equal to zero (e.g., CORESET index=0 in FIG. 21). The one or more configuration parameters may indicate the CORESET index for the second CORESET. The CORESET indexes (e.g., provided by a higher layer parameter ControlResourceSetId) for the plurality of CORESETs may comprise that CORESET index.

At step 2506, the wireless device may monitor, for DCI, at least one PDCCH in the second CORESET. The wireless device may monitor, for DCI, at least one PDCCH in the second CORESET, for example, based on an RS (e.g., SS/PBCH block). The wireless device may receive an activation command (e.g., MAC CE). The wireless device may receive an activation command (e.g., MAC CE), for example, indicating a TCI state of the downlink BWP. The TCI state may indicate the RS. The TCI state may indicate a second RS that is QCLed with the RS. The wireless device may select/identify/determine the RS for a random access procedure. The wireless device may not initiate the random access procedure. The wireless device may not initiate the random access procedure, for example, based on receiving a PDCCH order.

At step 2508, the wireless device may monitor the second CORESET. The wireless device may monitor the second CORESET, for example, based on determining whether a second CORESET, of the plurality of CORESETs, is configured with the CORESET group index of the CORESET. The wireless device may monitor the second CORESET, for example, based on a candidate beam identification/selection of the BFR procedure or the RS.

The wireless device may select a selected RS. The wireless device may select a selected RS, for example, based on determining whether a second CORESET, of the plurality of CORESETs, is configured with the CORESET group index of the CORESET. The wireless device may select a selected RS, for example, among a candidate RS identified in a candidate beam identification/selection of the BFR procedure and the RS. The wireless device may monitor the second CORESET. The wireless device may monitor the second CORESET, for example, based on the selected RS.

The wireless device may monitor the second CORESET. The wireless device may monitor the second CORESET, for example, based on determining that a second CORESET, of the plurality of CORESETs, is configured with the CORESET group index of the CORESET. The wireless device may monitor the second CORESET, for example, based on the candidate RS identified in a candidate beam identification/selection of the BFR procedure. The selected RS may be the candidate RS.

The wireless device may monitor the second CORESET. The wireless device may monitor the second CORESET, for example, based on determining that a second CORESET, of the plurality of CORESETs, is not configured with the CORESET group index of the CORESET. The wireless device may monitor the second CORESET, for example, based on the RS. The selected RS may be the RS.

Figure 26:
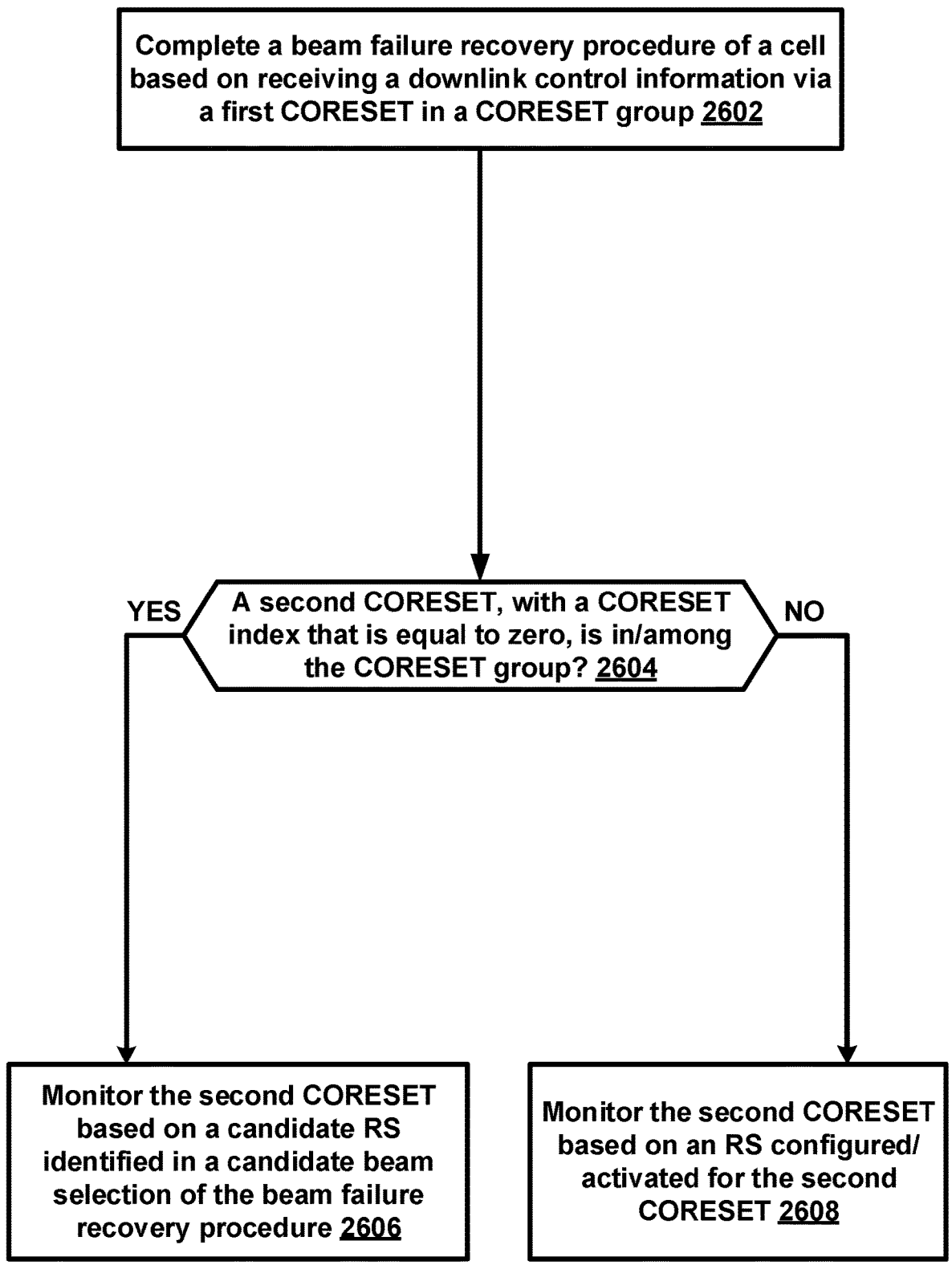
FIG. 26 shows an example method for beam failure recovery.

FIG. 26 shows an example method for beam failure recovery. At step 2602, a wireless device may complete a BFR procedure of a cell (or of a downlink BWP of a cell). A wireless device may complete a BFR procedure of a cell (or of a downlink BWP of a cell), for example, based on receiving DCI via a first CORESET in a first CORESET group. The cell may comprise the first CORESET. The downlink BWP of the cell may comprise the first CORESET.

At step 2604, the wireless device may determine whether a second CORESET is in the first CORESET group of the first CORESET. The wireless device may determine whether a second CORESET is the first CORESET group. The wireless device may determine whether a second CORESET is the first CORESET group, for example, based on completing the BFR procedure. The cell may comprise the second CORESET. The downlink BWP of the cell may comprise the second CORESET. The second CORESET may be identified with a CORESET index that is equal to zero (e.g., CORESET 0).

At step 2606, the wireless device may monitor, for DCI, at least one PDCCH in the second CORESET. The wireless device may monitor, for DCI, at least one PDCCH in the second CORESET, for example, based on an RS (e.g., SS/PBCH block). The wireless device may receive an activation command (e.g., MAC CE). The wireless device may receive an activation command (e.g., MAC CE), for example, indicating a TCI state of the downlink BWP. The TCI state may indicate the RS. The TCI state may indicate a second RS that is QCLed with the RS. The wireless device may select/identify the RS for a random access procedure. The wireless device may not initiate the random access procedure based on receiving a PDCCH order.

At step 2608, the wireless device may monitor the second CORESET. The wireless device may monitor the second CORESET, for example, based on determining whether the second CORESET is in the first CORESET group of the first CORESET. The wireless device may monitor the second CORESET, for example, based on a candidate beam identification/selection of the BFR procedure or the RS.

The wireless device may select a selected RS. The wireless device may select a selected RS, for example, based on determining whether the second CORESET is in the first CORESET group of the first CORESET. The wireless device may select a selected RS, for example, among a candidate RS identified in a candidate beam identification/selection of the BFR procedure and the RS. The wireless device may monitor the second CORESET. The wireless device may monitor the second CORESET, for example, based on the selected RS.

The wireless device may monitor the second CORESET. The wireless device may monitor the second CORESET, for example, based on determining that the second CORESET is in the first CORESET group of the first CORESET. The wireless device may monitor the second CORESET, for example, based on the candidate RS identified in a candidate beam identification/selection of the BFR procedure. The selected RS may be the candidate RS.

The wireless device may monitor the second CORESET. The wireless device may monitor the second CORESET, for example, based on determining that the second CORESET is not in the first CORESET group. The wireless device may monitor the second CORESET, for example, based on the RS. The selected RS may be the RS.

The wireless device may monitor the second CORESET. The wireless device may monitor the second CORESET, for example, based on determining that the second CORESET is in second CORESET group different from the first CORESET group. The wireless device may monitor the second CORESET, for example, based on the RS. The selected RS may be the RS.

A wireless device may perform a method comprising multiple operations. The wireless device may determine a candidate reference signal for beam failure recovery (BFR). The wireless device may receive, via a control resource set (coreset) associated with a first coreset group index, downlink control information (DCI) indicating completion of the BFR. The wireless device may determine one or more physical uplink control channel (PUCCH) resources, of a cell, associated with the first coreset group index. The wireless device may transmit, via the one or more PUCCH resources and using a transmission power based on the candidate reference signal, an uplink signal. The wireless device may also perform one or more additional operations. The wireless device may transmit, using a spatial domain transmission filter, a preamble for the BFR. The transmitting the uplink signal may comprise transmitting the uplink signal using the spatial domain transmission filter. The uplink signal may comprise uplink control information UCI. The transmitting the uplink signal using the transmission power based on the candidate reference signal may be after a number of symbols from a last symbol of a reception of the DCI. The transmitting the uplink signal using the transmission power based on the candidate reference signal may be until receiving an activation command activating a spatial relation for the PUCCH resource. The wireless device may determine the transmission power. The determining the transmission power may be based on a pathloss measurement of the candidate reference signal. The determining the transmission power may be based on resetting an accumulation of a power control adjustment state to a value. The value may be equal to zero. The determining the transmission power may be based on setting a power control parameter index to zero. The wireless device may determine one or more second coresets, of the cell, associated with the first coreset group index. The wireless device may receive via the one or more second coresets and based on a candidate reference signal for the BFR, second DCI. The transmitting the uplink signal may be based on the second DCI. The one or more PUCCH resources may be further associated with a second coreset group index based on one or more configuration parameters indicating the second coreset group index for the one or more PUCCH resources. The wireless device may determine a second PUCCH resource, of the cell, associated with a second coreset group index that is different from the first coreset group index. The wireless device may transmit, via the second PUCCH resource, a second uplink signal using a second transmission power determined based on: a configured reference signal of the second PUCCH resource; or an activated reference signal of the second PUCCH resource. The wireless device may activate one or more spatial relations for the one or more PUCCH resources based on at least one of: receiving one or more activation commands for the one or more spatial relation; or receiving one or more configuration parameters indicating the one or more spatial relations. The wireless device may transmit, via the one or more PUCCH resources and using a spatial domain transmission filter associated with at least one of the one or more spatial relations, one or more second uplink signals. The transmitting the one or more second uplink signals may be after a number of symbols from a last symbol of a reception of the DCI. The one or more PUCCH resources may be further associated with a second coreset group index based on one or more configuration parameters indicating the second coreset group index for a PUCCH resource set that comprises the one or more PUCCH resources. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may transmit, using a spatial domain transmission filter, a first uplink signal for beam failure recovery (BFR). The wireless device may receive, via a control resource set (coreset) associated with a first coreset group index, downlink control information (DCI) indicating completion of the BFR. The wireless device may determine one or more physical uplink control channel (PUCCH) resources, of a cell, associated with the first coreset group index. The wireless device may transmit, via the one or more PUCCH resources and using the spatial domain transmission filter, one or more second uplink signals. The wireless device may also perform one or more additional operations. The wireless device may determine a candidate reference signal for the BFR. The transmitting the one or more second uplink signals may comprise transmitting the one or more second uplink signals using a transmission power based on the candidate reference signal. The transmitting the one or more second uplink signals using the transmission power may be until receiving one or more activation commands activating one or more spatial relations for the one or more PUCCH resources. The wireless device may determine one or more second coresets, of the cell, associated with the first coreset group index. The wireless device may receive, via the one or more second coresets and based on a candidate reference signal of the BFR, second DCI. The one or more PUCCH resources may be further associated with a second coreset group index based on one or more configuration parameters indicating the second coreset group index for the one or more PUCCH resources. The wireless device may activate one or more spatial relations for the one or more PUCCH resources based on at least one of: receiving one or more activation commands for the one or more spatial relations; or receiving one or more configuration parameters indicating the one or more spatial relations. The wireless device may transmit, via the one or more PUCCH resources and using a spatial domain transmission filter associated with at least one of the one or more spatial relations, one or more third uplink signals. The first uplink signal may comprise a random access preamble. The one or more second uplink signals may comprise uplink control information (UCI). The cell may be a primary cell. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may determine a candidate reference signal for beam failure recovery (BFR). The wireless device may receive, via a first control resource set (coreset) associated with a first coreset group index, downlink control information (DCI) indicating completion of the BFR. The wireless device may determine one or more second coresets, of a cell, associated with the first coreset group index. The wireless device may receive, via the one or more second coresets and based on the candidate reference signal for the BFR, second DCI. The wireless device may transmit, based on the second DCI, an uplink signal. The wireless device may also perform one or more additional operations. The wireless device may determine one or more physical uplink control channel (PUCCH) resources, of the cell, associated with the first coreset group index. The transmitting the uplink signal may comprise transmitting the uplink signal using the one or more PUCCH resources and using a transmission power based on the candidate reference signal. The wireless device may transmit, using a spatial domain transmission filter, a preamble for the BFR. The transmitting the uplink signal may comprise transmitting the uplink signal using the spatial domain transmission filter. The uplink signal may comprise data. The wireless device may determine a PUCCH resource, of the cell, associated with a second coreset group index. The second coreset group index may be different from the first coreset group index. The wireless device may transmit, via the PUCCH resource, a second uplink signal using a transmission power determined based on: a configured reference signal of the PUCCH resource; or an activated reference signal of the PUCCH resource. The wireless device may activate one or more spatial relations for one or more PUCCH resources, of the cell, based on at least one of: receiving one or more activation commands for the one or more spatial relation; receiving one or more configuration parameters indicating the one or more spatial relations. The wireless device may transmit, via the one or more PUCCH resources and using a spatial domain transmission filter associated with at least one of the one or more spatial relations, one or more second uplink signals. The transmitting the uplink signal may comprise transmitting the uplink signal using a transmission power based on at least one of: a pathloss measurement of the candidate reference signal; resetting an accumulation of a power control adjustment state to a value; or setting a power control parameter index to zero. The one or more second coresets may be associated with a coreset index equal to zero. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI and the second DCI. A computer-readable medium may store instructions that, when executed, cause performance of the described method, additional operations and/or include the additional elements.

A wireless device may perform a method comprising multiple operations. The wireless device may identify a candidate reference signal for beam failure recovery (BFR). The wireless device may complete the BFR based on receiving, via a control resource set (coreset) with a first coreset group index, downlink control information (DCI). The wireless device may determine a physical uplink control channel (PUCCH) resource, of a cell, associated with the first coreset group index. The wireless device may transmit, via the PUCCH resource, an uplink signal with a transmission power determined based on the candidate reference signal. The wireless device may also perform one or more additional operations. The wireless device may determine a second PUCCH resource, of the cell, associated with a second coreset group index that is different from the first coreset group index. The wireless device may transmit, via the second PUCCH resource, a second uplink signal with a second transmission power determined based on: a configured reference signal of the second PUCCH resource; or an activated reference signal of the second PUCCH resource. The wireless device may receive one or more messages comprising one or more configuration parameters. The PUCCH resource being associated with the first coreset group index may comprise the one or more configuration parameters indicating the first coreset group index for the PUCCH resource. The PUCCH resource being associated with the first coreset group index may comprise the one or more configuration parameters indicating the first coreset group index for a PUCCH resource set that comprises the PUCCH resource. The transmitting the uplink signal with the transmission power determined based on the candidate reference signal may be after a number of symbols from a last symbol of a reception of the DCI. The transmitting the uplink signal with the transmission power determined based on the candidate reference signal may be until receiving an activation command activating a spatial relation for the PUCCH resource. The transmitting the uplink signal with the transmission power determined based on the candidate reference signal may be until receiving one or more second configuration parameters indicating a spatial relation for the PUCCH resource. The transmission power may comprise a pathloss measurement of the candidate reference signal. The transmission power may be further determined based on resetting an accumulation of a power control adjustment state to a value. The value may be equal to zero. The transmission power may be further determined based on setting a power control parameter index to zero. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may transmit, by a wireless device and for beam failure recovery (BFR), an uplink signal with a spatial domain transmission filter. The wireless device may complete the BFR based on receiving, via a control resource set (coreset) with a first coreset group index, downlink control information (DCI). The wireless device may determine one or more physical uplink control channel (PUCCH) resources, of a cell, associated with a second coreset group index that is the same as the first coreset group index. The wireless device may transmit, via the one or more PUCCH resources, one or more uplink signals with the spatial domain transmission filter. The wireless device may also perform one or more additional operations. The wireless device may receive one or more messages comprising one or more configuration parameters. The one or more PUCCH resources being associated with the second coreset group index may comprise the one or more configuration parameters indicating the second coreset group index for the one or more PUCCH resources. The one or more PUCCH resources being associated with the second coreset group index may comprise the one or more configuration parameters indicating the second coreset group index for a PUCCH resource set that comprises the one or more PUCCH resources. The transmitting the one or more uplink signals with the spatial domain transmission filter may be after a number of symbols from a last symbol of a reception of the DCI. The wireless device may keep transmitting, via the second PUCCH resource, an uplink signal with the second spatial domain transmission filter after the number of symbols from the last symbol. The transmitting the one or more uplink signals with the spatial domain transmission filter may be until receiving one or more activation commands activating one or more spatial relations for the one or more PUCCH resources. The transmitting the one or more uplink signals with the spatial domain transmission filter may be until receiving one or more second configuration parameters indicating one or more spatial relations for the one or more PUCCH resources. The wireless device may transmit, via a second PUCCH resource associated with a third coreset group index, an uplink signal with a second spatial domain transmission filter. The uplink signal may be a random-access preamble. The cell may be a primary cell. The wireless device may determine a transmission power for transmission of the one or more uplink signals via the one or more PUCCH resources. The determining the transmission power may be based on a pathloss measurement of the candidate reference signal. The determining the transmission power may be based on resetting an accumulation of a power control adjustment state to a value. The value may be equal to zero. The determining the transmission power may be based on setting a power control parameter index to zero. The transmitting the one or more uplink signals may comprise transmitting the one or more uplink signals with the transmission power. The transmitting the one or more uplink signals with the transmission power may be until receiving one or more activation commands activating one or more spatial relations for the one or more PUCCH resources. The transmitting the one or more uplink signals with the transmission power may be until receiving one or more second configuration parameters indicating one or more spatial relations for the one or more PUCCH resources. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may complete beam failure recovery (BFR) based on receiving first downlink control information (DCI) via a first control resource set (coreset) with a first coreset group index. The wireless device may determine that a second coreset group index of a second coreset of a cell is the same as the first coreset group index. The wireless device may receive, via the second coreset, second DCI based on a candidate reference signal identified for the BFR. The wireless device may also perform one or more additional operations. The wireless device may determine that a third coreset group index of a third coreset is different from the first coreset group index. The wireless device may receive, in response to the determining, third DCI via the third coreset based on a reference signal activated for the third coreset. The wireless device may receive one or more messages indicating one or more configuration parameters for the cell. The one or more configuration parameters may indicate: the first coreset group index for the first coreset; the second coreset group index for the second coreset; and the third coreset group index for the third coreset. The one or more configuration parameters may indicate a coreset index for the second coreset. The coreset index may be equal to zero. The one or more configuration parameters may indicate a coreset index for the third coreset. The coreset index may equal to zero. The cell may be at least one of: a primary cell; and a secondary cell. The receiving the second DCI based on the candidate reference signal may comprise at least one demodulation reference signal (DM-RS) port of a physical downlink control channel with the second DCI being quasi co-located with the candidate reference signal. The wireless device may receive an activation command activating a transmission configuration indicator (TCI) state for the third coreset. The TCI state may indicate the reference signal. The receiving the third DCI based on the reference signal may comprise at least one DM-RS port of a physical downlink control channel with the third DCI being quasi co-located with the reference signal. A TCI state may indicate a quasi co-location type. The at least one DM-RS port of the physical downlink control channel with the third DCI being quasi co-located with the reference signal may be with respect to a quasi co-location type. The one or more configuration parameters may comprise one or more BFR configuration parameters indicating the first coreset for the BFR. The wireless device may determine, for a beam failure detection of the cell, one or more coresets with a coreset group index that is same as the first coreset group index of the first coreset. The wireless device may initiate the BFR based on measuring, for the beam failure detection, one or more reference signals indicated by the one or more coresets. The determining the one or more coresets may be based on the one or more configuration parameters not indicating at least one reference signal for the beam failure detection. The determining the one or more coresets may be based on the one or more BFR configuration parameters indicating the first coreset for the BFR. The wireless device may receive one or more activation commands activating one or more TCI states for the one or more coresets. The one or more TCI states may indicate the one or more reference signals. The one or more coresets may not comprise the first coreset. The receiving the second DCI via the second coreset based on the candidate reference signal may be after a number of symbols from the completing the BFR. A cyclic redundancy check (CRC) of the first DCI may be scrambled by a first radio network temporary identifier (RNTI). The first RNTI may be at least one of: cell RNTI (C-RNTI), or modulation coding scheme cell RNTI (MCS-C-RNTI). Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first DCI and the second DCI. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   receiving, by a wireless device, one or more messages comprising one or more configuration parameters for a downlink bandwidth part (BWP) of a cell, wherein the one or more configuration parameters indicate:

two control resource set (CORESET) group indexes;
one or more first reference signals (RSs) for beam failure detection; and
one or more second RSs for beam failure recovery (BFR);
transmitting, based on detecting a beam failure for the one or more first RSs, a BER medium access control (MAC) control element (CE) for a BFR procedure, wherein the BFR MAC CE indicates a candidate RS among the one or more second RSs;
completing the BFR procedure successfully based on a physical downlink control channel (PDCCH) reception with a downlink control information (DCI) format indicating an uplink grant; and
monitoring, after a number of symbols from a last symbol of the PDCCH reception, PDCCH using antenna port quasi-collocation parameters corresponding to:
the candidate RS in a first CORESET with a first CORESET group index of the two CORESET group indexes; and
an RS, indicated by a transmission configuration indication (TCI) state, in a second CORESET with a second CORESET group index of the two CORESET group indexes.

2. The method of claim 1, further comprising not monitoring, after the number of symbols from the last symbol of the PDCCH reception, the PDCCH using antenna port quasi-collocation parameters corresponding to the candidate RS in the second CORESET with the second CORESET group index.

3. The method of claim 1, wherein the one or more first RSs are associated with the first CORESET group index.

4. The method of claim 1, wherein a radio link quality of the candidate RS is equal to, or greater than, a threshold.

5. The method of claim 1, wherein the one or more configuration parameters indicate:
the first CORESET group index for one or more first CORESETs in the downlink BWP of the cell, wherein the one or more first CORESETs comprise the first CORESET; and
the second CORESET group index for one or more second CORESETs in the downlink BWP of the cell, wherein the one or more second CORESETs comprise the second CORESET.

6. The method of claim 1, further comprising receiving a MAC CE indicating activation of the TCI state for the second CORESET.

7. The method of claim 1, wherein a cyclic redundancy check (CRC) of the DCI format is scrambled by C-RNTI.

8. The method of claim 1, further comprising transmitting, after the number of symbols from the last symbol of the PDCCH reception and via a first physical uplink control channel (PUCCH) resource associated with the first CORESET group index of the two CORESET group indexes, a first PUCCH transmission.

9. The method of claim 8, wherein the first PUCCH transmission is transmitted using:
a first transmission power determined based on a downlink pathloss estimate of the candidate reference signal; and
a first spatial domain filter that is associated with the candidate RS.

10. The method of claim 9, further comprising transmitting, after completing the BFR procedure successfully and via a second PUCCH resource associated with the second CORESET group index of the two CORESET group indexes, a second PUCCH transmission.

11. The method of claim 10, wherein the second PUCCH transmission is transmitted using:
a second transmission power determined based on a downlink pathloss estimate of a reference signal indicated by a spatial relation of the second PUCCH resource; and
a second spatial domain filter that is determined based on a spatial domain filter of a reference signal indicated by a spatial relation of the second PUCCH resource.

12. The method of claim 11, further comprising receiving an activation command indicating activation of the spatial relation for the second PUCCH resource.

13. The method of claim 1, wherein the number of symbols is 28 symbols.

14. The method of claim 1, wherein:
at least one demodulation reference signal (DM-RS) port of the PDCCH in the first CORESET is quasi-collocated with the candidate reference signal; and
at least one DM-RS port of the PDCCH in the second CORESET is quasi-collocated with the RS indicated by the TCI state.

15. The method of claim 1, further comprising:
transmitting, based on detecting a second beam failure, a second BFR MAC CE for a second BFR procedure, wherein the second BFR MAC CE indicates a second candidate RS among one or more RSs for BFR associated with the second CORESET group index;
completing the second BFR procedure successfully based a second PDCCH reception with the DCI format indicating a second uplink grant; and
monitoring, after the number of symbols from a last symbol of the second PDCCH reception, the PDCCH in the second CORESET using antenna port quasi-collocation parameters corresponding to the second candidate RS.

16. A wireless device comprising:
one or more processors; and
memory storing instructions that, when executed by the one or more processors, cause the wireless device to:
receive one or more messages comprising one or more configuration parameters for a downlink bandwidth part (BWP) of a cell, wherein the one or more configuration parameters indicate:
two control resource set (CORESET) group indexes;
one or more first reference signals (RSs) for beam failure detection; and
one or more second RSs for beam failure recovery (BFR);
transmit, based on detecting a beam failure for the one or more first RSs, a BFR medium access control (MAC) control element (CE) for a BFR procedure, wherein the BFR MAC CE indicates a candidate RS among the one or more second RSs;
complete the BFR procedure successfully based on a physical downlink control channel (PDCCH) reception with a downlink control information (DCI) format indicating an uplink grant; and
monitor, after a number of symbols from a last symbol of the PDCCH reception, PDCCH using antenna port quasi-collocation parameters corresponding to:
the candidate RS in a first CORESET with a first CORESET group index of the two CORESET group indexes; and
an RS, indicated by a transmission configuration indication (TCI) state, in a second CORESET with a second CORESET group index of the two CORESET group indexes.

17. The wireless device of claim 16, wherein the instructions further cause the wireless device to not monitor, after the number of symbols from the last symbol of the PDCCH reception, the PDCCH using antenna port quasi-collocation parameters corresponding to the candidate RS in the second CORESET with the second CORESET group index.

18. The wireless device of claim 16, wherein the one or more first RSs are associated with the first CORESET group index.

19. The wireless device of claim 16, wherein a radio link quality of the candidate RS is equal to, or greater than, a threshold.

20. The wireless device of claim 16, wherein the one or more configuration parameters indicate:
    the first CORESET group index for one or more first CORESETs in the downlink BWP of the cell, wherein the one or more first CORESETs comprise the first CORESET; and
    the second CORESET group index for one or more second CORESETs in the downlink BWP of the cell, wherein the one or more second CORESETs comprise the second CORESET.

21. The wireless device of claim 16, wherein the instructions further cause the wireless device to receive a MAC CE indicating activation of the TCI state for the second CORESET.

22. The wireless device of claim 16, wherein a cyclic redundancy check (CRC) of the DCI format is scrambled by C-RNTI.

23. The wireless device of claim 16, wherein the instructions further cause the wireless device to transmit, after the number of symbols from the last symbol of the PDCCH reception and via a first physical uplink control channel (PUCCH) resource associated with the first CORESET group index of the two CORESET group indexes, a first PUCCH transmission.

24. The wireless device of claim 23, wherein the first PUCCH transmission is transmitted using:
    a first transmission power determined based on a downlink pathloss estimate of the candidate reference signal; and
    a first spatial domain filter that is associated with the candidate RS.

25. The wireless device of claim 24, wherein the instructions further cause the wireless device to transmit, after completing the BER procedure successfully and via a second PUCCH resource associated with the second CORESET group index of the two CORESET group indexes, a second PUCCH transmission.

26. The wireless device of claim 25, wherein the second PUCCH transmission is transmitted using:
    a second transmission power determined based on a downlink pathloss estimate of a reference signal indicated by a spatial relation of the second PUCCH resource; and
    a second spatial domain filter that is determined based on a spatial domain filter of a reference signal indicated by a spatial relation of the second PUCCH resource.

27. The wireless device of claim 26, wherein the instructions further cause the wireless device to receive an activation command indicating activation of the spatial relation for the second PUCCH resource.

28. The wireless device of claim 16, wherein the number of symbols is 28 symbols.

29. The wireless device of claim 16, wherein:
    at least one demodulation reference signal (DM-RS) port of the PDCCH in the first CORESET is quasi-collocated with the candidate reference signal; and
    at least one DM-RS port of the PDCCH in the second CORESET is quasi-collocated with the RS indicated by the TCI state.

30. The wireless device of claim 16, wherein the instructions further cause the wireless device to:
    transmit, based on detecting a second beam failure, a second BFR MAC CE for a second BFR procedure, wherein the second BFR MAC CE indicates a second candidate RS among one or more RSs for BFR associated with the second CORESET group index;
    complete, the second BFR procedure successfully based a second PDCCH reception with the DCI format indicating a second uplink grant; and
    monitor, after the number of symbols from a last symbol of the second PDCCH reception, the PDCCH in the second CORESET using antenna port quasi-collocation parameters corresponding to the second candidate RS.

* * * * *